US010198903B2

(12) United States Patent
Amaitis et al.

(10) Patent No.: US 10,198,903 B2
(45) Date of Patent: Feb. 5, 2019

(54) WAGERING ON EVENT OUTCOMES DURING THE EVENT

(71) Applicant: CG TECHNOLOGY DEVELOPMENT, LLC, Las Vegas, NV (US)

(72) Inventors: Lee Amaitis, Las Vegas, NV (US); Andrew Garrood, London (GB); Mike Colbert, Las Vegas, NV (US); Heather Parks, Las Vegas, NV (US); Anthony Storm, Hertfordshire (GB); Foster Barton, London (GB); Thomas D. Bradshaw, New York, NY (US)

(73) Assignee: CG TECHNOLOGY DEVELOPMENT, LLC, New York, NY (US)

( * ) Notice: Subject to any disclaimer, the term of this patent is extended or adjusted under 35 U.S.C. 154(b) by 0 days.

(21) Appl. No.: 14/788,013

(22) Filed: Jun. 30, 2015

(65) Prior Publication Data

US 2016/0063796 A1 Mar. 3, 2016

Related U.S. Application Data

(63) Continuation of application No. 13/612,057, filed on Sep. 12, 2012, now Pat. No. 9,076,305, and a (Continued)

(51) Int. Cl.
*A63F 13/00* (2014.01)
*G07F 17/32* (2006.01)
*G06Q 50/34* (2012.01)

(52) U.S. Cl.
CPC ........... *G07F 17/323* (2013.01); *G06Q 50/34* (2013.01); *G07F 17/3269* (2013.01); *G07F 17/3288* (2013.01); *G07F 17/3293* (2013.01)

(58) Field of Classification Search
CPC ............. G07F 17/3244; G07F 17/3262; G07F 17/3269; G07F 17/3288
(Continued)

(56) References Cited

U.S. PATENT DOCUMENTS 2,026,082 A 12/1935 Darrow
3,224,773 A 12/1965 Roed
(Continued)

FOREIGN PATENT DOCUMENTS

EP 1658887 5/2006
GB 2262642 6/1993
(Continued)

OTHER PUBLICATIONS

U.S. Appl. No. 60/305,148, filed Jul. 13, 2001, McDowell et al.
(Continued)

*Primary Examiner* — James S McClellan

(57) ABSTRACT

Methods and systems are provided for managing a wagering system. In one exemplary embodiment, state information of a live event such as a sports game may be received in real time. During the event, a plurality of possible future states of the event and their associated probabilities (and odds) may be determined based on the state information, historical information, and current in-game information. A betting market is created for betting on the possible future states at determined odds. The betting market is closed, and winning and losing bets are resolved based on updated state information.

20 Claims, 22 Drawing Sheets

Related U.S. Application Data continuation of application No. 13/023,551, filed on Feb. 9, 2011, now Pat. No. 9,005,016, which is a continuation-in-part of application No. 12/497,668, filed on Jul. 4, 2009, now Pat. No. 8,342,946, which is a continuation-in-part of application No. 12/258,297, filed on Oct. 24, 2008, now Pat. No. 8,342,966.

(58) Field of Classification Search
USPC ............................ 463/21, 25, 29, 30, 31, 42
See application file for complete search history.

(56) References Cited

U.S. PATENT DOCUMENTS 3,856,308 A 12/1974 Breslow et al.
3,895,804 A 7/1975 Lee
4,053,157 A 10/1977 Cowan
4,058,319 A 11/1977 Thomas et al.
4,141,548 A 2/1979 Everton
4,323,248 A 4/1982 Zingale
4,339,798 A 7/1982 Hedges et al.
4,569,526 A 2/1986 Hamilton
4,592,546 A 6/1986 Fascenda et al.
4,666,160 A 5/1987 Hamilton
4,819,818 A 4/1989 Simkus et al.
4,881,740 A 11/1989 Odhner
4,883,636 A 11/1989 Fantle, Jr.
5,085,441 A 2/1992 Jova
5,141,234 A 8/1992 Boylan et al.
5,167,010 A 11/1992 Elm et al.
5,179,517 A 1/1993 Sarbin et al.
5,238,249 A 8/1993 Elias et al.
5,314,194 A 5/1994 Wolf
5,340,113 A 8/1994 Respicio
5,350,175 A 9/1994 DiLullo et al.
5,370,397 A 12/1994 Miller, Jr. et al.
5,397,128 A 3/1995 Hesse et al.
5,494,296 A 2/1996 Grassa
5,507,485 A 4/1996 Fisher
5,507,489 A 4/1996 Reibel et al.
5,558,339 A 9/1996 Perlman
5,573,244 A 11/1996 Mindes
5,575,474 A 11/1996 Rossides
5,586,257 A 12/1996 Perlman
5,636,209 A 6/1997 Perlman
5,669,817 A 9/1997 Tarantino
5,673,917 A 10/1997 Vancura
5,676,375 A 10/1997 Pirouzkhah
5,749,785 A 5/1998 Rossides
5,769,714 A 6/1998 Wiener et al.
5,795,226 A 8/1998 Yi
5,810,360 A 9/1998 Srichayapom
5,826,976 A 10/1998 Skratulia
5,828,843 A 10/1998 Grimm et al.
5,842,921 A 12/1998 Mindes et al.
5,868,392 A 2/1999 Kraft
5,879,007 A 3/1999 Kasri
5,911,419 A 6/1999 Delaney et al.
5,934,675 A 8/1999 Handelman et al.
5,944,315 A 8/1999 Mostashari
5,947,821 A 9/1999 Stone
5,956,485 A 9/1999 Perlman
5,971,854 A 10/1999 Pearson et al.
5,999,808 A 12/1999 LaDue
6,007,427 A 12/1999 Wiener et al.
6,024,643 A 2/2000 Begis
6,036,601 A 3/2000 Heckel
6,062,565 A 5/2000 Chadband et al.
6,068,552 A 5/2000 Walker
6,070,878 A 6/2000 Jones et al.
6,102,403 A 8/2000 Kaufman
6,106,395 A 8/2000 Begis
6,113,495 A 9/2000 Walker et al.
6,116,601 A 9/2000 Kornafel, Jr.
6,119,229 A 9/2000 Martinez et al.
6,120,031 A 9/2000 Adams
6,135,453 A 10/2000 Srichayapom
6,146,272 A 11/2000 Walker et al.
6,158,741 A 12/2000 Koelling
6,174,235 B1 1/2001 Walker et al.
6,176,487 B1 1/2001 Eklund et al.
6,203,017 B1 3/2001 Schultz
6,204,813 B1 3/2001 Wadell et al.
6,206,373 B1 3/2001 Garrod
6,227,969 B1 5/2001 Yoseloff
6,286,833 B1 9/2001 Collins
6,305,689 B1 10/2001 Webb
6,322,451 B1 11/2001 Miura
6,325,716 B1 12/2001 Walker et al.
6,341,778 B1 1/2002 Lee
6,352,479 B1 3/2002 Sparks, II
6,371,485 B1 4/2002 Daines
6,394,899 B1 5/2002 Walker
6,402,149 B1 6/2002 Chou
6,434,398 B1 8/2002 Inselberg
6,439,573 B1 8/2002 Sklar
6,460,848 B1 10/2002 Soltys et al.
6,464,583 B1 10/2002 Kidron
6,481,714 B1 11/2002 Jacobs
6,485,020 B1 11/2002 Broadnax
6,503,145 B1 1/2003 Webb
6,508,710 B1 1/2003 Paravia et al.
6,511,377 B1 1/2003 Weiss
6,520,856 B1 2/2003 Walker et al.
6,523,829 B1 2/2003 Walker et al.
6,536,767 B1 3/2003 Keller
6,536,769 B1 3/2003 Palacios et al.
6,540,230 B1 4/2003 Walker et al.
6,561,902 B1 5/2003 Walker et al.
6,569,014 B2 5/2003 Walker et al.
6,569,015 B1 5/2003 Baerlocher et al.
6,575,463 B1 6/2003 Wintersteen
6,575,465 B2 6/2003 Lo
6,581,932 B2 6/2003 Jacobs
6,582,310 B1 6/2003 Walker et al.
6,592,123 B1 7/2003 Mattlage et al.
6,601,048 B1 7/2003 Gavan et al.
6,602,136 B1 8/2003 Baerlocher et al.
6,612,580 B1 9/2003 Weldon
6,616,142 B2 9/2003 Adams
6,641,481 B1 11/2003 Mai et al.
6,651,086 B1 11/2003 Manber et al.
6,679,497 B2 1/2004 Walker et al.
6,692,003 B2 2/2004 Potter et al.
6,708,975 B1 3/2004 Fox
6,733,387 B2 5/2004 Walker et al.
6,755,420 B2 6/2004 Colton
6,758,754 B1 7/2004 Lavanchy
6,769,986 B2 8/2004 Vancura
6,808,174 B1 10/2004 Rubin
6,875,110 B1 4/2005 Crumby
6,877,745 B1 4/2005 Walker et al.
6,884,166 B2 4/2005 Leen et al.
6,887,151 B2 5/2005 Leen et al.
6,887,159 B2 5/2005 Leen et al.
6,899,628 B2 5/2005 Leen et al.
6,902,480 B2 6/2005 Kidron
6,910,965 B2 6/2005 Downes
6,929,264 B2 8/2005 Huard et al.
6,966,832 B2 11/2005 Leen et al.
6,979,267 B2 12/2005 Leen et al.
7,004,834 B2 2/2006 Walker et al.
7,021,623 B2 4/2006 Leen et al.
7,022,015 B2 4/2006 Mostashari
7,029,394 B2 4/2006 Leen et al.
7,086,943 B2 8/2006 Mugnolo et al.
7,094,151 B2 8/2006 Downes
7,172,508 B2 2/2007 Simon et al.
7,240,093 B1 7/2007 Danieli
7,306,514 B2 12/2007 Amaitis et al.
7,306,516 B2 12/2007 Iosilevsky
7,361,085 B2 4/2008 Packes, Jr. et al.
7,410,422 B2 8/2008 Fine
7,523,941 B2 4/2009 Thomas et al.

(56) References Cited

U.S. PATENT DOCUMENTS 7,585,217 B2 9/2009 Lutnick et al.
7,774,259 B1 8/2010 Satterfield
7,798,896 B2 9/2010 Katz et al.
7,833,101 B2 11/2010 Lutnick et al.
7,901,286 B2 3/2011 Reeves, III
8,025,565 B2 9/2011 Leen et al.
8,105,141 B2 1/2012 Leen et al.
8,266,212 B2 9/2012 Brunet de Courssou
8,556,691 B2 10/2013 Leen et al.
8,672,751 B2 3/2014 Leen et al.
8,684,840 B2 4/2014 Ishii
8,734,227 B2 5/2014 Leen et al.
8,821,269 B2 9/2014 Leen et al.
8,858,326 B2 10/2014 Amaitis et al.
9,005,016 B2 4/2015 Amaitis et al.
9,076,305 B2 7/2015 Amaitis et al.
9,111,417 B2 8/2015 Leen et al.
2001/0007828 A1 7/2001 Walker et al.
2001/0009867 A1 7/2001 Sakaguchi et al.
2001/0019965 A1 9/2001 Ochi
2001/0044339 A1 11/2001 Cordero et al.
2002/0037767 A1 3/2002 Ebin
2002/0058543 A1 5/2002 Walker et al.
2002/0068633 A1* 6/2002 Schlaifer ................ G06Q 50/34
463/43
2002/0072412 A1 6/2002 Young et al.
2002/0116263 A1 8/2002 Gouge
2002/0119824 A1 8/2002 Allen
2002/0125639 A1 9/2002 Wells
2002/0169019 A1 11/2002 Walker et al.
2002/0198044 A1 12/2002 Walker et al.
2003/0036428 A1 2/2003 Aasland
2003/0045358 A1 3/2003 Leen et al.
2003/0047871 A1 3/2003 Vancura
2003/0050106 A1 3/2003 Lyfoung
2003/0060276 A1 3/2003 Walker et al.
2003/0064807 A1 4/2003 Walker et al.
2003/0067116 A1 4/2003 Colton
2003/0069058 A1 4/2003 Byrne
2003/0096646 A1 5/2003 Zhu
2003/0119579 A1 6/2003 Walker et al.
2003/0139211 A1 7/2003 Mostashari
2003/0144052 A1 7/2003 Walker et al.
2003/0157976 A1 8/2003 Simon et al.
2003/0190941 A1 10/2003 Byrne
2003/0216170 A1 11/2003 Walker et al.
2003/0224852 A1 12/2003 Walker et al.
2003/0234787 A1 12/2003 Hines
2004/0005919 A1 1/2004 Walker et al.
2004/0015429 A1* 1/2004 Tighe ..................... G06Q 40/04
705/37
2004/0053664 A1 3/2004 Byrne
2004/0078208 A1 4/2004 Burwell
2004/0104845 A1 6/2004 McCarthy
2004/0227291 A1 11/2004 Van Rhyn
2004/0229671 A1 11/2004 Stronach et al.
2004/0231018 A1 11/2004 Olson
2004/0259621 A1 12/2004 Pfeiffer et al.
2005/0003893 A1 1/2005 Hogwood et al.
2005/0040592 A1 2/2005 Adams, III
2005/0051958 A1 3/2005 Snow
2005/0059452 A1 3/2005 Hartl
2005/0082756 A1 4/2005 Duncan
2005/0101386 A1 5/2005 Lavanchy
2005/0113161 A1 5/2005 Walker et al.
2005/0116416 A1 6/2005 Peterson
2005/0127607 A1 6/2005 Centrone
2005/0151319 A1 7/2005 Berman et al.
2005/0179201 A1 8/2005 DeSalvo
2005/0227757 A1 10/2005 Simon
2005/0275166 A1 12/2005 Wirth
2005/0289039 A1* 12/2005 Greak ................ G06Q 30/0609
705/37
2006/0017228 A1 1/2006 Chen
2006/0025192 A1 2/2006 Walker et al.
2006/0052148 A1 3/2006 Blair, Jr. et al.
2006/0079314 A1 4/2006 Walker et al.
2006/0079316 A1 4/2006 Flemming et al.
2006/0084501 A1 4/2006 Walker et al.
2006/0116198 A1 6/2006 Leen et al.
2006/0116199 A1 6/2006 Leen et al.
2006/0116200 A1 6/2006 Leen et al.
2006/0246990 A1 11/2006 Downes
2007/0135214 A1 6/2007 Walker et al.
2007/0135215 A1 6/2007 Walker et al.
2007/0155462 A1 7/2007 O'Halloran et al.
2007/0191107 A1 8/2007 Walker et al.
2007/0254732 A1 11/2007 Walker et al.
2007/0293289 A1 12/2007 Loeb
2007/0298856 A1 12/2007 Gilmore et al.
2008/0058048 A1 3/2008 Lutnick et al.
2008/0070667 A1 3/2008 Lutnick et al.
2008/0076544 A1 3/2008 Mindes et al.
2008/0085769 A1 4/2008 Lutnick et al.
2008/0113816 A1 5/2008 Mahaffey et al.
2008/0139316 A1 6/2008 He
2008/0161101 A1 7/2008 Lutnick et al.
2008/0191418 A1 8/2008 Lutnick et al.
2008/0207310 A1 8/2008 Mindes
2008/0214286 A1 9/2008 Lutnick et al.
2008/0234037 A1 9/2008 Leen et al.
2008/0248849 A1 10/2008 Lutnick et al.
2008/0254881 A1 10/2008 Lutnick et al.
2009/0037311 A1* 2/2009 Omar ..................... G06Q 40/00
705/35
2009/0061974 A1 3/2009 Lutnick et al.
2009/0061978 A1 3/2009 Ahlin
2009/0083169 A1 3/2009 Ortega
2009/0088232 A1 4/2009 Amaitis et al.
2009/0093300 A1 4/2009 Lutnick et al.
2009/0111551 A1 4/2009 Faulkner
2009/0115654 A1 5/2009 Lo et al.
2009/0291732 A1 11/2009 Lutnick et al.
2010/0048302 A1 2/2010 Lutnick et al.
2010/0087247 A1 4/2010 Joshi et al.
2010/0105464 A1 4/2010 Storm et al.
2010/0124960 A1 5/2010 Lutnick et al.
2010/0124967 A1 5/2010 Lutnick et al.
2010/0160012 A1 6/2010 Amaitis et al.
2010/0197410 A1 8/2010 Leen et al.
2011/0009867 A1 1/2011 Oren et al.
2011/0034228 A1 2/2011 Lutnick et al.
2011/0065490 A1 3/2011 Lutnick et al.
2011/0275432 A1 11/2011 Lutnick et al.
2011/0281620 A1 11/2011 Hays
2012/0058813 A1 3/2012 Amaitis et al.
2012/0064969 A1 3/2012 Uchubori
2013/0130791 A1 5/2013 Myogan
2014/0179405 A1 6/2014 Leen et al.
2015/0024832 A1 1/2015 Leen et al.
2015/0174481 A1 6/2015 Tobin
2015/0356830 A1 12/2015 Leen et al.

FOREIGN PATENT DOCUMENTS

WO WO 97/44105 5/1997
WO WO 9851384 11/1998
WO WO 99/26204 5/1999
WO WO 00/32286 6/2000
WO WO 00/79464 12/2000
WO WO 01/05477 1/2001
WO WO 01/01319 4/2001
WO WO 01/41447 6/2001
WO WO 02/060546 12/2001
WO WO 2004/076011 9/2004

OTHER PUBLICATIONS

U.S. Appl. No. 60/305,146, filed Jul. 13, 2001, McDowell et al.
U.S. Appl. No. 60/305,147, filed Jul. 13, 2001, McDowell et al.
U.S. Appl. No. 60/305,149, filed Jul. 13, 2001, McDowell et al.
U.S. Appl. No. 60/305,150, filed Jul. 13, 2001, McDowell et al.
U.S. Appl. No. 60/305,151, filed Jul. 13, 2001, McDowell et al.

(56) References Cited

OTHER PUBLICATIONS

U.S. Appl. No. 60/323,597, filed Sep. 20, 2001, McDowell.
U.S. Appl. No. 60/323,598, filed Sep. 20, 2001, McDowell.
PCT Report for PCT/EP02/07806 dated Jan. 2, 2003 (6 pages).
PCT Search Report for PCT/EP02/07807 dated Apr. 10, 2003 (7 pages).
PCT Written Opinion for PCT/EP02/07807 dated Apr. 22, 2003 (5 pages).
USPTO Office Action for U.S. Appl. No. 10/194,358, dated Mar. 25, 2004 (7 pages).
USPTO Examiner Interview Summary for U.S. Appl. No. 10/194,358, dated Jun. 17, 2004 (3 pages).
USPTO Notice of Allowance and Fees Due for U.S. Appl. No. 10/194,358, dated Jan. 26, 2005 (4 pages).
USPTO Office Action for U.S. Appl. No. 10/193,971, dated Mar. 26, 2004 (8 pages).
USPTO Notice of Allowance and Fees Due for U.S. Appl. No. 10/193,971, dated Dec. 15, 2004 (4 pages).
USPTO Office Action for U.S. Appl. No. 10/194,018, dated Apr. 23, 2004 (7 pages).
USPTO Notice of Allowance and Fees Due for U.S. Appl. No. 10/194,018, dated Dec. 15, 2004 (4 pages).
USPTO Office Action for U.S. Appl. No. 10/193,817, dated Nov. 18, 2003 (5 pages).
USPTO Office Action for U.S. Appl. No. 10/193,817, dated Mar. 25, 2004 (11 pages).
USPTO Examiner Interview Summary for U.S. Appl. No. 10/193,817, dated May 24, 2004 (3 pages).
USPTO Examiner Interview Summary for U.S. Appl. No. 10/193,817, dated Oct. 18, 2004 (3 pages).
USPTO Office Action for U.S. Appl. No. 10/193,817, dated Oct. 18, 2004 (11 pages).
USPTO Office Action for U.S. Appl. No. 10/193,817, datedJan. 10, 2005 (2 pages).
USPTO Office Action for U.S. Appl. No. 10/193,817, dated Apr. 7, 2005 (21 pages).
USPTO Examiner Interview Summary for U.S. Appl. No. 10/193,817, dated Aug. 1, 2005 (4 pages).
USPTO Notice of Allowance and Fees Due for U.S. Appl. No. 10/193,817, dated Oct. 31, 2005 (7 pages).
John Scarne—Scarne's Encyclopedia of Games—1973—Harper & Row—pp. 522-531.
John Belton—Domino Games—1931—Raintree Editions—pp. 7-10.
USPTO Office Action for U.S. Appl. No. 10/193,980, dated Dec. 23, 2005 (9 pages).
USPTO Examiner Interview Summary for U.S. Appl. No. 10/193,980, dated Mar. 29, 2006 (4 pages).
USPTO Office Action for U.S. Appl. No. 10/193,980, dated Mar. 7, 2007 (12 pages).
USPTO Office Action for U.S. Appl. No. 10/193,980, dated Jun. 28, 2007 (3 pages).
USPTO Office Action for U.S. Appl. No. 10/193,980, dated Sep. 25, 2007 (5 pages).
USPTO Office Action for U.S. Appl. No. 10/193,980, dated Dec. 11, 2007 (10 pages).
USPTO Office Action for U.S. Appl. No. 10/193,980, dated Jun. 30, 2008 (13 pages).
USPTO Office Action for U.S. Appl. No. 10/193,980, dated Sep. 10, 2008 (3 pages).
USPTO Office Action for U.S. Appl. No. 11/335,253, dated Sep. 14, 2007 (11 pages).
USPTO Office Action for U.S. Appl. No. 11/335,253, dated Mar. 21, 2008 (10 pages).
USPTO Office Action for U.S. Appl. No. 11/335,253, dated Jun. 11, 2008 (3 pages).
USPTO Office Action for U.S. Appl. No. 11/334,848, dated Aug. 15, 2007 (12 pages).
USPTO Office Action for U.S. Appl. No. 11/334,848, dated May 16, 2008 (5 pages).
USPTO Office Action for U.S. Appl. No. 12/131,516, dated Jul. 8, 2009 (12 pages).
USPTO Examiner Interview Summary for U.S. Appl. No. 12/131,516, dated Nov. 9, 2009 (3 pages).
USPTO Office Action for U.S. Appl. No. 11/335,210, dated Sep. 6, 2007 (24 pages).
USPTO Office Action for U.S. Appl. No. 11/335,210, dated Jan. 23, 2008 (9 pages).
USPTO Office Action for U.S. Appl. No. 11/335,210, dated Apr. 4, 2008 (3 pages).
USPTO Office Action for U.S. Appl. No. 10/193,978, dated Mar. 31, 2004 (7 pages).
USPTO Office Action for U.S. Appl. No. 10/193,978, dated Dec. 14, 2004 (10 pages).
USPTO Office Action for U.S. Appl. No. 10/193,978, dated Jan. 25, 2005 (3 pages).
USPTO Notice of Allowance and Fees Due for U.S. Appl. No. 10/193,978, dated Nov. 30, 2005 (6 pages).
USPTO Office Action for U.S. Appl. No. 10/193,977, dated Apr. 21, 2004 (8 pages).
USPTO Notice of Allowance and Fees Due for U.S. Appl. No. 10/193,977, dated Dec. 20, 2004 (3 pages).
USPTO Office Action for U.S. Appl. No. 10/194,186, dated Apr. 30, 2004 (7 pages).
USPTO Notice of Allowance and Fees Due for U.S. Appl. No. 10/194,186, dated Dec. 15, 2004 (4 pages).
USPTO Office Action for U.S. Appl. No. 10/194,019, dated Mar. 26, 2004 (7 pages).
USPTO Office Action for U.S. Appl. No. 10/194,019, dated Dec. 14, 2004 (10 pages).
USPTO Notice of Allowance and Fees Due for U.S. Appl. No. 10/194,019, dated Jan. 31, 2005 (4 pages).
"3 Quick Start," EverQuest Manual (3 pages), downloaded from http://eqlive.station.sony.com/manuaVprintfriendly.jsp?chapter=3 on Sep. 13, 2005.
"Sony Online Entertainment and NCsoft Join Force to Expand EverQuest®," Game Development Search Engine, (2 pages) dated Jan. 23, 2002.
"Butterfly.net: Powering next-generation gaming with on-demand computing," mM case study on Butterfly.net, (12 pages) downloaded from http://www-306.ibm.com/software/success/cssdb.nsf7CSIAKLR-5GNU24?OpenDocument . . . . on Sep. 20, 2005.
"Sony PlayStation 2 Online Adaptor," CNET.com, (4 pages). Release date Aug. 27, 2002.
"Playstation, Playstation 2," Answers.com (8 pages), downloaded from http://www.answers.com/main/ntquery;jsessionid=In07siu6tfvdv?method=4&dsid=2222&d . . . . on Sep. 8, 2005.
"E3 2002: All About Xbox Live," xbox.ign.com, (4 pages), May 20, 2002.
"Encyclopedia: EverQuest," natiomaster.com (7 pages) , downloaded from http://www.nationmaster.com/encyclopedia/EverQuest on Sep. 15, 2005.
"Sony Online Entertainment Continues to Lead the Online Gaming Industry With Its New Roster of Massively Multiplayer Games," Press Releases at Sonyonline.com (2 pages) May 13, 2002.
"Middleware Partners, Working with Game Components Suppliers," Quazal Multiplayer Connectivity (1 page), downloaded from http://www.quazal.comlmodules.php?op=modload&name-Sections&fi1e=index&req=vie . . . . on Sep. 13, 2005.
"Quazal Eterna, The Most Flexible Infrastructure for MMOG," Quazal Multiplayer Connectivity, (1 page), downloaded from http://www.quazal.comlmodules.php?op=modload&name-Sections&file=index&req=vie . . . . on Sep. 13, 2005.
"Quazal Rendez-Vous, A Flexible and Powerful Lobby Solution," Quazal Multiplayer Connectivity, (2 pages), downloaded from http://www.quazal.comlmodules.php?op=modload&name-Sections&file=index&req=vie . . . . on Sep. 13, 2005.
"Quazal Voice for Net-Z, Real-Time Voice Communications Made Easy," Quazal Multiplayer Connectivity, (1 page), downloaded from http://www.quazal.com/modules.php?op=modload&name-Sections&file=index&req=vie . . . . on Sep. 13, 2005.
"Quazal SyncSim for Net-Z, Everything for Deterministic Simulations," Quazal Multiplayer Connectivity, (2 pages), downloaded

(56) References Cited

OTHER PUBLICATIONS from http://www.quazal.comlmodules.php?op=modload&name-Sections&file=index&req=vie . . . . on Sep. 13, 2005.
"Quazal Net-Z, Simplifying Multiplayer Game Development," Quazal Multiplayer Connectivity (2 pages), downloaded from http://www.quazal.comlmodules.php?op=modload&name-Sections&file=index&req=vie . . . . on Sep. 13, 2005.
"GameSpy Arcade—The Arcade for the Internet!," gamespy arcade, (11 pages), downloaded from http://www.gamespyarcade.com/features/ on Sep. 13, 2005.
"Encyclopedia: MMORPG," natiomaster.com, (10 pages), downloaded from http://www.nationmaster.comlencyclopedialM-MORPG on Sep. 15, 2005.
"Online Gaming," PlayStation, (9 pages), downloaded from http://www.us.playstation.com/onlinegaming.aspx?id=index&PAGE=1 on Sep. 13, 2005.
"3rd Party Game Support," PlayStation, (5 pages) © 2005 Sony Computer Entertainment America Inc. 2005.
Myth II Soulblighter; <URL: http://public.planetmirror.com/pub/replacementdocs/Myth_II_-Soulblighter-Manual-Pc.pdf>; 24 pages, Dated 1999.
European Examination Report for Application No. 02 764 684.3-2221; (4 pages) dated Oct. 12, 2004.
European Examination Report for Application No. 02 764684.3-2221; (4 pages) dated Jun. 17, 2005.
European Summons to Attend Oral Proceedings for Application No. 02 764684.3-2211; (26 pages) Feb. 14, 2006.
European Decision to Refuse a European Patent Application for Application No. 02 764 684.3-2211; (9 pages) Dec. 14, 2006.
USPTO Examiner's Answer to Appeal Brief for U.S. Appl. No. 10/193,980, dated Sep. 23, 2009 (14 pages).
USPTO Examiner's Answer to Appeal Brief for U.S. Appl. No. 11/335,253, dated Feb. 24, 2009 (15 pages).
USPTO Office Action for U.S. Appl. No. 12/131,516, dated Jan. 13, 2010 (13 pages).
USPTO Pre-Brief Appeal Conference Decision for U.S. Appl. No. 11/335,210, dated Jun. 5, 2008 (2 pages).
USPTO Examiner's Answer to Appeal Brief for U.S. Appl. No. 11/335,210, dated Nov. 12, 2008 (12 pages).
USPTO Notification of Appeal Hearing for U.S. Appl. No. 11/335,210, dated Jul. 1, 2010 (2 pages).
International Preliminary Examination Report for International Application No. PCT/EP2002/007806, dated Aug. 11, 2003 (9 pages).
International Preliminary Examination Report for International Application PCT/EP02/07807, dated Aug. 19, 2003 (5 pages).
USPTO Office Action for U.S. Appl. No. 11/397,596, dated Sep. 10, 2010 (11 pages).
Monopoly (TM) Parker Brothers Real Estate Trading Game (C) 1997, Retrieved from http://www.hasbro.com/common/instrucUmonins.pdf on Sep. 9th, 2010 (6 pages).
USPTO Response to Reply Brief for U.S. Appl. No. 11/335,253, dated May 6, 2009 (3 pages).
USPTO Pre-Brief Appeal Conference Decision for U.S. Appl. No. 12/131,516, dated Jul. 22, 2010 (2 pages).
USPTO Notice of Allowance and Fees Due for U.S. Appl. No. 12/131,516, dated Mar. 18, 2011 (15 pages).
USPTO Office Action for U.S. Appl. No. 11/335,253, dated Sep. 15, 2011 (17 pages).
USPTO BPAI Decision for U.S. Appl. No. 11/335,210, dated Jun. 29, 2011 (12 pages).
USPTO Notice of Allowance and Fees Due for U.S. Appl. No. 11/397,596, dated Sep. 22, 2011 (8 pages).
USPTO Office Action for U.S. Appl. No. 12/760,185, dated Nov. 9, 2011 (7 pages).
USPTO Notice of Allowance and Fees Due for U.S. Appl. No. 11/335,210, dated Sep. 30, 2011 (12 pages).
USPTO Office Action for U.S. Appl. No. 12/258,297, dated Oct. 28, 2011 (12 pages).
USPTO Office Action for U.S. Appl. No. 11/335,253, dated Mar. 28, 2012 (19 pages).
USPTO Office Action for U.S. Appl. No. 11/335,210, dated Feb. 17, 2012 (9 pages).
USPTO Office Action for U.S. Appl. No. 12/497,668, dated Jan. 31, 2012 (7 pages).
USPTO Notice of Allowance and Fees Due for U.S. Appl. No. 12/760,185, dated Apr. 23, 2012 (8 pages).
USPTO Notice of Allowance and Fees Due for U.S. Appl. No. 12/258,297, dated May 11, 2012 (5 pages).
USPTO Office Action for U.S. Appl. No. 13/245,380, dated Apr. 6, 2012 (17 pages).
Tom Landry Strategy Football [online]. Home of the Underdogs [Retrieved from the Internet: <URL:http://squakenet.com/computer_games/6459/Tom-Landry-Strategy-Football/download.html>.
USPTO Office Action for U.S. Appl. No. 11/335,210, dated Sep. 19, 2012 (12 pages).
USPTO Notice of Allowance and Fees Due for U.S. Appl. No. 12/258,297, dated Sep. 5, 2012 (5 pages).
USPTO Notice of Allowance and Fees Due for U.S. Appl. No. 12/497,668, dated Sep. 18, 2012 (7 pages).
USPTO Office Action for U.S. Appl. No. 13/618,191, dated Feb. 22, 2013 (6 pages).
USPTO Office Action for U.S. Appl. No. 13/245,380, dated Nov. 5, 2012 (18 pages).
USPTO Pre-Brief Appeal Conference Decision for U.S. Appl. No. 11/335,210, dated Apr. 24, 2013 (2 pages).
USPTO Office Action for U.S. Appl. No. 13/611,602, dated Apr. 2, 2013 (9 pages).
USPTO Office Action for U.S. Appl. No. 13/612,084, dated Mar. 29, 2013 (8 pages).
USPTO Notice of Allowance and Fees Due for U.S. Appl. No. 13/361,255, dated Jun. 19, 2013 (9 pages).
USPTO Decision on Appeal for U.S. Appl. No. 10/193,980, dated Aug. 9, 2013 (16 pages).
USPTO Office Action for U.S. Appl. No. 11/335,253, dated Jun. 4, 2013 (14 pages).
USPTO Pre-Brief Appeal Conference Decision for U.S. Appl. No. 13/245,380, dated May 17, 2013 (2 pages).
USPTO Notice of Allowance and Fees due for U.S. Appl. No. 10/193,980, dated Oct. 28, 2013, (13 pages).
USPTO Office Action for U.S. Appl. No. 13/618,191, dated Nov. 13, 2013 (9 pages).
USPTO Office Action for U.S. Appl. No. 13/612,084, dated Oct. 1, 2013 (7 pages).
USPTO Office Action for U.S. Appl. No. 13/612,057, dated Sep. 27, 2013 (11 pages).
USPTO Office Action for U.S. Appl. No. 13/023,551, dated Jun. 7, 2013 (9 pages).
USPTO Office Action for U.S. Appl. No. 13/023,551, dated Dec. 18, 2013 (9 pages).
USPTO Notice of Allowance and Fees Due for U.S. Appl. No. 11/335,253, dated Jan. 16, 2014 (15 pages).
USPTO Office Action for U.S. Appl. No. 11/335,210, dated Mar. 21, 2014 (18 pages).
USPTO Notice of Allowance and Fees Due for U.S. Appl. No. 12/760,185, dated Aug. 16, 2012 (9 pages).
USPTO Examiner's Answer for U.S. Appl. No. 13/245,380, dated Mar. 26, 2014 (13 pages).
USPTO Notice of Allowance and Fees Due for U.S. Appl. No. 13/611,602, dated May 7, 2014 (7 pages).
USPTO Notice of Panel Decision for U.S. Appl. No. 13/612,084, dated Apr. 16, 2014 (3 pages).
USPTO Notice of Allowance and Fees Due for U.S. Appl. No. 13/612,084, dated Jun. 4, 2014 (5 pages).
USPTO Notice of Panel Decision for U.S. Appl. No. 13/023,551, dated Jun. 19, 2014 (2 pages).
USPTO Notice of Allowance and Fees Due for U.S. Appl. No. 13/612,057, dated Jun. 11, 2014 (8 pages).
Case 2:16-cv-00856-RCJ-VCF, Document 1, "Plaintiffs' Complaint for Patent Infringement" filed Apr. 14, 2016 (39 pages).
Case 2:16-cv-00856-RCJ-VCF, Document 19, "Plaintiffs' First Amended Complaint for Patent Infringement", filed Jul. 11, 2016 (57 pages).

(56) References Cited

OTHER PUBLICATIONS

Case 2:16-cv-00856-RCJ-VCF, Document 23, "Defendant 888's Motion to Dismiss Plaintiffs First Amended Complaint Under Fed. R. Civ. P. 12(B)(6)", filed Aug. 12, 2016 (22 pages).
Case 2:16-cv-00856-RCJ-VCF, Document 26, "Defendant's Notice of Joinder to Motions to Dismiss in Related Cases", filed Aug. 12, 2016 (4 pages).
Case 2:16-cv-00856-RCJ-VCF, Document 36, "Plaintiffs' Opposition to 888 Holdings PLC's Motion to Dismiss", filed Sep. 8, 2016 (32 pages).
Case 2:16-cv-00856-RCJ-VCF, Document 37, "Index of Exhibits to Plaintiffs' Opposition to Defendant's Motion to Dismiss" filed Sep. 8, 2016 (3 pages).
Case 2:16-cv-00856-RCJ-VCF, Document 45, Defendant 888's Reply in Support to Dismiss Plaintiffs' First Amended Complaint Under Fed. R. Civ. P. 12(B)(6), filed Sep. 26, 2016 (19 pages).
Case 2:16-cv-00856-RCJ-VCF, Document 46, Defendant 888's Reply in Support of Motion to Dismiss Plaintiffs' First Amended Complaint Under Fed. R. Civ. P. 12(B)(6), filed Sep. 26, 2016 (19 pages).
Case 2:16-cv-00856-RCJ-VCF, Document 54, "Order", filed Dec. 6, 2016 (8 pages).
Case 2:16-cv-00856-RCJ-VCF, Document 57, "Defendant 888's Holdings PLC's Answer to Plaintiffs' First Amended Complaint", filed Jan. 18, 2017 (67 pages).
Case 2:16-cv-00857-APG-VCF, Document 1, "Plaintiffs' Complaint for Patent Infringement" filed Apr. 14, 2016 (29 pages).
Case 2:16-cv-00857-RCJ-VCF, Document 27, "Defendant Big Fish Games, Inc.'s Motion to Dismiss", filed Jun. 17, 2016 (30 pages).
Case 2:16-cv-00857-RCJ-VCF, Document 32, "[Corrected] Defendant Big Fish Games, Inc.'s Motion to Dismiss", filed Jul. 8, 2016 (30 pages).
Case 2:16-cv-00857-RCJ-VCF, Document 33, "Plaintiffs' Opposition to Big Fish Games, Inc.'s Motion to Dismiss", filed Jul. 25, 2016 (32 pages).
Case 2:16-cv-00857-RCJ-VCF, Document 34, "Reply in Support of Defendant Big Fish Games, Inc.'s Motion to Dismiss", filed Aug. 4, 2016 (17 pages).
Case 2:16-cv-00857-RCJ-VCF, Document 36, "Order" filed Aug. 29, 2016 (29 pages).
Case 2:16-cv-00857-RCJ-VCF, Document 37, "Plaintiffs' First Amended Complaint for Patent Infringement", filed Sep. 28, 2016 (38 pages).
Case 2:16-cv-00857-RCJ-VCF, Document 39, "Defendant Big Fish Games, Inc.'s Motion to Dismiss Plaintiffs' First Amended Complaint", filed Oct. 12, 2016 (17 pages).
Case 2:16-cv-00857-RCJ-VCF, Document 45, "Plaintiffs' Opposition to Big Fish Games, Inc.'s Motion to Dismiss", filed Oct. 31, 2016 (22 pages).
Case 2:16-cv-00857-RCJ-VCF, Document 49, "Reply in Support of Defendant Big Fish Games, Inc.'s Motion to Dismiss", filed Nov. 10, 2016 (16 pages).
Case 2:16-cv-00857-RCJ-VCF, Document 59, "Order", filed Jan. 4, 2017 (9 pages).
Case 2:16-cv-00857-RCJ-VCF, Document 60, "Defendant Big Fish Games, Inc.'s Answer to First Amended Complaint", filed Jan. 19, 2017 (17 pages).
Case 2:16-cv-00871-JAD-VCF, Document 1, "Plaintiffs' Complaint for Patent Infringement" filed Apr. 15, 2016 (39 pages).
Case 2:16-cv-00871-JAD-VCF, Document 23, "Plaintiffs' First Amended Complaint for Patent Infringement" filed Jul. 11, 2016 (57 pages).
Case 2:16-cv-00871-JAD-VCF, Document 31, "Motion to Dismiss Under 35 U.S.C. §101" filed Aug. 12, 2016 (16 pages).
Case 2:16-cv-00871-RCJ-VCF, Document 35, "Plaintiffs' Opposition to Defendants' Motion to Dismiss" filed Sep. 8, 2016 (25 pages).
Case 2:16-cv-00871-RCJ-VCF, Document 40, "Reply in Support of Motion to Dismiss Under 35 U.S.C. §101" filed Sep. 26, 2016 (14 pages).
Case 2:16-cv-00871-RCJ-VCF, Document 42, "Order" filed Oct. 18, 2016 (15 pages).
Case 2:16-cv-00871-RCJ-VCF, Document 46, "Motion for Reconsideration" filed Oct. 31, 2016 (7 pages).
Case 2:16-cv-00871-RCJ-VCF, Document 47, Motion to Dismiss Under Fed. R. Civ. P. 12(B)(6) filed Nov. 1, 2016 (7 pages).
Case 2:16-cv-00871-RCJ-VCF, Document 49, "Plaintiffs' Opposition to Defendants' Motion for Reconsideration", filed Nov. 17, 2016 (11 pages).
Case 2:16-cv-00871-RCJ-VCF, Document 50, "Plaintiffs' Opposition to Defendants' Motion to Dismiss", filed Nov. 17, 2016 (12 pages).
Case 2:16-cv-00871-RCJ-VCF, Document 55, Reply in Support of Defendants' Motion to Dismiss Under Fed. R. Civ. P. 12(B)(6), filed Nov. 30, 2016 (6 pages)
Case 2:16-cv-00871-RCJ-VCF, Document 56, "Reply in Support of Motion for Reconsideration" filed Nov. 30, 2016 (7 pages).
Case 2:16-cv-00871-RCJ-VCF, Document 63, "Order" filed Jan. 4, 2017 (10 pages).
Case 2:16-cv-00871-RCJ-VCF, Document 64, "Bwin's Answer to Plaintiffs' First Amended Complaint" filed Jan. 6, 2017 (15 pages).
Case 2:16-cv-00858-MMD-GWF, Document 1, "Plaintiffs' Complaint for Patent Infringement" filed Apr. 14, 2016 (30 pages).
Case 2:16-cv-00858-RCJ-VCF, Document 19, "Defendant Double Down Interactive LLC's Motion to Dismiss", filed Jun. 7, 2016 (32 pages).
Case 2:16-cv-00858-RCJ-VCF, Document 30, "Plaintiffs' Opposition to Double Down's Motion to Dismiss", filed Jul. 8, 2016 (31 pages).
Case 2:16-cv-00858-RCJ-VCF, Document 51, "Reply in Support of Defendant Double Down Interactive LLC's Motion to Dismiss", filed Jul. 18, 2016 (14 pages).
Case 2:16-cv-00858-RCJ-VCF, Document 58, "Plaintiffs' First Amended Complaint for Patent Infringement", filed Sep. 28, 2016 (38 pages).
Case 2:16-cv-00858-RCJ-VCF, Document 63, "Defendant Double Down Interactive LLC's Motion to Dismiss Plaintiffs' First Amended Complaint for Patent Infringement", Oct. 17, 2016 (31 pages).
Case 2:16-cv-00858-RCJ-VCF, Document 69, "Plaintiffs' Opposition to Double Down Interactive, Inc.'s Motion to Dismiss", filed Nov. 3, 2016 (24 pages).
Case 2:16-cv-00858-RCJ-VCF, Document 76, "Defendant Double Down Interactive LLC's Reply in Support of Motion to Dismiss Plaintiffs' First Amended Complaint for Patent Infringement", filed Nov. 14, 2016 (18 pages).
Case 2:16-cv-00858-RCJ-VCF, Document 83, "Defendant Double Down Interactive LLC's Answer, Defenses, and Counterclaims to Plaintiffs' First Amended Complaint for Patent Infringement", filed Jan. 18, 2017 (19 pages).
Case 2:16-cv-00858-RCJ-VCF, Document 84, "Plaintiffs' Answer to Double Down Interactive LLC's Counterclaims Against CG Technology Development, LLC", filed Feb. 8, 2017 (4 pages).
Case 2:16-cv-00781-RFB-CWH, Document 1, "Plaintiffs' Complaint for Patent Infringement" filed Apr. 7, 2016 (33 pages).
Case 2:16-cv-00781-MMD-CWH, Document 29, "Plaintiffs' First Amended Complaint for Patent Infringement" filed Jun. 13, 2016 (42 pages).
Case 2:16-cv-00781-MMD-CWH, Document 37, "Defendant's Motion to Dismiss Plaintiffs' Amended Complaint Under Fed.R. Civ. P. 12(B)(6)" filed Jul. 29, 2016 (38 pages).
Case 2:16-cv-00781-MMD-CWH, Document 44, "Defendant's Motion for Protective Order Staying Discovery Pending Ruling on Motion to Dismiss" filed Aug. 22, 2016 (12 pages).
Case 2:16-cv-00781-MMD-CWH, Document 45, "Plaintiffs' Opposition to DraftKings, Inc.'s Motion to Dismiss" filed Aug. 24, 2016 (38 pages).
Case 2:16-cv-00781-MMD-CWH, Document 50, "Plaintiffs' Opposition to DraftKings, Inc.'s Motion to Stay" filed Sep. 8, 2016 (12 pages).
Case 2:16-cv-00781-MMD-CWH, Document 57, "Defendant's Reply in Support of it's Motion to Dismiss Plaintiffs' Amended Complaint Under Fed. R. Civ. P. 12(B)(6)" filed Sep. 26, 2016 (19 pages).

(56) References Cited

OTHER PUBLICATIONS

Case 2:16-cv-00781-MMD-CWH, Document 59, “Order” filed Sep. 27, 2016 (3 pages).
Case 2:16-cv-00781-RCJ-VCF, Document 64, “Plaintiffs Motion to Lift Stay” filed Nov. 23, 2016 (6 pages).
Case 2:16-cv-00781-RCJ-VCF, Document 69, “Order” filed Dec. 12, 2016 (11 pages).
Case 2:16-cv-00781-RCJ-VCF, Document 72, “DraftKings' Answer to Plaintiffs' First Amended Complaint and Affirmative Defenses” filed Dec. 27, 2016 (29 pages).
Case 2:16-cv-00801-JCM-VCF, Document 1, “Plaintiffs' Complaint for Patent Infringement” filed Apr. 8, 2016 (31 pages).
Case 2:16-cv-00801-RCJ-VCF, Document 31, “Plaintiffs' First Amended Complaint for Patent Infringement” filed Jun. 13, 2016 (48 pages).
Case 2:16-cv-00801-RCJ-VCF, Document 32, “Index of Exhibits to Plaintiffs' First Amended Complaint for Patent Infringement” filed Jun. 13, 2016 (3 pages).
Case 2:16-cv-00801-RCJ-VCF Document 44, “Defendant Fanduel, Inc's Motion to Dismiss for Failure to State a Claim Upon Which Relief Can be Granted” filed Jul. 14, 2016 (18 pages).
Case 2:16-cv-00801-RCJ-VCF Document 75, “Defendant Fanduel, Inc's Motion for Leave to Supplement Briefing Under LR 7-2(g)” filed Sep. 22, 2016 (3 pages).
Case 2:16-cv-00801-RCJ-VCF Document 77, “Plaintiffs' Opposition to Defendant Fanduel, Inc.'s Motion for Leave [ECF No. 75]” filed Oct. 11, 2016 (4 pages).
Case 2:16-cv-00801-RCJ-VCF Document 81, “Defendant Fanduel Inc.'s Notice of Withdrawal of Motion Seeking Leave to File Supplemental Briefing” filed Oct. 20, 2016 (3 pages).
Case 2:16-cv-00801-RCJ-VCF Document 86, “Plaintiffs' Second Amended Complaint For Patent Infringement” filed Nov. 16, 2016 (70 pages).
Case 2:16-cv-00801-RCJ-VCF Document 87, “Defendant Fanduel's Answer to Plaintiffs' Second Amended Complaint and Affirmative Defenses” filed Nov. 30, 2016 (19 pages).
Case 2:16-cv-00801-RCJ-VCF Document 88, “Defendant's Partial Motion to Dismiss CGT's Second Amended Complaint for Failure to State a Claim Upon Which Relief Can Be Granted” filed Nov. 30, 2016 (14 pages).
Case 2:16-cv-00801-RCJ-VCF Document 94, “Plaintiffs' Opposition to Fanduel, Inc.'s Partial Motion to Dismiss” filed Dec. 19, 2016 (11 pages).
Case 2:16-cv-00801-RCJ-VCF Document 103, “Fanduel, Inc.'s Reply in Support of Partial Motion to Dismiss” filed Dec. 27, 2016 (7 pages).
Case 2:16-cv-00801-RCJ-VCF Document 113, “Order” filed Jan. 4, 2017 (11 pages).
Case 2: 16-cv-801-RCJ-VCF Document 114, “Transcript of Pretrial Conference” filed Dec. 2, 2016 (54 pages).

* cited by examiner

402

Football Gaming Table

503

FIG. 17
Select your bets and press Bet Now to continue.
Balance: $24,700.00
U.S. Open
1st Round
U.S. Open Championship
01 Jeff Brehaut
02 Johan Edfors
03 Andrew Parr
04 Ryan Spears
05 Ian Poulter
06 Justin Leonard
07 Angel Cabrera
08 Bubba Watson
09 Cameron Tringale
10 Sean Farren
12 Casey Wittenberg
13 Bo Van Pelt
14 Michael Sim
15 Graeme McDowell
16 Martin Kaymer
17 Ryuji Imada
18 K.J. Choi
19 Tiger Woods
20 Phil Mickelson
U.S. OPEN CHAMPIONSHIP
WINNER
Log Out
More Games
Active Bets
Bet Now

WAGERING ON EVENT OUTCOMES DURING THE EVENT

RELATED APPLICATIONS

This application is a continuation of U.S. application Ser. No. 13/612,057 filed Sep. 12, 2012 which is a continuation of U.S. application Ser. No. 13/023,551, filed Feb. 9, 2011 (now U.S. Pat. No. 9,005,016 issued on Apr. 14, 2015), which is a continuation-in-part of U.S. application Ser. No. 12/497,668, filed Jul. 4, 2009 (Now U.S. Pat. No. 8,342,946 issued on Jan. 1, 2013), which is a continuation-in-part of U.S. application Ser. No. 12/258,297 filed Oct. 24, 2008 (now U.S. Pat. No. 8,342,966 issued on Jan. 1, 2013), the disclosures of which are incorporated herein by reference in their entireties.

FIELD OF INVENTION

This invention relates to systems and methods for enabling users to wager on an outcome of an event.

BACKGROUND

Many companies offer users opportunities to bet on the winner of a sporting event, such as a race or basketball game, before the start of the event. For example, a betting agent may publish odds for betting on the various possible winners, and users may place bets that a particular player or team will win.

SUMMARY

Various methods and systems are provided for managing a wagering system. In various exemplary embodiments, state information of a live event such as a sports game may be received and processed in substantially real time. During the event, a plurality of possible future states of the event and their associated probabilities (e.g., and odds) may be determined based on the state information, historical information, and current in-game information. A betting market may be created for betting on the possible future states at determined odds. The betting market may be closed, and winning and losing bets may be resolved based on updated state information.

BRIEF DESCRIPTION OF THE FIGURES

FIGS. 11-19 depict exemplary user interfaces for use in various embodiments of the methods and systems disclosed herein, e.g., for various different types of sporting events.

DETAILED DESCRIPTION

Figure 1:
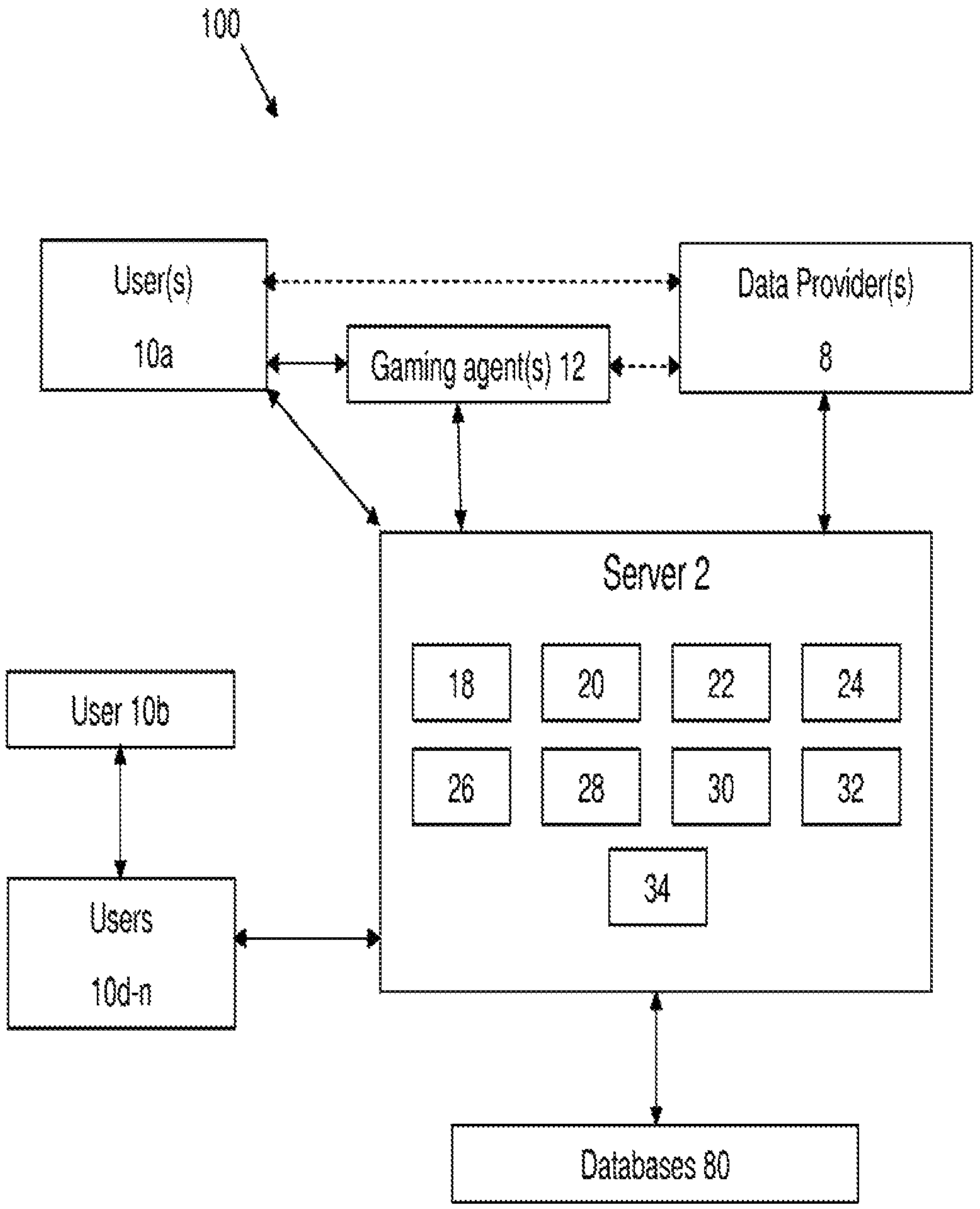
FIG. 1 depicts a system according to at least one embodiment of the systems disclosed herein.

The following sections I-XI provide a guide to interpreting the present application.

I. Terms

The term “product” means any machine, manufacture and/or composition of matter, unless expressly specified otherwise.

The term “process” means any process, algorithm, method or the like, unless expressly specified otherwise.

Each process (whether called a method, algorithm or otherwise) inherently includes one or more steps, and therefore all references to a “step” or “steps” of a process have an inherent antecedent basis in the mere recitation of the term ‘process’ or a like term. Accordingly, any reference in a claim to a ‘step’ or ‘steps’ of a process has sufficient antecedent basis.

The term “invention” and the like mean “the one or more inventions disclosed in this application”, unless expressly specified otherwise.

The terms “an embodiment”, “embodiment”, “embodiments”, “the embodiment”, “the embodiments”, “one or more embodiments”, “some embodiments”, “certain embodiments”, “one embodiment”, “another embodiment” and the like mean “one or more (but not all) embodiments of the disclosed invention(s)”, unless expressly specified otherwise.

The term “variation” of an invention means an embodiment of the invention, unless expressly specified otherwise.

A reference to “another embodiment” in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Other Definitions

An "actual future state" is an actual state of a performance parameter as observed at a time after the performance parameter was observed to be in its initial state. It should be appreciated that if a performance parameter does not change over a certain period of time, its initial state at the beginning of that period may be the same as its actual future state at the end of the time period.

The term "automatically" refers to an action that occurs without human intervention, e.g., an action that is caused by a computer processor in response to a predefined stimulus, condition, or set of conditions.

A "game time duration" means a period of time in a game, such as all or part of an inning, a quarter, a half, a period, and a round. It may also refer to a duration of a tennis set or other sub-event or series of sub-events within an event such as a match.

A "live event" means a game, election, or other event that takes place in real time and has a start time, a duration, and an end time. A live event such as a football game may not have a predetermined start time and end time, e.g., because the game may start late or go into overtime. However, a live event for purposes of this application has an officially recognized start time and end time. For instance, a football game may officially begin on the first kickoff and end when the time in the fourth quarter runs out. Similarly, an election may begin when the first polls open, and it may end when the last poll closes or when a candidate concedes the election.

"Performance parameter" means a metric that measures a performance by one or more persons or things during a live event. A performance parameter may comprise any variable related to a performance that can change during the performance. A performance parameter of a sporting event may comprise, for example: a score, a number of points, a number of yards, a number of runs in an inning, a number of runs in a game, a number of home runs, a number of base hits, a number of doubles, a number of triples, a number of errors, a number of aces, a number of golf strokes by a player on a hole, a number of golf strokes by a player on a plurality of holes, a number of three-pointers, and a number of rebounds. A performance parameter of an election may comprise a number of votes or electoral votes, number of counties won, number of precincts reporting, etc.

The term "real time," when used in connection with an event or occurrence, means that the event or occurrence occurs at the same time as or at substantially the same time as the occurrence of an associated reference event. For instance, receiving and displaying video footage of an event (such as a kickoff of a football game) in "real time" means that the footage is received and displayed at substantially the same time as the event is taking place, as in a traditional "live broadcast" of a sporting event. It should be understood that there are often very small delays between an occurrence and a "real time" display of the occurrence. For instance, it takes a very small amount of time to process a video signal, transmit it to a broadcast tower, transmit it to a receiver, decode the transmission, and display it at a display device. In spite of the slight delay, such a display is still in "real time." It may also take a small amount of time for a reporter or announcer at the game to provide a running audio or text commentary. Similarly, live comedy shows often incorporate a two-second delay to enable sensors to edit any offensive material prior to broadcast.

In contrast, a longer delay between events might enable opportunistic gamblers to exploit the timing difference to their advantage. For instance, if a gaming operator allowed bets up until the "beginning" of a boxing broadcast that lagged twenty seconds behind the real boxing match and a boxer scored a knockout after two seconds, then an opportunistic gambler at the match might exploit this delay by placing a large bet on the winner before the bets closed. However, such a delayed broadcast would not be considered in "real time" in the present application. In the context of the gaming systems described herein, the difference in time between a reference event and a corresponding "real time" display or other event must be small enough that, for purposes of an associated gaming system that intends to prevent cheating, it would be impossible to place bets that would exploit the time difference to the bettor's unfair advantage. Thus, text and audio reports or commentary about an event (e.g., prepared by a reporter or announcer) may occur in "real time" if they meet this standard within the operation of the gaming system.

"State" means the condition of a person or thing (such as an event), or a characteristic of a person or thing, at a specific time or time period. A state of a game at any given time may be defined (at least in part) by such metrics as the score, the players on the field and their respective locations, time left in play, batting order, number of balls and strikes for a given batter and pitcher, etc.

"State information" means information about the state of a person or thing (such as an event). State information may refer to information concerning a status, such as a current status, of a person or thing such as an event. State information may specify or define characteristics of an event, such as time (e.g., game time), place, position (e.g., ball and player positions in a playing area such as a field), temperature, score, inning number, information about whether a team or player is on offense or defense, roster, who is playing, count (e.g., full count in baseball), information about one or more umpires or referees, location of game area (e.g., city of stadium, or whether a game is a home or away game or a game in a neutral area), etc. State information may comprise any measurable characteristic of an event. State information may comprise, or may be derived from, a video broadcast of an event, a running commentary of an event, a data feed describing occurrences of an event, etc.

"Initial state" means a state of a person, thing, or event before an occurrence or specific type of occurrence. For instance, an initial state of an at-bat may be "zero balls, zero strikes." An "end" of an initial state refers to the time just before the initial state changes, e.g., the time just before the first pitch in the at-bat.

"Possible future state" means one or more states that may occur at a future time (e.g., at a future time of an event). For example, the possible future states of an at-bat may be the possible outcomes of the at-bat: hit (single, double, triple, home run), walk, and strike-out. Possible future state may also be referred to as a possible outcome, e.g., associated with a performance parameter.

DETAILED DESCRIPTION OF EXEMPLARY EMBODIMENTS

Traditional gambling systems enable users to bet on the outcome of a game, e.g., which team will win, and by how much. Gaming operators try to determine accurate probabilities for each game outcome (e.g., win, loss, and point spread) so that they can offer competitive odds to potential bettors who may bet on each outcome. The probabilities (and odds) are typically determined prior to the start of the game based on information existing prior to the game, such as historical data related to each team, player, and coaching staff, ratings and opinions of professionals such as sportswriters and other coaches, and other public and proprietary information related to the game. For instance, some gaming operators use complicated proprietary computer algorithms to determine odds based on pre-existing statistical information and other information.

In effect, odds may serve as a gaming operator's "price" to bettors for wagering on a specific outcome (wherein higher odds translate to a lower price for the bettor). When there are a plurality of gaming operators offering odds on a particular outcome to a plurality of bettors, the gaming operators compete with one another to offer a competitive price that will attract bettors who seek the highest payout for their betting dollar. Thus, gaming operators may determine odds based in part on the odds offered by competing gaming operators. Betting behavior can also affect odds. For instance, a high demand for bets that the Chicago Cubs will win their next game against the Phillies may drive up the effective price for that bet. Accordingly, as in other competitive marketplaces, odds determinations often reflect a "market price" for each game outcome, as gaming operators adjust their odds based on the market. The effective market price can change over time as the betting market changes and new relevant information is disclosed, such as an injury of a key Cubs pitcher a day before the game. Notably, amounts wagered by losers on one side of the bet can be used to fund the payout to winners on the other side of the bet. Thus, in large betting markets where there are many bettors on each side of a bet, gaming operators may adjust their odds in an effort to balance the potential payouts on either side of the bet.

However, odds determinations often do not reflect a consensus "market price," e.g., when there are a limited number of market participants or there is insufficient time for the market to assimilate new relevant information into a stable market price. For example, some gaming operators allow users to bet on performance parameters within a game, such as whether a particular player will strike out in a particular at-bat in a baseball game. The betting market is typically opened manually immediately prior to the in-game event, and the odds are often determined manually "on the fly." Even if another gaming operator offered a similar bet, the quick timing of such a bet may prevent gaming operators and bettors from comparing the different odds offered. In these circumstances, the gaming operator attempts to offer odds without the benefit of competitive betting market based entirely on the operator's best assessment of the probabilities of the various outcomes.

Gaming operators can face many challenges in offering bets on these types of in-game events as compared to typical "market price" bets on the winner of a game. It takes time and labor to identify a potential in-game betting market (e.g., a market for betting on the outcome of a specific at-bat), determine accurate probabilities and odds for each outcome, offer the odds to bettors, take bets, determine an outcome, and then pay the winners. Because traditional systems require many of these actions to be performed manually "on the fly," limited manpower effectively limits the number and extent of in-game wager opportunities a gaming operator can offer. Bets on an in-game event often require a calculation of probabilities and odds in a very short time frame. It can be more difficult to calculate an accurate probability of an in-game outcome when new relevant information becomes available during the game, such as an injury to a quarterback. Inaccurate odds can lead to unnecessarily high prices (and therefore fewer bettors) or unnecessarily low prices (which translates to unnecessarily high payouts to winners).

According to various embodiments of the present invention, a system may enable users to bet on in-game events, such as whether a particular baseball player strikes out in a particular at-bat. The system may automatically receive general game information (e.g., team names, player rosters, start time, etc.) from a data feed or other source. From the same data source (or another source), the system may also automatically receive a stream of real-time game information, such as elapsed time, batting line-up, runs scored, errors on a play, pitch information (strike, ball, foul), etc. In some embodiments, where more than one data feed provides similar state information, the system 100 may use the data feed that provides information earlier.

Odds for each event, such as a strike-out, may be calculated based on an odds database and algorithm stored on the system. The algorithm may use information from the real sport (such as a player's batting average), and may be updated based on in-game events. (E.g., if Barry Bonds strikes out four times with the same pitcher, his odds of getting a hit off that pitcher may decrease.)

As soon as a specific gambling event is completed (e.g., as soon as Barry Bonds finishes his at-bat by striking out or hitting a home run), the system settles the bets placed on that betting event. At the same time (or another time), the system may open the betting for another event (e.g., the next at-bat). In one embodiment, a human operator clears the bets after each event. For example, the human gaming agent may select "strike out" immediately after Barry Bonds strikes out. This operation may cause the system to immediately settle all the bets on the present Barry Bonds at-bat and also open bets for the next betting event (e.g., the outcome of the next batter's at-bat). In other embodiments, the system may use automated information (e.g., a data feed) to determine event outcomes (like a strike-out) in real time. In some embodiments, human gaming agents may assist with error correction to ensure that the system identifies correct outcomes and resolves all bets properly.

Users may place bets and otherwise interact with the system and other users via an interface such as a gaming table or mobile touch-screen gaming device, which may be configured to display a live TV feed of an event such as a baseball game with an optional touch-sensitive betting interface overlay. In one embodiment, when Barry Bonds steps up to the plate, a user may touch the image of Barry Bonds (or other image or icon) to trigger the betting interface overlay that enables the user to select and place a specific bet concerning Barry's at-bat. To bet that Barry will get a single, the user may touch an image of first base (or provide another appropriate input).

Various embodiments of the system may enable gambling on many different types of outcomes within a single game or other event, such as whether a particular runner steals a particular base, the number of runs scored in an inning, whether a pitcher throws a ball or strike on a given pitch, etc. The system may open and close each betting event based on the start and finish time of that particular event. The system can also be applied to a variety of sports as well as other events, such as elections (e.g., whether Barack Obama will win New Hampshire in the upcoming 2008 presidential election). It should be appreciated that various embodiments of the invention may manage many different betting markets at simultaneous or overlapping times. Each betting market may be opened, closed, and resolved based on the terms of that specific betting market, independently of other betting markets.

Thus, various embodiments of the invention may comprise a system that monitors real game events in real-time in order to accomplish the following, for example:

(1) identify a specific in-game event (e.g., an at-bat) and the possible outcomes of the event (e.g., base hit or strike-out), e.g., based on streaming game information received in real time;
(2) determine probabilities and odds for the potential outcomes;
(3) create a market for placing wagers on the in-game event (such as a wager for a particular at-bat), and open the market so that players can place bets;
(4) identify the outcome in the real game (e.g., strike-out);
(5) settle the bets based on the outcome (e.g., pay any winners); and
(6) identify additional events and possible outcomes, and open betting markets for those events (e.g., the next at-bat). Of course, the timing of various markets may overlap; e.g., a bet on a specific at-bat may overlap in time with a bet on the number of runs in an inning.

In accordance with at least one exemplary embodiment, a stream of state information of an event such as a live sporting event is received in real time. A computer processor determines an initial state and a plurality of possible future states for each of a plurality of performance parameters of the event based on the state information. A probability of occurrence is calculated for at least one of the plurality of possible future states for each of the performance parameters based on historical data related to each performance parameter. The plurality of possible future states may be mutually exclusive from one another. During an initial state of the first performance parameter, a signal operative to open a first market for betting on the at least one of the plurality of possible future states is transmitted. The first market incorporates odds based on the calculated probability of occurrence. After transmitting the signal operative to open the first market, an end of the initial state is determined After transmitting the signal operative to open the first market and before the end of the initial state, a signal operative to close the first market is transmitted. After transmitting the signal operative to close the first market, an outcome of the first performance parameter based on the received stream of state information is determined A signal operative to resolve one or more payouts of the first market is transmitted. The signal indicates the outcome of the first performance parameter. Based on the outcome of the first performance parameter, a signal operative to update probabilities for a plurality of possible future states for a plurality of second betting markets is transmitted. In another embodiment, a processor capable of performing these actions is provided. The processor is comprised in an apparatus comprising a processor and a memory, in which the memory stores instructions which, when executed by the processor, direct the processor to perform the steps.

According to another exemplary embodiment, various systems and methods are provided for creating betting markets. The system may comprise at least one processor and at least one memory that stores instructions which, when executed, direct the processor to perform one or more steps. State information of a live event may be received in real time. The live event may comprise a sporting event played by human players according to predetermined rules that are used to determine at least one winner of the sporting event. An initial state and a plurality of possible future states of a performance parameter of the live event may be determined based on the state information. A first betting market for betting on at least one of the plurality of possible future states may be created. The act of creating a first betting market may comprise (1) determining by the processor probabilities for the plurality of possible future states, and (2) based at least in part on the probabilities, determining by the processor odds for betting on at least one of the plurality of possible future states. After creating the first betting market, a first bet comprising a selection of one of the plurality of possible future states may be received from a first of a plurality of users. After receiving the first bet, the first betting market may be closed prior to an end time of the initial state. An instruction signal to close the first betting market may be transmitted from the processor. An actual future state of the performance parameter may be determined. The processor may determine that the possible future state selected by the first user is the actual future state. A payout may be paid to the first user based on the first bet and the act of determining that the possible future state selected by the first user is the actual future state. The sporting event may occur during an event time duration such that the sporting event begins at the beginning of the event time duration and ends at the end of the event time duration. The sporting event may comprise a plurality of portions of the event occurring during sequential portions of the event time duration, in which a plurality of possible future states comprises a possible future state occurring at the end of one of the sequential time periods, and in which at least one betting market is created for each of the sequential time periods.

FIG. 1. Exemplary System for Offering and Managing Wagers

Some embodiments of the present invention provide systems and methods for arranging and/or displaying output elements at a network site.

Server 2 may comprise one or more processors, computers, computer systems, computer networks, and or computer databases. Server 2 may comprise modules 18-64. Server 2 may also comprise one or more databases, such as databases 80. Server 2 may communicate with users 10. For instance, server 2 may communicate with a user 10 computer, such as a browser of a user computer, e.g., over the internet.

Modules 18-48 may comprise one or more processors, computers, computer systems, and/or computer networks.

Databases 80 may comprise one or more processors, computers, computer systems, computer networks, and/or computer databases configured to store information. Each of databases 80 may communicate with server 2 and modules 18-64. For instance, server 2 and modules 18-48 may store information in databases 80 and may also use information stored in databases 80.

FIG. 1A depicts a system 100 for offering and managing wagers.

The system 100 may comprise one or more servers 2 coupled to one or more databases 80, one or more data providers 8_a_-8_n_, one or more end users 10_a_-10_n_, and one or more gaming agents 12. The data providers 8_a_-8_n_, users 10, gaming agents 12, and server 2 may each communicate with each other. Users 10 may also communicate with other users 10, e.g., to propose a wager against another user 10.

Users 10_a_-10_n_ may comprise one or more persons who receive wager opportunities, propose wagers, and/or make wagers via agents 12 and/or server 2. Users 10 may provide or receive information related to an event or one or more wagers associated therewith. For instance, a user 10 may comprise a gambler who receives information about an event, such as real-time information about a sporting event. Users 10 may interact with gaming agents 12, server 2, and/or other users 10 to create and place wagers (and to receive offers to place a wager) regarding one or more performance parameters associated with an event, such as the number of runs scored in an inning of a baseball game. As used in this application, users 10$a$-10$n$ may also refer to a user's interface to other system 100 components (like server 2), such as a user's PDA, computer, a program running on a user's computer such as a computer web browser like Internet Explorer™, or other processor associated with a user 10 which may communicate with data providers 8, gaming agents 12, and/or server 2.

In some embodiments, a user 10 may configure a user interface (and/or a module of server 2) to perform actions on behalf of a user, e.g., automatically. In this way, the system may provide for automatic bets. For example, a user 10 may configure betting actions to be performed based on one or more criteria. For example, one or more bets (e.g., in a pre-configured amount, or an amount that will be determined based on pre-configured criteria) may be triggered by the occurrence of one or more actions or events, e.g., during a game event. For example, a user 10 may set preferences (e.g., at user interface 10 or server 2) so that a bet will automatically be placed if, for example, a team becomes a six-point underdog (e.g., based on a betting line or other odds provided by a specific odds provider, or an average or weighted average of a plurality of odds providers). For example, such bet may be placed automatically (e.g., before a game or during a game) as a line moves over time from 5 points to 6.5 points, such that the bet is submitted at a time when the posted spread is 6 points. A user could also set up an automated betting management tool to automatically bet on the other side (e.g., to hedge an existing bet on a first side) under other circumstances, e.g., if the point spread drops from six to four.

In some embodiments, automatic bets may be placed, modified, and cancelled based on various circumstances. For example, a user may configure an automatic bet to be triggered every time the "line" moves, and to withdraw any previously offered bets each time the line moves. Thus, a new bet may be submitted and an old offered bet (or any unaccepted portion thereof) withdrawn whenever the line moves. New offered bets may be offered at odds tied to the new line. In another example, a user may configure automatic bets any time a "yes-or-no" bet is offered by the system 100 concerning a particular favorite player, such that the user bets that the player will ("yes") achieve the intended positive result (e.g., will the particular runner get on base? will the quarterback throw more than 10 completions this quarter? will the server serve an ace? will the player win this set? will the specific racer place in the top 3? etc.). The user may pre-configure an automatic betting module (e.g., at user computer or server 2) to only accept bets of a specific type that are within specific odds ranges. For example, the user may configure an automatic betting module to only accept bets of a particular type (e.g., concerning an outcome of a favored player's at-bat) that pay a payout of at least 6 to 1, or a payout of between 2 to 1 and 4 to 1.

In some embodiments, the automatic betting module may display an interface for configuring criteria such as bet types (e.g., bets concerning points scored, or total points scored in a half), players involved, odds ranges, triggering conditions (e.g., a threshold number of points scored, e.g., within a certain amount of time by a particular player or team or in a game), and cancelling conditions. Such criteria may specify any type of measurable state conditions (e.g., temperature, identify of particular players such as pitchers, e.g., "each time A-Rod is at bat, bet $100 on A-Rod to get on base if the payout is at least 4 to 1 unless the immediately prior at-bat is a strike-out").

Data provider(s) 8 may comprise any person, processor, information service, or other entity that publishes or otherwise provides information concerning an event or performance parameter to server 2, users 10, and/or gaming agents 12. For example, a data provider 8 may comprise a data feed, sports announcer, event secretary or record-keeper, data service, website, or other source of information relevant to an in-game event. The information may comprise current information about an event or sport, including but not limited to information about: one or more players, coaches, a team roster, current weather conditions, and occurrences in the event (such as the outcome of a specific at-bat). The data may also comprise historical information about people or other entities associated with an event, and any other information that is related to an event. In some embodiments, the data may include information that may be relevant to a probability of an outcome of a performance parameter within the event. In some embodiments, the data may include information that may be of interest to a user 10 watching the event.

Data provider 8 may provide event and/or wager-related information in real time, as information first becomes available to the general public, or at another time after an event. Data provider 8 may provide such information in any one or more of a variety of forms and means such as video (e.g., a sporting event broadcast), audio (radio broadcast), text (e.g., the words of a radio broadcast in text form), or other data that conveys information concerning the event. Data may be provided at a variety of different timings. In some embodiments, data may be provided in periodically, continuously, or continually, e.g., via a data feed (e.g., a stream of data that includes real time updates of event information, such as a running commentary of a game in text or audio format). In some embodiments, data may be provided after an event.

In some embodiments, data provider 8 may provide to server 2 (and/or agents 12 and/or users 10) a video broadcast of an event comprising a plurality of different camera angles. Server 2, agents 12, and/or users 10 may then select among the different camera angles for viewing. For instance, a user 10 may select to view three different camera angles of a football game—one focusing on a quarterback, one from behind the defense, and one a top-down view—from among ten different camera angles, including one camera filming the commentators. Data provider 8 may also provide processed data, such as video simulations of an event (e.g., a movement of "X's" and "O's" representing to show the movement of offensive and defensive players of a football game during a particular play).

Gaming agents 12 may comprise one or more persons who process, facilitate, manage, provide, update, or otherwise interact with information associated with an event or one or more wagers associated with the event. For example, gaming agents 12 may comprise one or more croupiers, dealers, casino employees, server 2 administrators, or other personnel The server 2 may comprise a computer, server, hub, central processor, or other entity in a network, or other processor. The server 2 may comprise input and output devices for communicating with other various system 100 elements.

In some embodiments, the server 2 may be comprised in an end user's computer 10, e.g., as a toolbar in a user's web browser or another program running on the user's computer.

The server 2 may comprise a plurality of modules, such as module 18. Each module may comprise a processor as well as input and output devices for communicating with other modules, databases, and other system elements.

A database 80 may be coupled to the server 2. The database 80 may comprise a plurality of databases as described below. Databases 80 may store information about users, elements, and other information.

The modules may function separately or in various combinations. While the modules are shown within a single server, the modules may also operate among several servers. The modules may communicate with a plurality of databases, which may also function collectively or separately.

The modules of server 2 may store, access and otherwise interact with various sources of data, including external data, databases and other inputs.

Probability Module 18 may determine a probability of occurrence for one or more future states of a performance parameter. Probability module 18 may determine a probability of occurrence based on performance information, such as information about a team or player's historical performance prior to the event. For instance, probabilities may be determined based on factors such as a player's performance in at least one of the following performance categories: batting average, points scored, yards run, number of carries, runs batted in (RBIs), bases stolen, home runs, pass completion percentage, on base percentage, total bases per at bat, number of errors, number of aces, double fault percentage, free throw percentage, number of rebounds, handicap, number of golf strokes, and a number of strikeouts. Probabilities may also be determined based on current performance information, such as information about a player's performance during the live event.

Probability module 18 may also update one or more probabilities based on information that becomes available during an event. In some embodiments, the information may be updated in real time or substantially real time. For instance, a probability associated with a particular outcome of a performance parameter (such as the outcome of an at-bat) may be determined based on information relevant to the parameter existing prior to the event (e.g., a batter's historical batting average prior to a baseball game) and then updated based on a information relevant to the parameter that occurs during the live event (e.g., a batter's batting performance of a particular at-bat during the game). Probability module 18 may update probabilities associated with a number of different performance parameters and outcomes based on current game information.

Probabilities for various possible outcomes (and the corresponding odds of those outcomes) may be updated in real time. Accordingly, a single occurrence during an event (such as an injury to a quarterback) may trigger a change in the odds for a number of existing betting market outcomes, such as the number of passing yards, running yards, and points for that quarterback; the team's chances of winning; the number of points in any subsequent quarters; the number of total interceptions in the game; etc. In this sense, important occurrences in an event can have a "ripple effect" that affects one or more betting markets.

In some embodiments, probability module 18 may determine probabilities based on injuries, e.g., player injuries before or during an event. Player injury information may be determined as part of the state information of a game, e.g., from trusted sources. For example, football player injury information may be determined from an official site such www.nfl.com (e.g., and may also be determined from message boards, facebook, and other potentially less reliable sources).

It should be appreciated that some injuries may cause a player to be removed from play, and thus may cause a change in the team's roster for the particular game (either before the game or during the game), while players may continue to play with other injuries, e.g., with some type of diminished capacity that may affect probabilities for some or all types of betting events that may be affected by the injured player. The effect of particular injuries and injury types in a particular context (e.g., leg injury to a high-scoring basketball forward or a right wrist injury to a left-handed cornerback, e.g., that occurs before or during a game) may be measured against outcomes over time, e.g., to measure the effect of such injuries on game performance characteristics. Such historical information may be used to determine probabilities associated with injuries for a particular betting event. For example, it may be determined that injuries of a particular type (e.g., minor injuries) to a particular type of player (e.g., a player in a position of lesser importance, or a player who is not a top-rated player on a team) make little difference to the outcome of a game or a particular play, etc. In another example, it may be determined that injuries of another type (e.g., hand or leg injuries) to a particular type of player (e.g., a high value ball-carrying player of a football game) may have a more measurable, negative impact on that player's (and team's) performance for various wagerable events (such as total points scored, and final winner of a game). However, it may be determined that such effect is less than that determined by other sources of information, such as other websites.

If various sources are determined to over-estimate the effect of such injuries (or other factors that affect probabilities or odds for wagerable events), then probability module 18 may discount such sources accordingly. For example, such source may have a high trust score (see below) for game outcomes, but a low trust score when it modifies its probabilities based on a recent injury. In some embodiments, if a source is known to over-estimate the effect of the injury (or other factor) on probability by a consistent amount, then the use of information of such source may be impacted accordingly. For example, if the source consistently over-estimates the negative impact of an injury on a particular type of probability by double, then probability module 18 may account for this by estimating the negative impact of the injury as only half of that determined by the source.

Probability module 18 may use algorithms that enable quick calculation and modification of probabilities of outcomes (and accordingly the calculation of their corresponding odds).

In some embodiments, probability module 18 may determine probabilities based on various sources of information. In some embodiments, the different sources of information may be accorded different weights in a probability algorithm. For example, information that is more relevant to a particular betting circumstance (e.g., a current state of a game) may be accorded a greater weight than information that is less specifically relevant. Factors that may affect relevance for particular information include state information, such as weather conditions, temperature, player identities, and other factors, and other information associated with a particular bet or betting outcome. Information that is more statistically significant (e.g., derived from a larger sample size) may also be considered more relevant than information with a smaller sample size.

For example, for a particular at-bat (or a particular pitch) of a specific batter, probabilities for the various at-bat outcomes may be determined in part based on the batter's batting average (e.g., determined prior to the game). State information for the at-bat may define other information that may be relevant to the probabilities of the various outcomes, including batter and pitcher information such as the identify of the specific pitcher, the pitcher's (and batter's) record in recent games, whether the pitcher or batter is left- or right-handed, the pitcher's (and batter's) record against the present team, the pitcher's (and batter's) record in away games (or home games) if the game is an away game (or home game), any current pitcher (and batter's) injury information (e.g., if the pitcher or batter is recovering from an injury), the pitcher's (and batter's) most recent pitches (or bats) during the game (e.g., whether the pitcher is pitching a higher percentage of fastballs in the present game than in prior similar games, and similarly whether the batter is hitting more fastballs in recent games), etc. Other state information may be relevant, such as weather conditions, temperature, team records, managers, batting order, placement and identify of persons on base, count (e.g., full count), and other information. Historical information such as statistics that account for one or more of these factors may have special relevance to the probability. For example, the player's batting average against the specific pitcher may be weighted more heavily than the pitcher's general batting average (e.g., if there is a statistically significant sample size of at-bats against this pitcher). Other relevant information for determining the at-bat may comprise the batter's historical performance at the current temperature, with the current count (e.g., two balls and one strike), against left-handed pitchers (if the pitcher is left-handed), when the team is down by more than two points after the sixth inning (e.g., if the team is down by more than two points after the sixth inning), etc. In other words, historical information associated with the current state may be used to determine probabilities based on the current state.

In some embodiments, probabilities may be determined based on one or more sources of information. For example, odds may be provided on various websites for the outcome of a particular game, such as a soccer game. Probabilities and odds for the soccer game may be determined based on the odds provided by the various sources. The determination may be weighted according to a trust score for the information source. Trust scores may be determined based on the source's track record for a particular type of information (e.g., a particular type of odds or probabilities provided, such as the "line" of a game or a prediction of a winner). For example, a source that provides a "line" that tends to be more accurate than another source's "line" may have a higher trust score than the other source for providing lines on games.

For example, it may be determined that one source (e.g., at a particular casino) provides a "line" to professional gamblers, who may demand more accurate lines, while another source (e.g., at a touristy casino) provides lines to predominantly tourists, who typically do not demand a perfectly accurate line. The source providing lines to professional gamblers may be accorded a higher trust score, and probabilities and odds provided by such source may be accorded greater weight in determining probabilities and odds.

Information from a source with a higher trust score (for the particular type of information) may be weighted more heavily than information from a source with a lower trust score (for the type of information). For example, one source may be determined to provide fairly reliable probabilities or odds for the winner of soccer games, but it may be unreliable for assessing how many goals will be scored in such games. Another source may provide more reliable total goal information, but less reliable predictions about who will win. For example, a probability determined for a particular game may be a weighted average of the probabilities (e.g., lines) provided by various sources according to the source's trust score. For example, a highly reliable source may have a trust score that causes its predictions to be weighted three times more than information from a less reliable source.

In some embodiments, trust scores may be determined based in part on volume, such that a source with a larger volume of bets (e.g., a source that provides a "line" and has a large volume of bets on both sides of that line) may be weighted more heavily than a source with low volume. In some embodiments, information from general sources such as facebook and twitter, which often publish unfiltered rumors, may be accorded lower trust scores (but still be considered). However, particular users of sites may, over time, be determined to provide accurate information. Accordingly, a particular facebook id may be accorded a higher trust score if information from that source proves to be reliable (e.g., by measuring outcomes against the source's predictions).

In some embodiments, probabilities may be determined based in part on user information. For example, probability information may be determined based at least in part on information about bets made by successful bettors. For example, if a particular bettor is determined to place accurate bets (e.g., based on winning a percentage of bets or betting volume over time above a configurable threshold, such as 70% of betting volume over two months), then probability module 18 may attribute a higher probability to the outcomes on which such bettor places wagers. In some embodiments, probably module may modify a determined probability based on new bet information from such bettor(s). Similarly, the probabilities of outcomes bet on by known "losers" may be discounted. Such "losers" (e.g., who lose 70% of their betting volume over a period of time) may have low trust scores (or in some cases "high" trust scores for reliably predicting the wrong outcome).

Information about specific bettors may be determined based on bettor behavior. For instance, server 2 may download cookies onto such users' computers to monitor their computer activity, such as websites visited, emails received, chats, etc. In some embodiments, probability module 18 may determine which sources are used by such reliable (or reliably wrong) users, and determine trust scores for the sources used by these users (e.g., websites visited by the user that provide probability information). Such sources may be accorded high trust scores based on their association with the winner, or their trust scores may be determined independently based on measured track record (e.g., by directly monitoring the source's predictions against actual outcomes).

Odds module 20 may determine odds, e.g., based on one or more probabilities determined by probability module 18 and/or other information such as information about one or more users. Odds module 20 may adjust odds over time. Accordingly, the odds for a given bet may change during the "betting window" (i.e., the time between the opening and the closing of a betting market wherein bettors may bet on a given outcome). Odds module 20 may determine or adjust odds based on various factors, such as the number and amount of bets on a particular outcome of set of outcomes; a "cut", percentage, or other fee to be paid to another party such as a casino or "the house;" other "mark-ups"; the market for a particular bet; and other factors. For example, odds may be adjusted in a similar manner and for similar reasons that odds are adjusted over time for a particular bet at a popular Las Vegas casino on a specific team to win the Super Bowl. For example, odds may be calculated and adjusted based on statistical information determined. For example, odds may be determined, e.g., by one or more elements of the system (or outside parties), based on historical data and current information, such as current weather information (e.g., whether it is raining or snowing, the temperature at the site of or in the vicinity of a particular sporting event that is the subject of the particular wager for which odds are being determined), prior performance information about a user (e.g., by determining odds for a particular at-bat based on a player's batting average, e.g., against a certain pitcher, to determine the odds that the player will hit a single (or double, triple, etc.) against that pitcher), and other information described herein that may be relevant to a determination of odds.

Amounts wagered on a losing bet can be used to pay payouts to a winning bet. Accordingly, in some embodiments, odds module 20 may adjust odds for one outcome based on the amount wagered on the outcome to ensure that payouts for that outcome can be satisfied if it becomes the winning outcome. Accordingly, where there are only two possible outcomes (e.g., win or lose), and there are many large bets on one outcome (win) and a small number of small bets on the other (loss), then the odds may be adjusted for future bets (or prior bets) to try to minimize the exposure of payouts for a win outcome Improved odds for a loss bet may attract more bettors to bet on loss, which would help minimize the exposure to the "win" payout.

In some embodiments, odds module 20 may determine odds, e.g., periodically or continually, based at least in part on liability and/or hedge information. Liability information and hedge information may comprise information about the potential payout amounts to one or more users in the event that one or more bettors wins a bet on a particular betting event. Liability and/or hedge information may also comprise information about changes in odds, and how a change in odds for a particular betting event may affect future betting (e.g., number of bets, timing of bets, and betting amounts) for the event (e.g., a particular outcome, such as a run occurring during a particular at-bat). In some embodiments, odds module 20 may determine odds or adjust odds to minimize the potential liabilities of the system should any particular betting outcome take place (e.g., and the system must pay a payout to the winners who bet on that outcome). For example, odds module 20 may determine, e.g., continuously or periodically determine (e.g., every second, two seconds, five seconds, ten seconds, minute, hour, day, etc.) an amount (e.g., a net amount) of exposure to a particular outcome. The exposure may be a net potential liability of amounts owed to potential winners of a bet minus income received from losing betters on a different side of the winning bet. In other words, the exposure may be the amount that the house will "lose" in the event of a particular outcome.

Those of skill in the art will appreciate that if a large number of users bet large amounts on a first of two possible outcomes and few users bet small amounts on the second of the two possible outcomes, then if the first possible outcome takes place, then the "house" will have a large liability to pay out the winning users. The "house" may keep the amounts wagered on the second possible outcome (which did not occur, and so those who bet on that outcome would lose their bets), and so the house may therefore use some of those funds to pay the winners. The system could use funds kept or received from those who bet on the second outcome to pay the winners who bet on the first outcome.

For example, in some embodiments, odds module 20 may move a "betting line" based at least in part on the amount of betting liabilities on both sides of the bet.

In some embodiments, exposure may be traded or hedged among or between various betting parties. For instance, a "house" for one set of sports bets may trade some of its exposure to one type of bet by making a hedge bet with the "house" of another casino. Different "houses" may pool their bets or hedge against one another to minimize their net exposure to their clients. For example, one house may be overexposed to one team winning, while another house is over-exposed to that same team losing. The two houses can sell a portion of their bets to one another, or make new bets with one another, that would offset all or a portion of this risk. In this way, different betting houses can hedge their exposure to client bets and effectively "buy insurance" against their exposure.

For example, odds module 20 may change the odds to make it less favorable to the better to bet on a particular outcome where there is a greater liability if that outcome takes place. For example, if the odds module 20 determines that the system must pay out $10 million if there are at least five runs in the sixth inning of a baseball game, but must pay out $20 million if there are four or fewer runs in the sixth inning, then odds module 20 may change the odds so that future bets that there will be four or fewer runs in the sixth inning will have worse payouts than before. Similarly, odds module 20 may also improve the odds for betting that there will be at least five runs in the sixth inning. In this way, odds module 20 may modify odds to encourage bettors to select a bet that would decrease the exposure of the system in terms of net potential payouts on the particular bet.

In another example, if the odds module 20 determines that the system must pay out $10 million if the Pittsburgh Steelers beat the Indianapolis Colts in a current football game, but must pay out $20 million if the Colts beat the Steelers, then odds module 20 may change the odds so that future bets that the Colts will beat the Steelers will have worse payouts than before. Similarly, odds module 20 may improve the odds for betting that the Steelers will beat the Colts.

For example, odds module 20 may modify the expected payout for one or more particular outcomes (e.g., on one side of a bet, or on both sides of a two-sided bet) by 2%, e.g., one time or periodically every ten seconds (or other time increment) until the liabilities on all sides of a bet are "evened out" such that the system's exposure (e.g., net exposure) to payouts for any particular outcome are below a threshold amount. For example, odds module 20 may modify odds (e.g., by decreasing odds on one side of a bet and increasing odds on another side of a bet) until the system determines that the system will receive more money than it will lose for every possible outcome. Accordingly, for example, in determining odds for a particular bet, odds module 20 may determine odds based on historical data such as batting averages and weather information, and then modify such odds periodically based on the "exposure" of the system to the winning payouts of any particular betting outcome. The odds determined for the bet may be the modified odds.

In some embodiments, odds module 20 may change odds, a price, a fee, a "spread," or other betting parameter to encourage or discourage a particular bet on a particular outcome.

In some embodiments, odds module 20 may update odds (and/or prices, spreads, and other betting parameters) for a particular betting outcome or betting event at one or more different times. In some embodiments, odds module 20 may update such information each time a new bet is received by the system, or after every 10 (or another number) bets are received, or after a predetermined amount of time (e.g., 10 seconds).

Updates of the odds, prices, spreads, and other parameters may be reflected in a user interface and the wager offers offered to users. For instance, users may be offered wagers at the updated odds, spreads, etc.

In some embodiments, odds offered to one or more users for a particular bet may be determined based at least in part on information about one or more users (e.g., in addition to other information as discussed above).

In some embodiments, odds module 20 may determine odds for one or more bets based on information provided by one or more users. For example, users 10 may offer specific odds for a particular bet or set of bets. Such odds may be different from odds offered by a "house", or odds otherwise determined by odds module 20 based on probability information. For example, a user may submit odds that may be displayed to, and accepted or rejected by, one or more other users. In one example, odds module 20 may publish odds of 3 to 1 that a particular better will get on base at a current at bat. A user may propose odds of 2 to 1 (or 4 to 1) for the same bet. The 2 to 1 (or 4 to 1) odds may be published to other users, e.g., next to the currently offered 3 to 1 odds (e.g., in a different font or color to indicate that the odds were proposed by a user). It should be appreciated that the system may charge a commission (e.g., a flat fee or percentage of winnings or amount wagered) for any bet between users. Such commission may be charged to one or more user accounts (e.g., betting accounts stored at server 2), e.g., at the time a bet is accepted or at the time the bet is resolved as a win or loss for each bettor.

The user may also propose an amount of a bet at those odds. The amount (or portion thereof) may be accepted by another user. Thus, the user may propose odds of 4 to 1 for the bet in an amount of 100 dollars, and another user may accept the bet in an amount of 50 dollars, such that the two users are effectively taking two different sides of the bet. (E.g., one user may accept the other side of a bet proposed by another user.) Other users may accept bets up to the total amount (e.g. one bet at 50 dollars, another at 30, and another at 20).

In some embodiments, odds module 20 may determine odds based at least in part on odds or other information determined based on or provided by one or more users 10. For example, odds for a particular bet may be determined as (or based on) an average of odds offered by a plurality of users. Such average may be weighted according to amounts offered by users at those odds, e.g., such that odds submitted by a user with a proposed bet of $100,000 are weighted more (e.g., ten times more) than odds submitted by another user with a proposed bet of $10,000.

In some embodiments, odds offered to a particular user may be weighted based on information (such as historical information such as historical betting information) about the user. For example, if a user is known to make a certain type of bet (e.g., a bet on a certain favored team to win), then odds may be provided to that user for that type of bet that may be different from odds for the same bet offered to other users. Such odds for the particular user may be better (or worse) than the odds offered to others. For instance, if a bettor is known to usually bet on the Colts to win, then odds may be offered to that user that are more favorable (or less favorable) for the Colts to win. Offering more favorable odds may attract that user to the betting system, and may engender brand loyalty to the system 100. Conversely, offering less favorable odds may increase the system's profit margin.

Information about users may be determined as discussed above. For instance, websites visited by the user (and other information) may be monitored, e.g., via cookies. Odds may be offered to the user based on such user activity, e.g., information (such as odds information) provided to the user via other sources. For instance, it may be determined that a user recently visited a site that specifies odds for a particular event at 4 to 1, while the system has currently determined the odds to be 6 to 1. While odds of 6 to 1 may be offered to other users, odds module 20 may offer odds of 5 to 1 (or 4 to 1) to the particular user.

In some embodiments, users may bet on what odds will be for a particular bet. For example, users may bet that the line will be +6 (or above +5) for a particular bet at a specific time (e.g., that the line on the Saints vs. Eagles game will be at least +5 for the Eagles at the time of kick-off), while other users may bet against those users or propose their own bets concerning the odds. Odds determination module may determine odds for such betting events (or other related betting events) based on such user bets, e.g., based on the volume of bets made for a particular set of odds. For example, if odds module 20 determines that the line for a particular game is +3.5, and 80% of participating users bet (e.g., a volume above a certain predetermined threshold) that the odds for the game will be +2, then odds module 20 may lower its odds, e.g., to +3 or +2.5 (or +2).

Any odds determined by odds module 20 or probability module 18 may be offered to one or more users for betting.

User communication module 22 may communicate with users 10. User communication module 22 may output to users via a communication device and receive inputs from users via a communication device. Communication devices may include cell phones, PDAs, computers, GPS devices, touch-sensitive displays, video game consoles, video game input devices such as controllers, electronic displays at a casino table, touch-sensitive displays, mouse, keyboard, image-recognition devices, and other devices.

In some embodiments, users 10 may maintain an account with an entity associated with a gaming server 2, and communication module 22 may require users to log in before accessing the account. The account may store and manage user bets in a manner similar to how an online brokerage account manages investments.

User-User communication module 24 may enable users to communicate with one another, e.g., to suggest bets to one another. For instance, user-user communication module may comprise a communication system that enables or facilitates enabling a user 10*a* to communicate with another user 10*b* via phone, text messaging, email, wireless communication, wireless gaming device, or other devices and systems for communicating. In some embodiments, a user 10 may suggest a bet to another user (e.g., one user may propose to bet on one outcome if another user bets on an outcome contrary to that outcome, e.g., one user bets a win while another bets a loss), and user-user communication module may publish the proposed bet (e.g., proposed odds and wager amount) to one or more other users, e.g., by displaying a bet proposal at a communication device such as a gaming table.

Data provider module 26 may communicate with one or more data providers 8, e.g., to obtain information about an event. For instance, data providers 8 may provide information about an event to server 2 via a data feed.

State identification module 28 may identify or otherwise define a state of an event. The state may comprise a particular status of a game, e.g., the players on the field, the count of the pitch, the inning, and other information. In some embodiments, a number of possible future states may be identified, and a probability and odds may be determined for each possible future state. For example, in baseball, a state may be identified based on the following factors: number of outs, number of balls and strikes of the current batter, number of players on base and the bases occupied. The state may be further identified by the inning, score, pitcher identity, batter identity, identities of fielders and any players on base, next batter(s) up, temperature, weather conditions, etc. Possible future states, e.g., after a given pitch or at-bat, may be identified according to all the possible outcomes of the pitch (e.g., a number of runs, new positions of players on base, another out, etc.), and other information.

State identification module 28 may also update the state of an event based on event information received from data providers 8. For instance, module 28 may receive event information such as a video stream of an event or a text play-by-play of an event. State identification module 28 may process the event information. For instance, state identification module 28 may process video or other image information to determine information about the state of an event such as a game, e.g., the location of a football at the end of a play when a referee signals the end of the play, whether a football carrier crossed a first down marker, whether a player stepped out of bounds, whether a ball hit by a batter was hit out of the park within the "fair" territory, whether a tennis ball hits the net or lands in "out" territory, etc. Accordingly, state identification module may automatically determine information related to performance parameters and outcomes, e.g., whether a batter was struck out or whether a quarterback threw an interception.

In some embodiments, state identification module 28 may reconcile identified states with another source of information related to an event. For instance, in some embodiments, a gaming agent 12 may interact with state identification module 28 to define states, correct any errors in automatically determined states, and provide additional event information. For instance, a gaming agent may note that a flag was called on a play after state identification module 28 determines that a touchdown was scored during the play. In some embodiments, module 28 may reconcile information determined about a state with an "official" source of state information. For instance, an official umpire who referees a game may be an "official" source of information, such that a call made by a referee concerning whether a ball was a ball may be controlling regardless of whether module 28 determines that a ball crossed a batter's strike zone. Accordingly, module 28 may interact with the umpire to determine official "calls" in the game, and this information may be used to update the event's state. In some embodiments, referees may enter state information (such as "ball" or "strike") on a device that communicates directly with module 28 so that module 28 may update state information accurately.

Information about states may be communicated to users 10 and/or agents 12. It may also be used to determine initial states and possible outcomes of a performance parameter, and to determine or update probabilities associated with the outcomes.

In some embodiments, state identification module 28 may identify event states and state changes (such as betting outcomes) automatically. For instance, state identification module 28 may analyze one or more sources of data to automatically identify an event state, such as an outcome of a betting event. For instance, state identification module 28 may use a variety of sources to determine and/or confirm that a tennis player has scored a point, such as image processing software that analyzes a live video feed of the match; "play-by-play" information from a data feed; and a website that outputs the score of a game in substantially real-time.

State identification module 28 may analyze a video feed of a live tennis match to identify whether a tennis ball landed "in" or "out" on a player's side of the court. State identification module 28 may also review "play-by-play" information from a data feed indicating that a tennis point has been scored by the player.

In some embodiments, a human operator may determine the outcome of a betting event. For instance, the human operator may watch the live event (e.g., live in person or via live television broadcast). In some embodiments, a human operator may determine the outcome of a betting event and then cause the system to settle bets based on the determined outcome. In this way, the bettors will have immediate feedback.

Parameter creation module 30 may create and define performance parameters or performance parameter-related data and metrics for measuring a performance parameter at a given time (e.g., how many yards a running back has gained so far in a given football game by the end of the third quarter). Parameter creation module 30 may also enable users to specify a performance parameter. For instance, a user may specify a performance parameter based on any variables of an event. While some performance parameters, such as total yards of a running back in a given game, are often tracked by many third parties, user-specified performance parameters may be performance parameters that are not typically tracked by traditional casinos. Some examples include: the average stride of a particular running back; the number of times a ball is passed during a particular possession of a basketball team; the number of times a tennis racquet touches the ground during a match; etc.

Parameter tracking module 32 may track a particular performance parameter (e.g., number of points scored, yardage gained, completions, first downs), e.g., for a team and/or player and/or game, throughout an event, e.g., based on data received from data providers 8.

Betting market module 34 may create a betting market for a performance parameter. For instance, betting market module 34 may identify a performance parameter that can have a plurality of possible future states. Once the performance parameter and possible future states are identified, betting market module 34 may enable users to place one or more bets on the possible future states based on odds determined by probability module 18. Betting market module 34 may open and close the market based on state information.

Betting market module 34 may create a betting market for any possible future state(s) of a game, and/or any measurable performance parameter associated with a one or more games.

For instance, betting market module 34 may open the market at or during an initial state, and then close the market at the end of an initial state. An initial state may comprise a time before a performance parameter has changed to one or more possible future states. For example, module 34 may open a market for betting on a particular at-bat when the batter is "on deck" (i.e., when the preceding batter is currently at bat). Module 34 may close the betting market before the first pitch to the particular batter. In some embodiments, module 34 may keep the betting market open for a longer period, e.g., until a specific one of the possible future states is achieved. For instance, module 34 may enable users to continue to bet on an at-bat during the at-bat until the batter walks, gets a hit, strikes (or fouls) out, or the at-bat otherwise ends.

For example, a betting market may be created for betting whether a particular batter (e.g., at a particular at-bat, or for all at-bats by the player or group of players during an inning or game) will be retired in any way other than a strike-out. In another example, at a time when the Saints have a second down at their own 23-yard line with two minutes left in the half, a bet may be offered on whether the Saints will get a touchdown (or field goal) on the current drive, or get a first down, get an interception, get a completion on the next play, attempt a specific type of play (e.g., a pass), or get blitzed, or other event. A bet on a touchdown during the current drive may be resolved when the Saints lose possession of the ball, score a touchdown, score a field goal, or half ends, or the game ends or is cancelled, whichever occurs first. (I.e., the bet may be resolved upon the occurrence of either the intended event or a mutually exclusive other event.)

In some embodiments, probability module 18 and odds module 20 may update the probabilities and odds for the various outcomes as new state information becomes available while the market is open. For instance, in an at-bat market that stays open during the at-bat, if the first two pitches are strikes, the probability that the batter will strike out may increase significantly, and odds for a strike-out (and the other possible outcomes) may be recalculated accordingly.

Market module 34 may also determine an actual future state and resolve any bets based on the actual future state. For instance, market module may determine that a batter struck out, and therefore calculate and pay the appropriate payout to bettors who bet on strike out, and notify bettors who bet on a home run that they lost the bet.

A gaming agent 12 may interact with market module 34 to verify an actual future state (e.g., to verify that a batter actually struck out). For instance, agent 12 may double check a determination of an actual state by module 34 before bets are paid out.

Create-a-metric module 36 may enable users 10 to create a performance parameter. For instance, a user 10 may create a performance parameter, and the server 2 may identify future possible states for the performance parameter and odds associated with each possible state. Then the user 10 may place a wager on one or more of the possible future states.

Database 80 may comprise a plurality of databases for storing information related to an event, one or more users 10, one or more data providers 8, one or more gaming agents 12, and one or more betting markets. Probability Database may store probability information related to an event, such as information relating to the probability of a future occurrence.

Create-a-metric Database may store event and performance data (for multiple events), as well as categories of performance data. Information in the database may be used to enable users to create a metric, e.g., for wagering.

Figure 2:
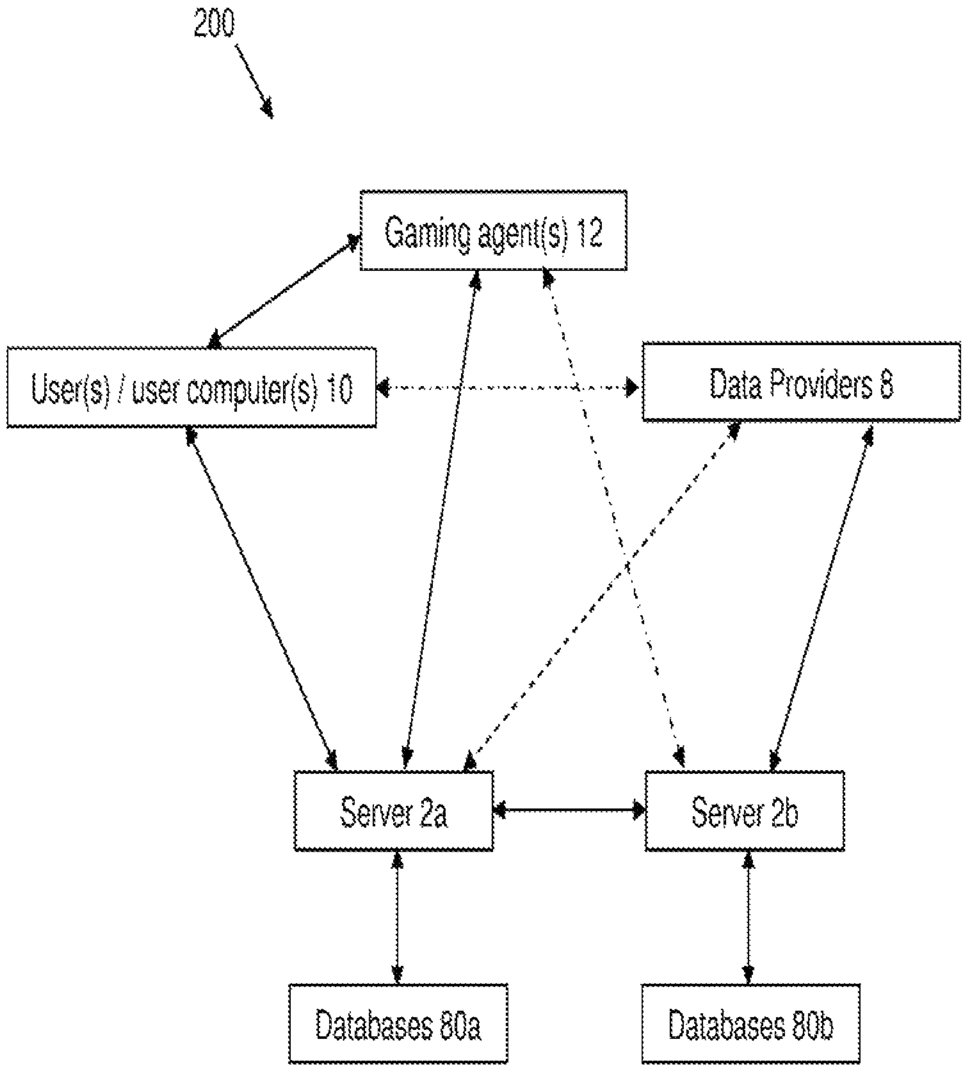
FIG. 2 depicts a system according to at least one embodiment of the systems disclosed herein.

As shown in FIG. 2, a system 200 that accomplishes the same functions as that of system 100 of FIG. 1 may comprise two different servers 2, i.e., a front end server 2*a* and a back end server 2*b*. The front end server 2*a* may interact with users 10 and gaming agents 12 to provide event-related information and receive bets. The back-end server 2*b* may determine event states, performance parameters, and outcomes. In some embodiments, the back-end server 2*b* may be ignorant of any bets or other interactions with users 10.

For example, as a back-end system, server 2*b* may be configured to receive a stream of state information of a live sporting event in real time (or another time). The server 2*b* may determining by a computer processor an initial state and a plurality of possible future states of a first performance parameter of the live sporting event based on the stream of state information. After a beginning of the game and before the start of the event, the server 2*b* may calculate a probability of occurrence for at least one of the plurality of possible future states of the first performance parameter based on historical data related to the first performance parameter, the plurality of possible future states being mutually exclusive from one another. The server 2*b* may transmit, during an initial state of the first performance parameter, a signal operative to enable server 2*a* to open a first market for betting on the at least one of the plurality of possible future states, the first market comprising betting odds based on the calculated probability of occurrence. After transmitting the signal operative to open the first market, server 2*b* may determine an end of the initial state. Before the end of the initial state, server 2*b* may transmit a signal operative to close the first market. After transmitting the signal operative to close the first market, server 2*b* may determine an outcome of the first performance parameter based on the received stream of state information. The server 2*b* may transmit a signal operative to resolve one or more payouts of the first market, the signal indicative of the outcome of the first performance parameter.

In some embodiments, the act of calculating a probability of occurrence for at least one of the plurality of possible future states may comprise calculating a probability of occurrence for the at least one of the plurality of possible future states of the first performance parameter based on prior historical data related to the first performance parameter existing prior to a beginning of the live sporting event.

In some embodiments, the server 2*b* may also determine current historical data about the first performance parameter based on at least a portion of the stream of state information received after a beginning of the live sporting event, wherein the current historical data does not exist prior to the beginning of the live sporting event. The act of calculating a probability of occurrence for the at least one of the plurality of possible future states may comprise calculating a probability of occurrence for the at least one of the plurality of possible future states of the performance parameter based on the prior historical data and the current historical data.

In some embodiments, the server 2*b* may determine current historical data about the first performance parameter based on at least a portion of the stream of state information received after a beginning of the live sporting event, wherein the current historical data does not exist prior to a beginning of the live sporting event. Server 2*b* may re-calculate the probability of occurrence for the at least one of the plurality of possible future states based on the current historical data. Server 2*b* may transmit a signal operative to update the odds used in the first market based on the re-calculated probability of occurrence.

In some embodiments, server 2*b* may also re-calculate a probability of occurrence for at least one possible future state of a second performance parameter based on the current historical data. The server 2*b* may transmit a signal operative to update betting odds used in a second market for betting on the second performance parameter based on the re-calculated probability of occurrence for the at least one possible future state of the second performance parameter.

In some embodiments, server 2*b* may determine by a computer processor an initial state and a plurality of possible future states of a second performance parameter of the live sporting event based on the state information. Server 2*b* may calculate a second probability of occurrence for at least one of the plurality of possible future states of the second performance parameter based on historical data related to the second performance parameter. The plurality of possible future states may be mutually exclusive from one another. The server 2*b* may transmit, during an initial state of the second performance parameter, a signal operative to open a second market for betting on the at least one of the plurality of possible future states of the second performance parameter, the second market using odds based on the second probability of occurrence. After transmitting the signal operative to open the second market, server 2*b* may determine an end of the initial state of the second performance parameter. After transmitting the signal operative to open the second market and before the end of the initial state of the second performance parameter, server 2*b* may transmit a signal operative to close the second market. After transmitting the signal operative to close the second market, server 2*b* may determine an outcome of the second performance parameter based on the received stream of state information. Server 2*b* may transmit a signal operative to resolve one or more payouts of the second market, the signal indicative of the outcome of the first performance parameter.

In some embodiments, server 2*b* may also determine current historical data related to both the first and second performance parameters based on at least a portion of the stream of state information received after a beginning of the live sporting event. In some embodiments, the probability of occurrence for the at least one of the plurality of possible future states of the first performance parameter and the probability of occurrence for the at least one of the plurality of possible future states of the second performance parameter are calculated based on the current historical data.

Figure 3:
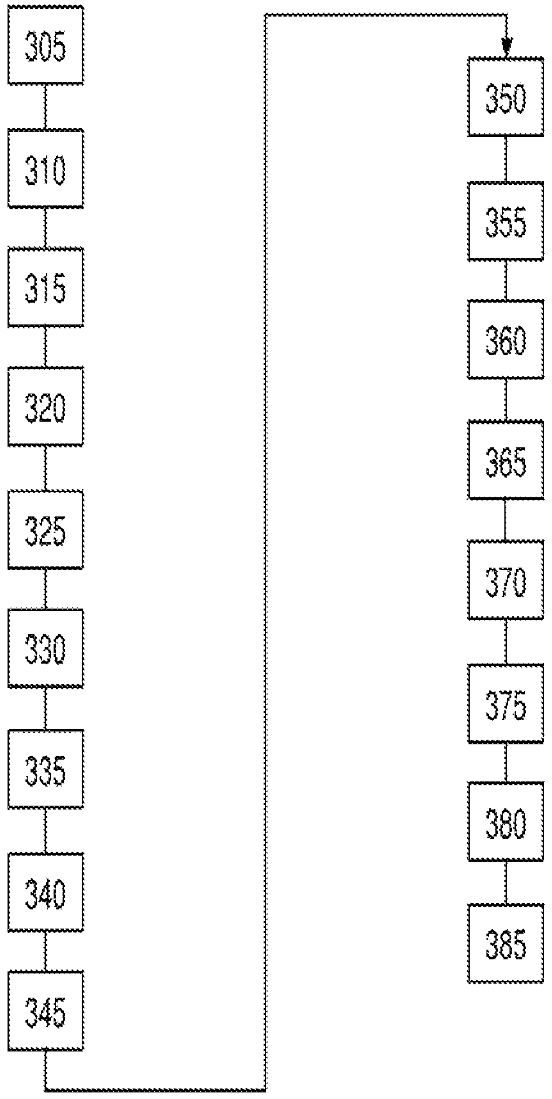
FIG. 3 depicts a flow diagram according to at least one embodiment of the methods disclosed herein.

FIG. 3. Exemplary Method of In-Game Wagering.

It should be appreciated that the system of this invention may be used to manage bets for any type of event having a plurality of possible outcomes, such as an election, a sporting event, or an event occurring within another event (such as an at-bat in a baseball game, or a competition for the electoral votes of a particular state in a U.S. presidential election). For example, the system may be used to manage bets in any of the following types of competitions, as well as any other competition or sport: a racquet sport (such as tennis, squash, or badminton), baseball, softball, cricket, surfing, football, soccer, basketball, hockey, gymnastics, skating, golf, running, swimming, skiing, biking, rugby, polo, water polo, bowling, dancing, billiards, shooting, a track and field competition, horse racing, dog racing, automobile racing, motorcycle racing, boat racing, fishing, boxing, a martial art competition, a mixed martial arts competition (such as Ultimate Fighting Championship), a casino game, a card game, chess, and falconry.

In block 305, the system may receive pre-event information about an event, e.g., using any method described herein. For instance, the system may receive from a data feed information about two teams playing in a game, such as a team roster, batting line-up (baseball), starting offensive line (football), an injury report for any potentially injured players, a game start time, and other information. The information may be downloaded or otherwise received from any source, such as a league or team website, press release, ESPN™, or other source of event information.

In block 310, the pre-event game information may be outputted to one or more users, e.g., using any method described herein, e.g., via radio or television broadcast or over the internet. The game information, such as live video footage of a sporting event, may be displayed to the user at a television or computer monitor, radio, mobile phone, or other output device. In some embodiments, the information may be displayed on a device capable of receiving user inputs, such as a touch-sensitive display device. The display device may be operable to accept user inputs, e.g., by selecting from among various betting options on a touch-sensitive display.

In block 315, the system may receive information about the event during the event, e.g., using any method described herein. For instance, the system may receive a data feed or a live broadcast.

In block 320, game information may be output to one or more users, e.g., using any method described herein, e.g., via radio or television broadcast or over the internet. This information may be output to users 10 and agents 12. For instance, the game information, such as live video footage of a sporting event, may be displayed to the user at a television or computer monitor, radio, mobile phone, or other output device. In some embodiments, the information may be displayed on a device capable of receiving user inputs, such as a touch-sensitive display device. The display device may be operable to accept user inputs, e.g., by selecting from among various betting options on a touch-sensitive display.

In block 325, a user 10 may define a performance parameter, e.g., using any method described herein. The performance parameter may be created based on performance categories, variables, metrics, and other event or performance information provided by the system.

For instance, a user 10 may define the performance parameter "length of average running stride of Lebron James starting in the third quarter." Alternately, the user may define the performance parameter "number of three-pointers scored by Lebron James," or number of aces served or unforced errors by Roger Federer. The system may track this performance parameter, e.g., by measuring each running stride of Lebron James while he is on the court during the third quarter. The system may enable users to bet on this parameter. For example, the system may enable users to bet on whether his running stride is more than five feet or less than five feet during a particular period of time. At the end of the third quarter, the system may calculate the average stride of Lebron James and resolve the bets accordingly. Alternately, the system may resolve the number of aces or unforced errors at the end of a game or set, and resolve associated bets accordingly.

In block 330, the system may determine state information relating to a performance parameter (e.g., a user-created performance parameter or a pre-defined performance parameter), e.g., based on information received about the event, e.g., using any method described herein. The state information may comprise any status or historical information about the event. For instance, based on a real-time data feed of a sporting event, the system may determine whether a sporting event has begun, the score, time remaining, balls and strikes of a specific batter, which players are currently on the field, and other state information described herein.

In block 335, the system may identify a plurality of possible future states of the event, e.g., using any method described herein. The end states may (or may not) be mutually exclusive, and they may relate to a specific performance parameter or occurrence that happens during the event.

In block 340, the system may identify one or more start times associated with a set of possible future states associated with the performance parameter. For instance, a start time of an at-bat may coincide with an end time of a prior at-bat. In some embodiments, start times may trigger the opening of a betting market.

In block 345, the system may determine statistics associated with an outcome or type of outcome, e.g., using any method as described herein. For instance, the system may determine statistics associated with one or more performance parameters associated with a particular team or player (or other event entity), such as whether a particular player will get a single or a home run for a particular at-bat.

In block 350, the system may determine probabilities and odds associated with one or more possible outcomes, e.g., using any method described herein. In some embodiments, the probabilities may be received or calculated from a database of statistical information or probabilities. The database may be maintained by a third-party.

In some embodiments, the probabilities and odds may be calculated based on pre-existing information, such as a database of baseball statistics existing prior to a baseball game, as well as current information such as performance data of the baseball players during the baseball game. The probabilities and odds may be derived at least in part from trusted sources, pre-event statistics (such as a historical batting average), and more specialized relevant statistical information (e.g., prior performance of a specific batter against a specific pitcher).

The probabilities and odds may be updated as relevant event information is received. For instance, the probability that a quarterback will throw three touchdown passes in a particular game will decrease if the quarterback is injured. Such probabilities and odds may be updated while the betting offer is live, such that the odds accepted by a user may depend on when the user accepts the bet.

In block 355, a user 10 may request information relevant to a bet, e.g., from the system. For instance, the user 10 may request historical information, such as information about a player or team's past performance (e.g., with respect to a particular performance parameter like total yards) and/or current performance (e.g., performance during the current game). The user 10 may also request information about what bets are available and the odds for each.

In some embodiments, a user 10 may request information by selecting a particular player on a screen. For example, a user 10 may touch a video image of a pitcher to request information about the pitcher's pitching record. In some embodiments, a user 10 may select to bet that a pitcher will strike out a current batter by touching the image of the pitcher.

In block 360, the system may provide betting information. For example, the system may output a betting overlay at a user display device. The overlay may display betting options such as the various possible outcomes for which the user may wager, the odds for each, probabilities or statistics relating to the various outcomes, and any other information that may be relevant to a user 10 bet.

In some embodiments, a user may propose a bet, e.g., by specifying a particular occurrence (e.g., specific batter will get on base during this at-bat), odds, and an amount of the wager, e.g., using any method described herein.

In block 365, a user may select a bet, e.g., using any method described herein. For instance, the user may navigate a menu of betting options, e.g., on a touch-sensitive display, e.g., on a mobile phone. In some embodiments, a user may select the opposite side of a bet proposed by another user, e.g., using any method described herein.

In block 370, the user 10 may place a bet, e.g., using any method described herein. For example, the user 10 may bet that a particular batter will strike out. In some embodiments, a user's automatic betting module may place (or cancel) a bet, e.g., based on triggering conditions, e.g., using any method described herein.

In block 375, the system may close bets for a particular event or betting market, e.g., after a start time for a particular in-game event. For instance, the system may close betting on a particular at-bat for Barry Bonds before Bonds steps up to the plate to receive the first pitch, or after Bonds steps up to the plate but before the pitcher begins to throw the first pitch to Bonds.

In some embodiments, the system may close bets automatically, i.e., without human intervention. In some embodiments, a human operator may close the bets. For instance, the human operator who is watching the event (e.g., live in person, or via TV broadcast with minimal time delay) may cause the system to close bets for a particular Bonds at-bat at a moment immediately before the pitcher throws the first pitch (or at another appropriate moment). In circumstances where the system does not receive information about an occurrence (such as Bonds stepping up to the plate) until after occurrence has taken place (e.g., due to 2-second delay in a television broadcast), a human operator may be in a better position to determine an optimal time for closing betting for an event (e.g., the last possible moment before the beginning of the event).

In some embodiments, the system may continue to allow bets on the event, but the betting options may change during the course of the event. For instance, the system may continuously or periodically update the odds relating to various outcomes based on current in-game information. For instance, the system may recalculate the odds of various at-bat outcomes after each pitch. For instance, the system may determine that the odds that Bonds strikes out increase after each strike, and the odds that he will get walked increase after each "ball."

In some embodiments, the system may hedge its exposure to one or more outcomes, e.g., using any method described herein.

In block 380, the system may receive real time information about the state of an event. The information may be received from any source of current event information, as discussed above. The real time event state information may comprise real time historical information about the event, such as information relating to the end result of an event (e.g., strike out), information that might affect probability of an outcome of an event (e.g., a mild injury to a quarterback), performance information (e.g., number of yards gained by a particular running back during a particular play), game time elapsed and remaining, and other event information.

In block 385, the system may identify an outcome of an event, such as an event that is the subject of a bet. For instance, the system may determine an actual state among the possible future states. For instance, the system may determine that Barry Bonds struck out based on a source of event information.

The system may then resolve all bets related to the associated betting market. For example, the system may issue an appropriate payout to any winning betters and issue notifications to those who had losing bets.

In some embodiments, users 10 may keep a betting account that contains an amount for wagering. Users 10 may continue making bets until the account is depleted or otherwise unavailable for further bets.

It should be appreciated that the actions described in the above blocks are exemplary only, and may but need not be performed in the order presented here. Further, it is not necessary to accomplish all of the actions described in the blocks. Rather, any number of the blocks (e.g., four of the blocks or six of the blocks) may be accomplished, and in any order.

Figure 4A:
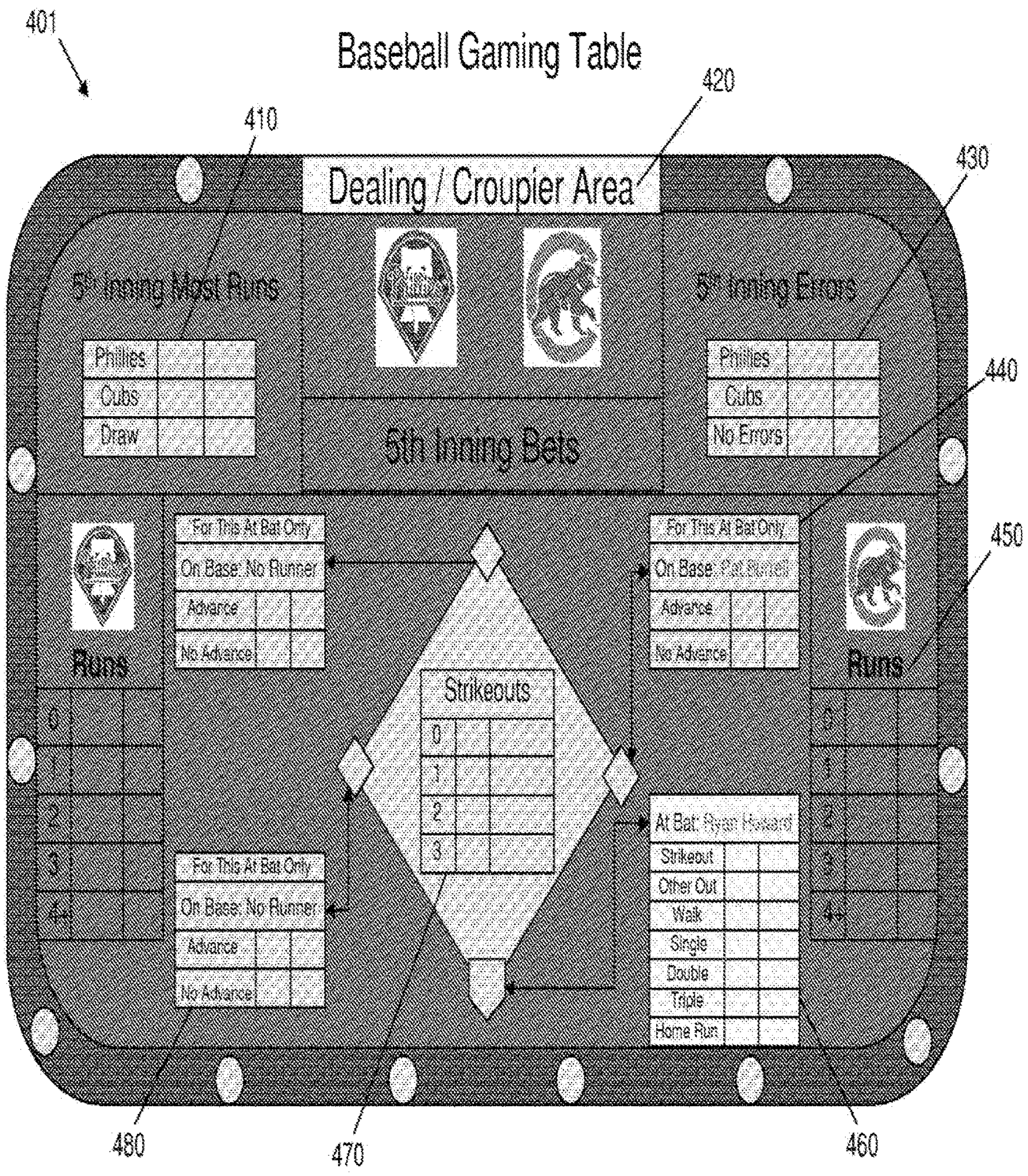
FIGS. 4A and 4B depict exemplary gaming tables for use in at least one embodiment of the methods and systems disclosed herein.
Figure 4B:
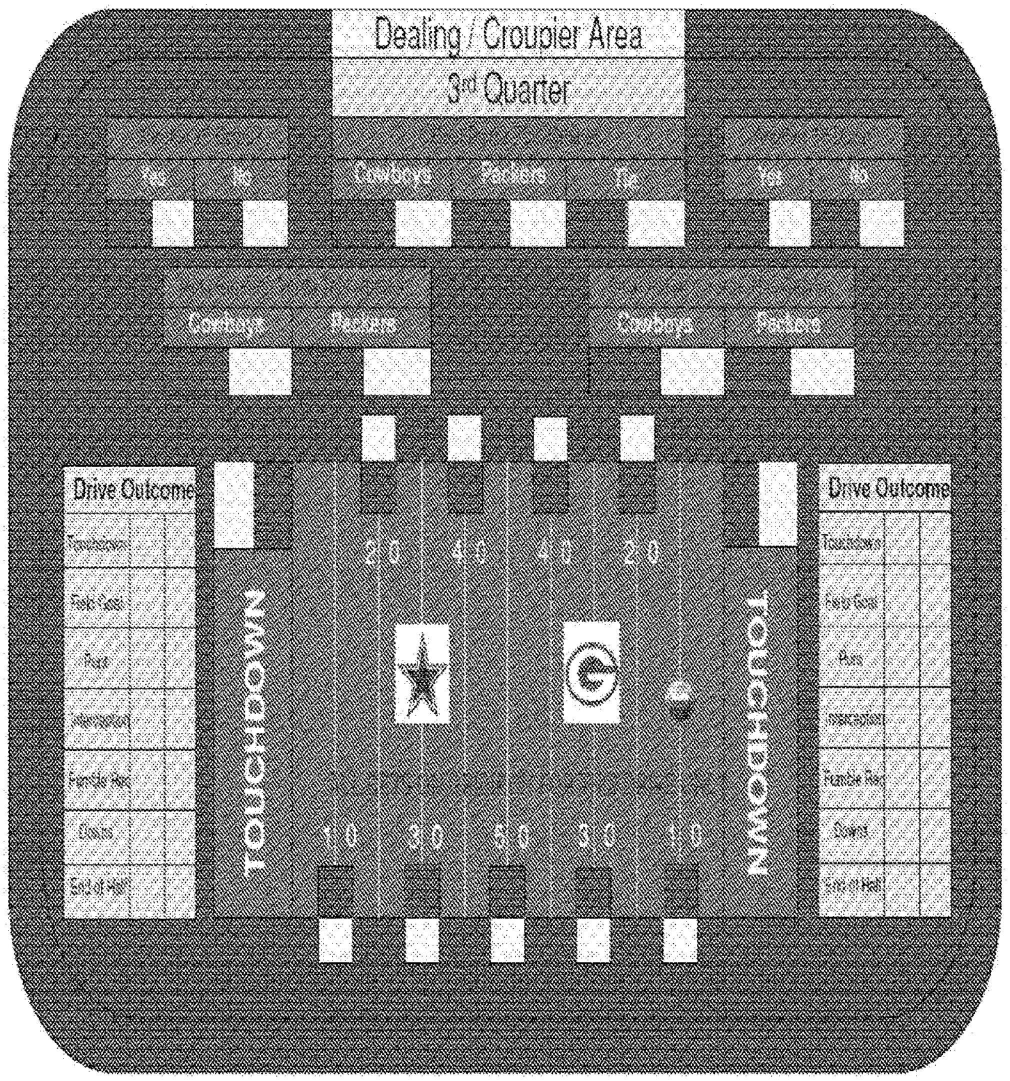
Figure 5A:
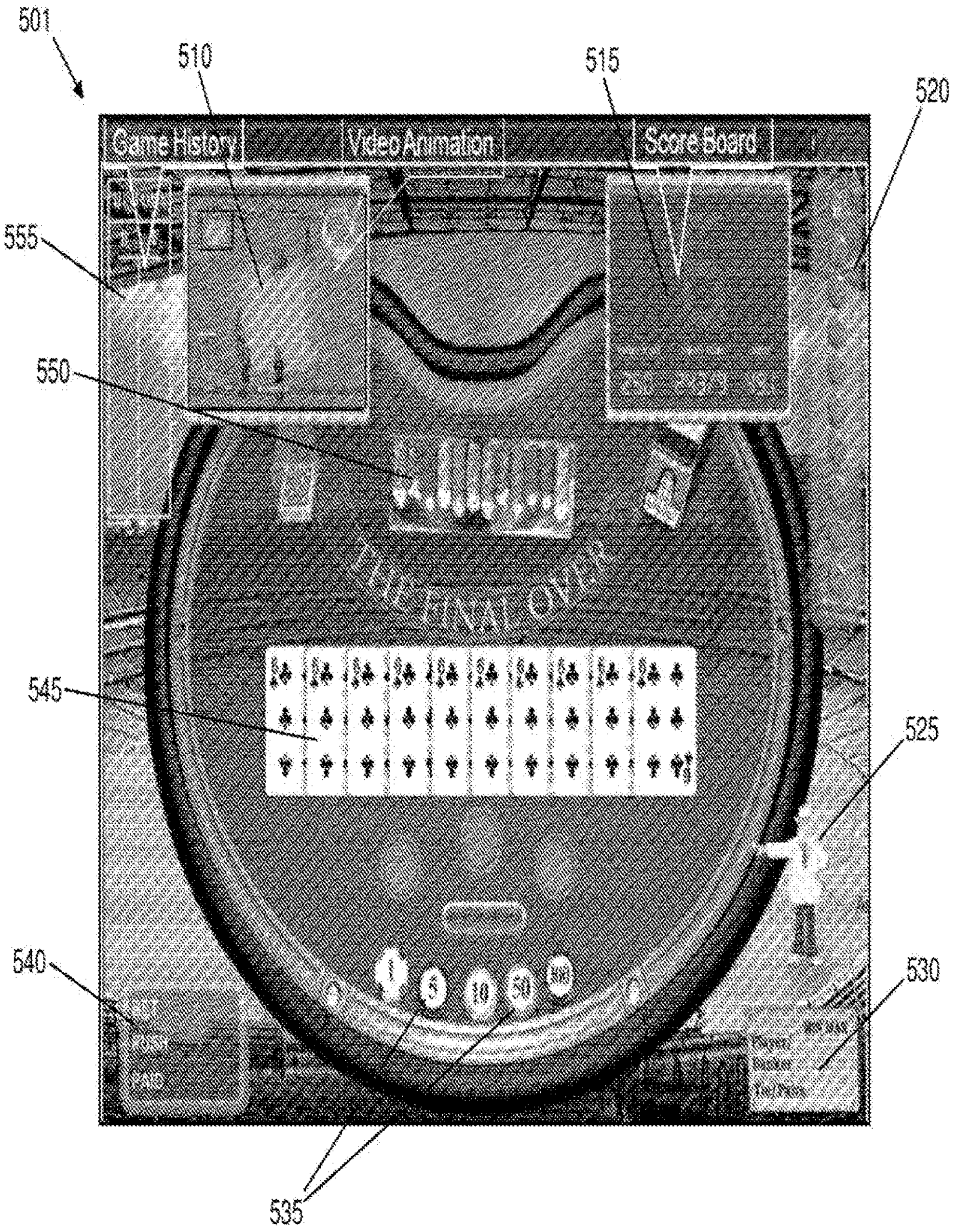
FIGS. 5A-5C depict exemplary interface screens for use in at least one embodiment of the methods and systems disclosed herein.
Figure 5B:
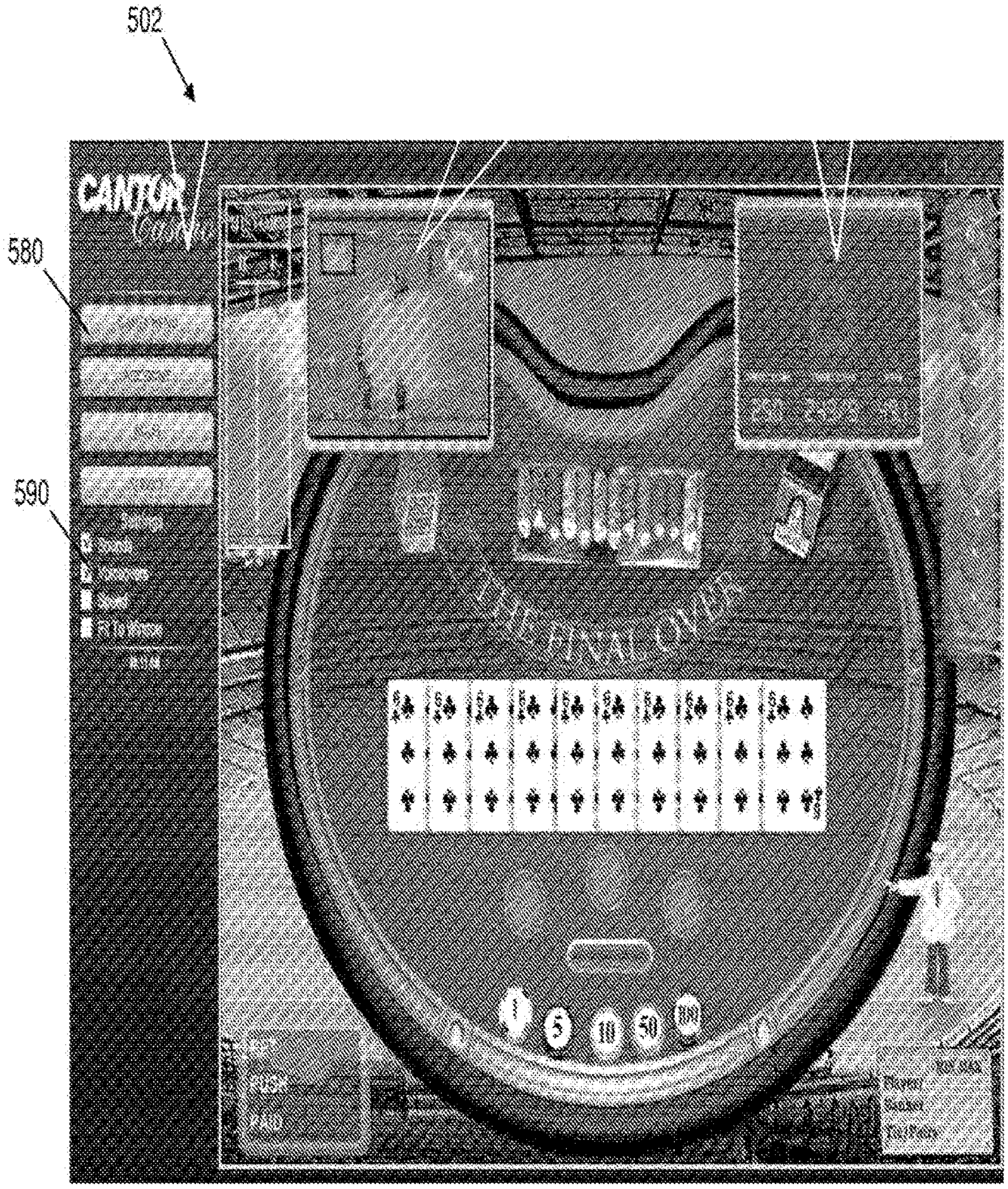
Figure 5C:
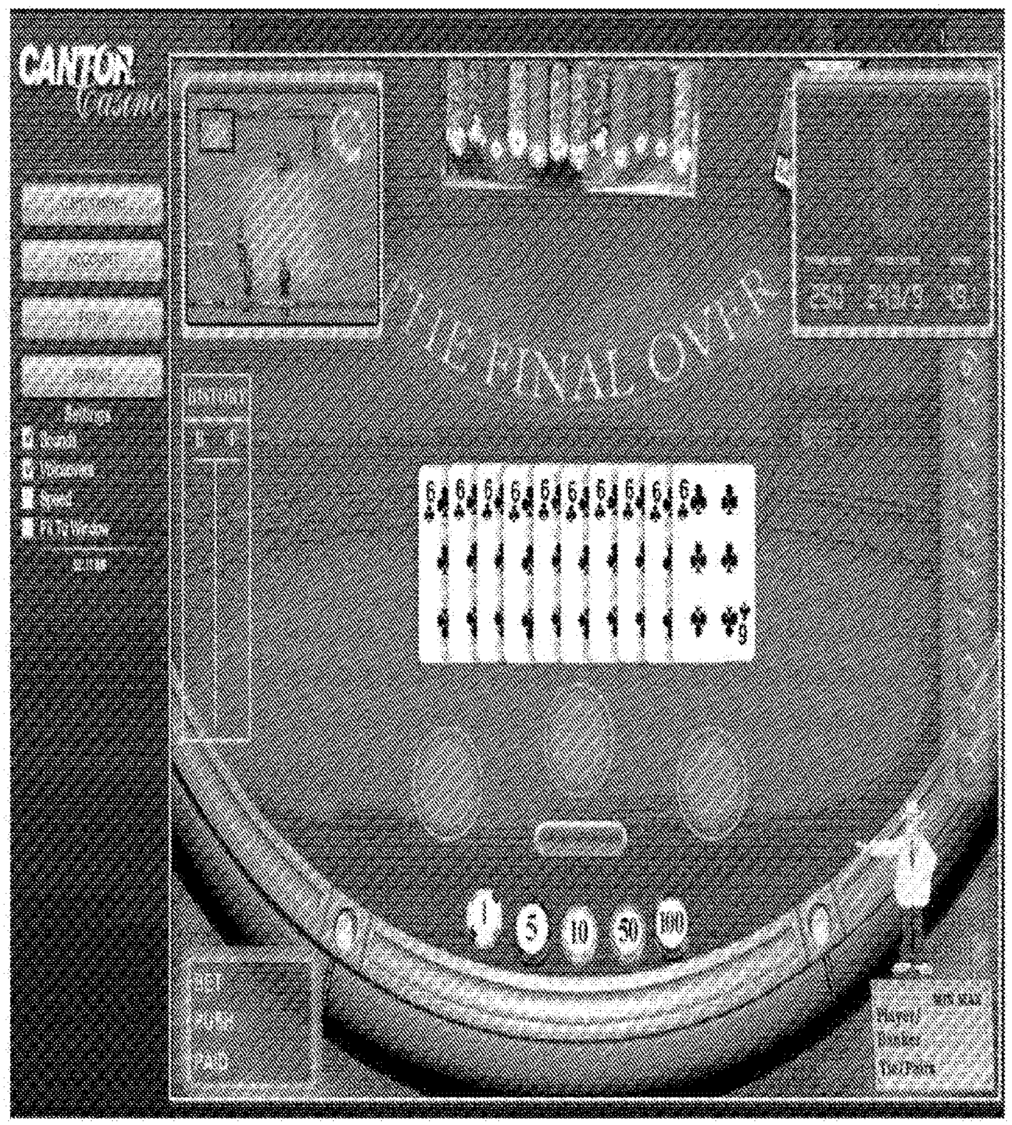

FIGS. 4A and 4B depict exemplary gaming tables 401 and 402 for use in at least one embodiment of the methods and systems disclosed herein. FIGS. 5A-5C depict exemplary interface screens for use in at least one embodiment of the methods and systems disclosed herein. It should be understood that the tables 401 and 402 may also be interfaces, and the interfaces 501-503 may also be tables. Accordingly, the general features of these tables 401, 402 and interfaces 501-503 may apply equally to each other. Notably, tables 401 and 402 and interfaces 501-503 display information to users 10 and enable users 10 to place bets.

The tables 401, 402 and interfaces 501-503 of FIGS. 4A-5C may be located in a casino, a user's house or workplace, a stadium or other location associated with an event such as a live sporting event, or another location. In some embodiments, the tables and interfaces may be physical gaming tables that may facilitate making wagers associated with a specific live event. Although the exemplary tables and interfaces depicted in FIGS. 4A-5C are configured to facilitate wagers associated with a sporting event such as a baseball, cricket, or football game, it should be understood that a gaming table of the present invention may be configured to facilitate bets associated with other sports and other events, such as elections. The gaming tables and interfaces may facilitate bets (e.g., for an event such as a baseball game or football game), e.g., in a manner similar to how a craps table at a casino facilitates wagering on dice rolls by one or more users. In some embodiments, the tables and interfaces may comprise an electronic display, such as a traditional computer monitor (e.g., a user's computer monitor). In some embodiments, the gaming tables and interfaces may comprise a touch-sensitive display and/or any other input and/or output devices. For example, a craps table at a casino may be replaced by a large, flat table that comprises a large touch-sensitive display.

It should be appreciated that the display may be configured to interact with one or more persons in a variety of ways, e.g., via touch, sound, and other inputs and outputs. Users 10 and gaming agents 12 (such as dealers or croupiers of a casino) may provide inputs at the table by a variety of means. For instance, users 10 and gaming agents 12 may interact with the touch-sensitive displays 401, 402 and 501-503 by touching selected portions of the display. The touch-sensitive display may recognize touch as well as other inputs, such as via mouse, keyboard, camera, etc. The display may detect motion (e.g., by processing images from a camera) and thereby identify instructions or other inputs from users 10 and gaming agents 12. For instance, the display may detect hand signals that represent a certain type of bet, bet amount, or other instruction or update. In some embodiments, users 10 may place bets by touching the display to select a specific betting outcome and wager amount. The user 10 may select particular portions of the display or images on the display to indicate betting selection, e.g., by selecting a particular player and/or a location on the playing field to indicate a bet that a runner on first will get to third base during the next at-bat.

Referring to FIGS. 4A and 4B, the tables 401 and 402 may display status and other information about a live event, e.g., to a user 10 or a group of users 10. Information displayed on the gaming table may be updated, e.g., in real time. For a physical gaming table 401 similar to a craps table, the table may be updated when a gaming agent 12 manually changes status information, e.g., by manually changing a score displayed on the table. (However, the updated information may be transmitted to the gaming agent 12 automatically.) For an electronic display 401 or 402, such information may be updated or otherwise changed automatically.

A dealing or croupier area 420 may be used by gaming agents 12. The croupier area 420 may display information such as the current baseball inning (e.g., $5^{th}$ inning) and team logos indicating the teams currently playing (e.g., the Phillies and the Cubs). In some embodiments, the croupier area may show the probabilities and/or odds that each team will win the game. The probabilities and odds may change over the course of the game based on game events, such as runs by either team. For instance, the chances that the Cubs will win if the Cubs are leading by four at the end of the sixth inning.

A "most runs" area 410 may show information about betting markets related to the number of runs by each team playing. An "inning errors" area 430 may show information about betting markets related to the number of errors made by either team during an inning "Base status" areas 440, 480 may indicate information about the status of a base related to one or more betting markets, such as who is on a particular base, and whether the runner is advancing or has advanced. Runs area (e.g., area 450) may indicate information about betting markets related to the number of runs by a specific team.

For instance, areas 410, 430, 440, 450, 480 may display probabilities and odds offered for various bets, such as bets associated with how many runs will be scored by a particular team. For example, most runs are 410 may indicate that there is an 20% probability that the Cubs will score more runs than the Phillies in the next inning (or a current inning). Runs are 410 may also indicate that the payout odds are 3 to 1 for betting that the Cubs will score the most runs (i.e., that a bet of $1 will return $3 if the Cubs score the most runs that inning). As the number of runs by the Cubs and Phillies changes during the inning, the probabilities and odds may change. For instance, if the Phillies do not score any runs at the top of the inning and the Cubs have the bases loaded with no outs, the probability may change to 90% that the Cubs will score the most runs that inning (i.e., more than the Phillies zero runs), and the odds may change to reflect this.

As shown in FIG. 4B, a gaming table 402 may also be configured for American football or another sport. As shown on the table 402, designated areas of the table enable users to place bets on either the Dallas Cowboys or the Green Bay Packers concerning which team will have the most running yards or passing yards in a present quarter, and whether a team currently on offense will get another first down before a change in possession. The table 402 also shows drive outcome status information. The drive outcome areas of the table 402 may alternatively (or in addition) used to place bets on a specified outcome, such as whether a particular team gets a field goal or touchdown.

In some embodiments, a gaming table or interface may comprise a plurality of values (or ranges of values) of a performance parameter, e.g., arranged in one or more rows, columns, grids, or other arrangements. The values may comprise possible future values of the performance parameter. For instance, the values may comprise two sets of possible scores as measured at the end of a current quarter of a football game, one set of scores for each team. As in FIGS. 4A-4B, the gaming table may be configured to enable users 10 to place one or more bets associated with specific values. For instance, a user 10 may bet that by the end of the second quarter (or another time, such as the end of a game), the first team will have 7 points. Alternatively, or in addition, the user may bet that the team will have between 3 and 10 points. The user 10 may also bet that the other team will have 14 points (or between 10 and 17 points). In some embodiments, users may place a bet that one team will have a certain number (or range) of bets and another team will have another number (or range) of points, e.g., at a specific point in the game.

In some embodiments where the table or interface comprises a touch-sensitive display, users 10 may select to bet on a particular value (or range) by touching the intended value or range. For instance, a user 10 may touch "7 points" in a first column to indicate a score for a first team, "14 points" in a second column to indicate a score for a second team, select an amount for wager (e.g., by touching one or more images of one or more chips of varying colors and amounts), and then confirming the bet.

The gaming table may also display other information related to the values, such as probabilities and odds. The values and other information may be updated, e.g., in real time, e.g., based on current event information. For instance, various possible values may be disabled for betting purposes once the possible value becomes impossible. For example, once a team scores 14 points, an ending score of 7 (or any score or range from 0 to 13) becomes impossible, and these impossible scores may be removed from the table. In some embodiments, scores or ranges of scores may be arranged in ascending order in a column. As the actual score increases, impossible values may be removed from the top, the next highest values may move to the position of the removed score(s), and new higher values may be added at the bottom.

FIGS. 5A-5C depict exemplary interface screens for use in at least one embodiment of the methods and systems disclosed herein. In some embodiments, the interface screens may comprise a gaming table similar in form and/or function to that described for FIG. 4, e.g., a touch-sensitive display, computer display, or physical table at a casino. The interface 501 in FIG. 5A may display information related to an event such as a game. The interface 501 may also display information related to one or more betting markets associated with the event, such as a betting market implemented using the interface 501.

Interface 501 comprises a video 510. The video 510 may comprise actual video footage of an event such as a baseball or (English) cricket game, such as a pitch from a pitcher to a batter. The video may comprise a video broadcast of the event received in real time. Alternatively, the video 510 may comprise a simulated animation of an event such as a pitch. In some embodiments, a user 10 may select different simulated (or real) camera angles of the event, rewind and replay the video.

In some embodiments, interface 501 may comprise multiple spaces for video 510, e.g., for viewing several different video feeds simultaneously, either for the same event or different events. For instance, the multiple videos may be tracking different players in a golf tournament, or different golf holes that are being played simultaneously. In some embodiments, the multiple videos may track two different games (e.g., two different football games) that are playing at the same time.

In some embodiments, the video 501 may comprise video of an event as well as inputs (such as buttons, e.g., touch-sensitive images of buttons) that enable agents 12 and/or users 10 to provide information about the event. For example, an agent 12 (or user 10) may select a button next to a pitcher just before a first pitch in order to inform the server 2 (or confirm to the server 2) that an at-bat is about to begin. An agent 12 viewing several different videos of different events may provide information to server 2 and users 10 about betting markets (e.g., related to the state of an initial state, or the time an initial state begins or ends, or a possible or actual future state).

Score board 515 may display status information related to the event and/or status information related to one or more betting markets associated with the event, such as bets made via the interface 501. For example, score board 515 may display game time information such as time remaining or the number of the inning, score information such as the score of a game or a particular inning, and other information about one or more game performance parameters. Ball-by-ball scoreboard 520 may display a score for each ball played, e.g., in a game of cricket.

Figure 6:
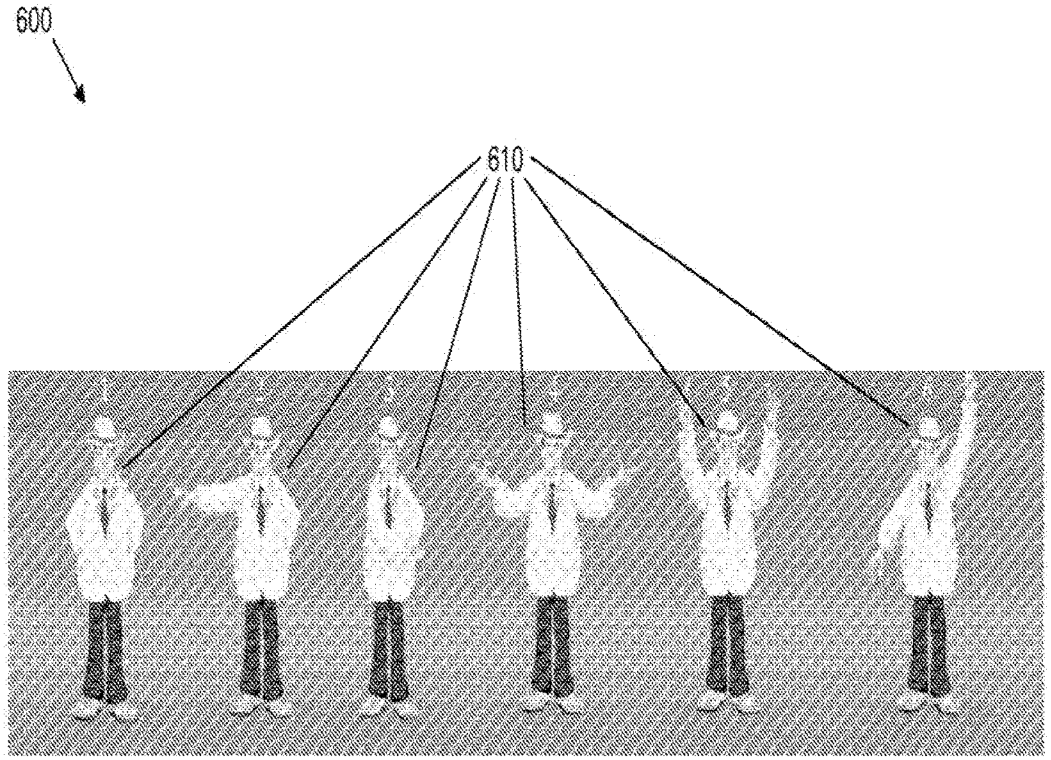
FIG. 6 depicts exemplary referee animation images for use in at least one embodiment of the methods and systems disclosed herein.

Umpire animation 525 may comprise information about an action or decision of an umpire or referee, e.g., with respect to a particular foul, penalty, or other event. For example, umpire animation 525 may display an image or video animation of a referee making a particular call or taking a particular action. Exemplary referee images are shown in FIG. 6.

The bottom right area 530 shows betting options related to the minimum or maximum player/banker and tie/pairs. Betting chips 535 may be used to place bets and may be redeemable for a predetermined amount of cash (e.g., one red chip is redeemable for five dollars). Chips 535 may be purchased from a croupier or other gaming agent 12 from chip reservoir 550.

In some embodiments, users 10 and gaming agents 12 may interact with the tables and interfaces as they would with a traditional casino table (like a craps table), e.g., by manually placing real game chips 535 to signify a particular bet and amount. In some embodiments, users 10 and gaming agents 12 may place bets electronically from a user account. In some embodiments, users 10 may place bets using "electronic chips" comprising a displayed image of one or more chips corresponding to their equivalent counterparts in a real casino.

Bet status information 540 may indicate whether a bet is active, pushed, or paid. One or more cards 545 may be used, either separately or in conjunction with gambling associated with an in-game event. Game history chart 555 may display numerical (e.g., score) or other information about a past or current game associated with the game for which betting is enabled at the interface.

FIGS. 5B and 5C depict additional exemplary interface screens, which may be used in a manner similar to that described for FIG. 5A. As shown in FIG. 5B, buttons 580 may be selected to view or change a games menu, a user account, applicable rules, and service. Interface option buttons 590 enable users to select sounds, voiceovers (e.g., as opposed to text information).

FIG. 6 depicts exemplary referee animation images for use in at least one embodiment of the methods and systems disclosed herein, e.g., with respect to the English sporting game cricket. From left to right, the images in FIG. 6 may refer to (1) a referee's normal stance (no penalty or foul); (2) no ball signal; (3) four runs signal; (4) wide ball signal; (5) six runs signal; and (6) out signal.

Figure 7:
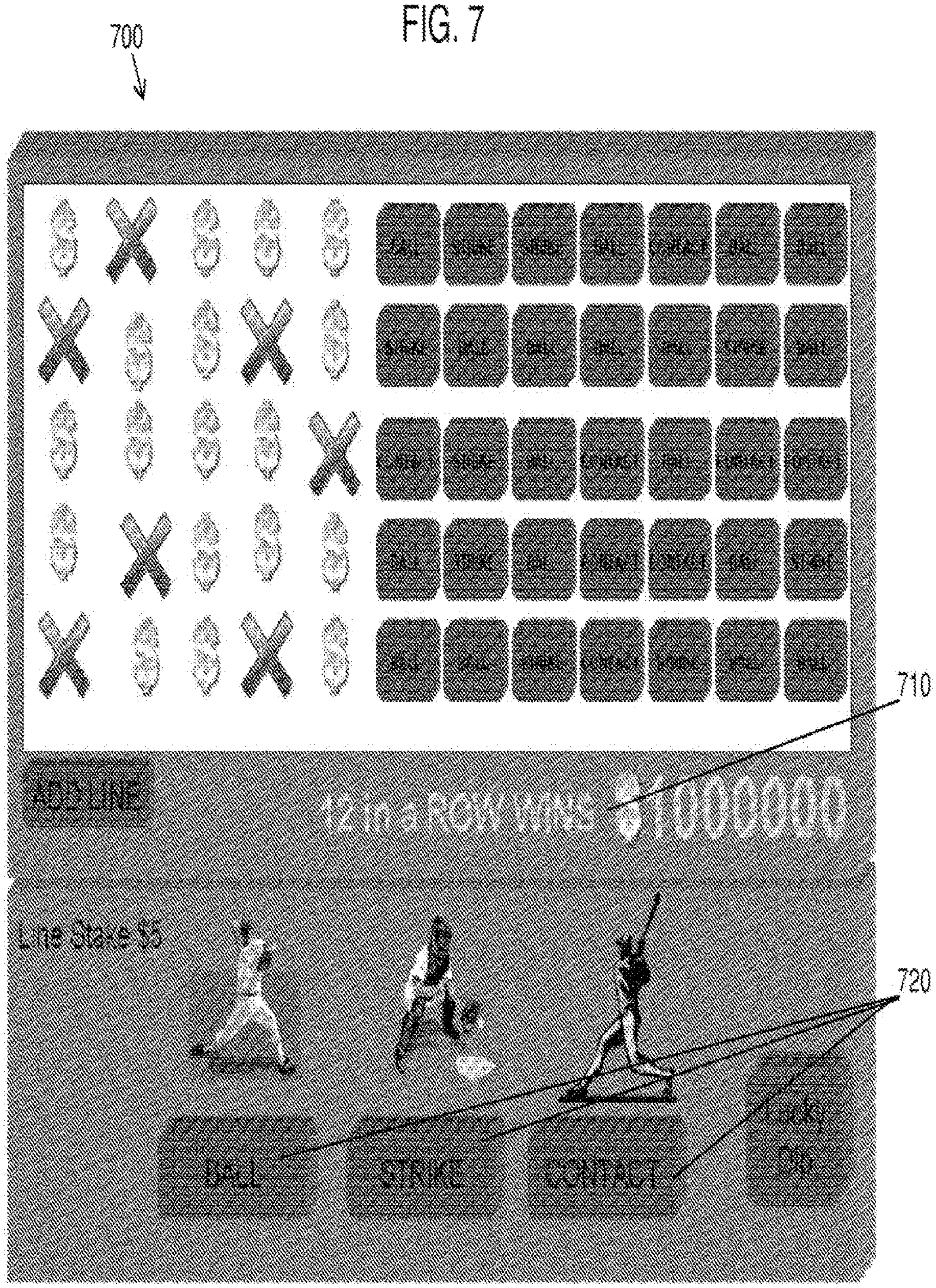
FIG. 7 depicts an exemplary interface screen for use in at least one embodiment of the methods and systems disclosed herein.

FIG. 7 depicts an exemplary interface screen 700 for use in at least one embodiment of the methods and systems disclosed herein. Screen 700 shows an interface for a game that integrates events from a live event. Here, the game may be of a game type similar to bingo, wherein users 10 win by matching in-game events (such as a strike-out, ball, strike, etc.) with corresponding panels from the board (that indicate strike-out, ball, strike, etc.). Winning conditions 710 may define a condition for winning the game, such as the need to obtain 12 panels in a row. Betting options 720 enable users 10 to place bets on a variety of outcomes of an at-bat such as ball, strike, hit (or other contact with ball), or other outcome.

In some embodiments, a user 10 may win different amounts by matching longer sequences of panels based on batters' performance. The user 10 may select a sequence of pitches that would occur at the start of the next defined period. This period might be the next at bat, half innings, inning, etc. In some embodiments, the period may be chosen based on how quickly a user can enter the sequence. In some embodiments, the user 10 can choose to play more than one line (or sequence) at a time. Payouts may also be provided for diagonal sequences across the multiple lines. Such a payout would encourage the player to play more than one line. In some embodiments, a user "bingo card" may have a random sequence generated.

Figure 8:
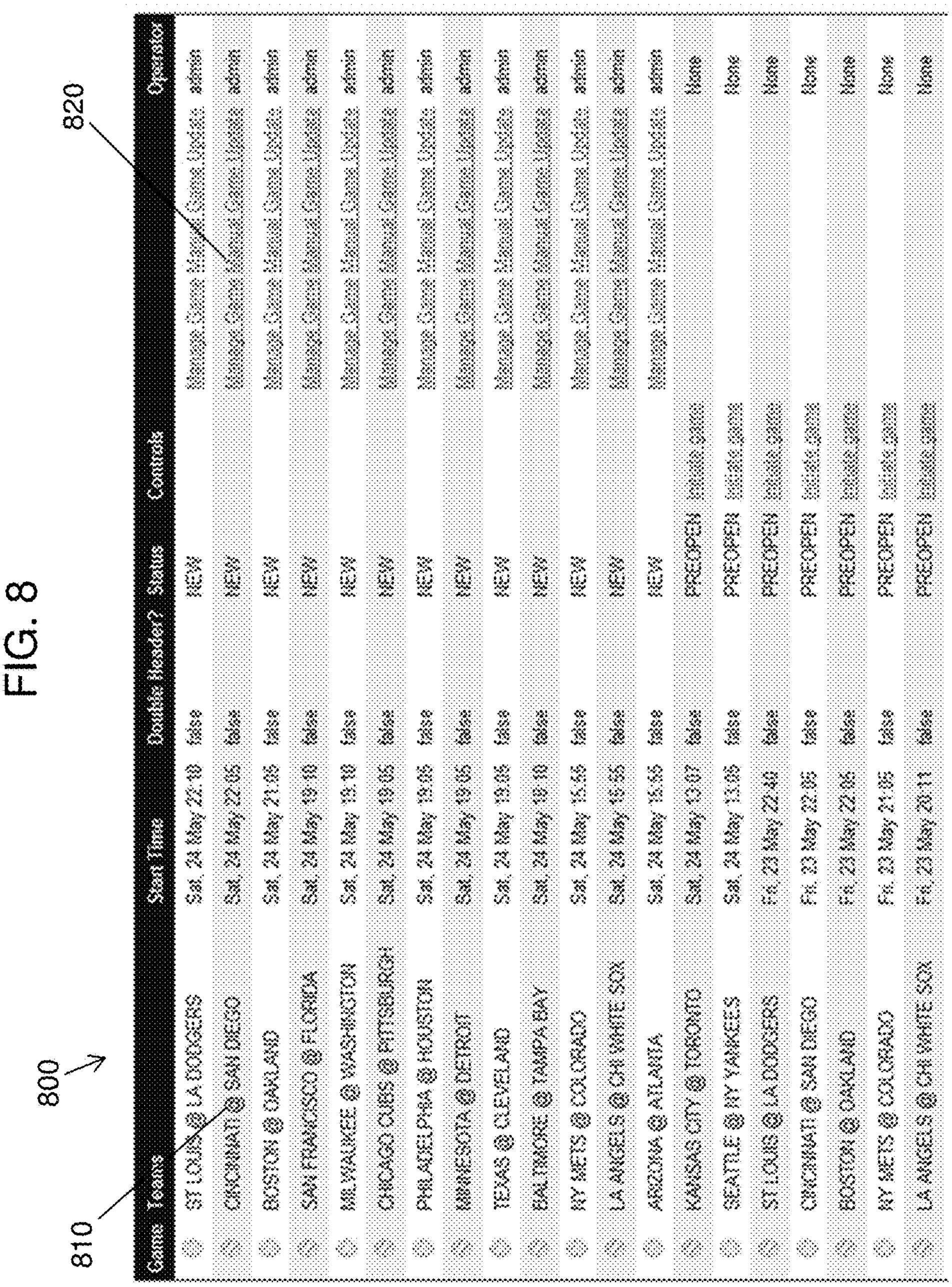
FIG. 8 depicts an exemplary interface screen for use in at least one embodiment of the methods and systems disclosed herein.

FIG. 8 depicts an exemplary interface screen 800 for use by a gaming agent 12 in at least one embodiment of the methods and systems disclosed herein. Agent interface 800 comprises game events 810 (e.g., specific scheduled sporting events) and game management options 820 (e.g., manage games, manual game update). Gaming agents may select a particular game (such as a Cubs vs. Phillies baseball game) and then select whether to manage it manually or automatically. If the agent 12 selects manual management, the agent 12 may need to update possible and actual outcomes manually. In some embodiments, agent 12 may determine or update probabilities manually. If the agent selects automatically, then the server 2 may update game information, e.g., via an automated data feed.

Figure 9:
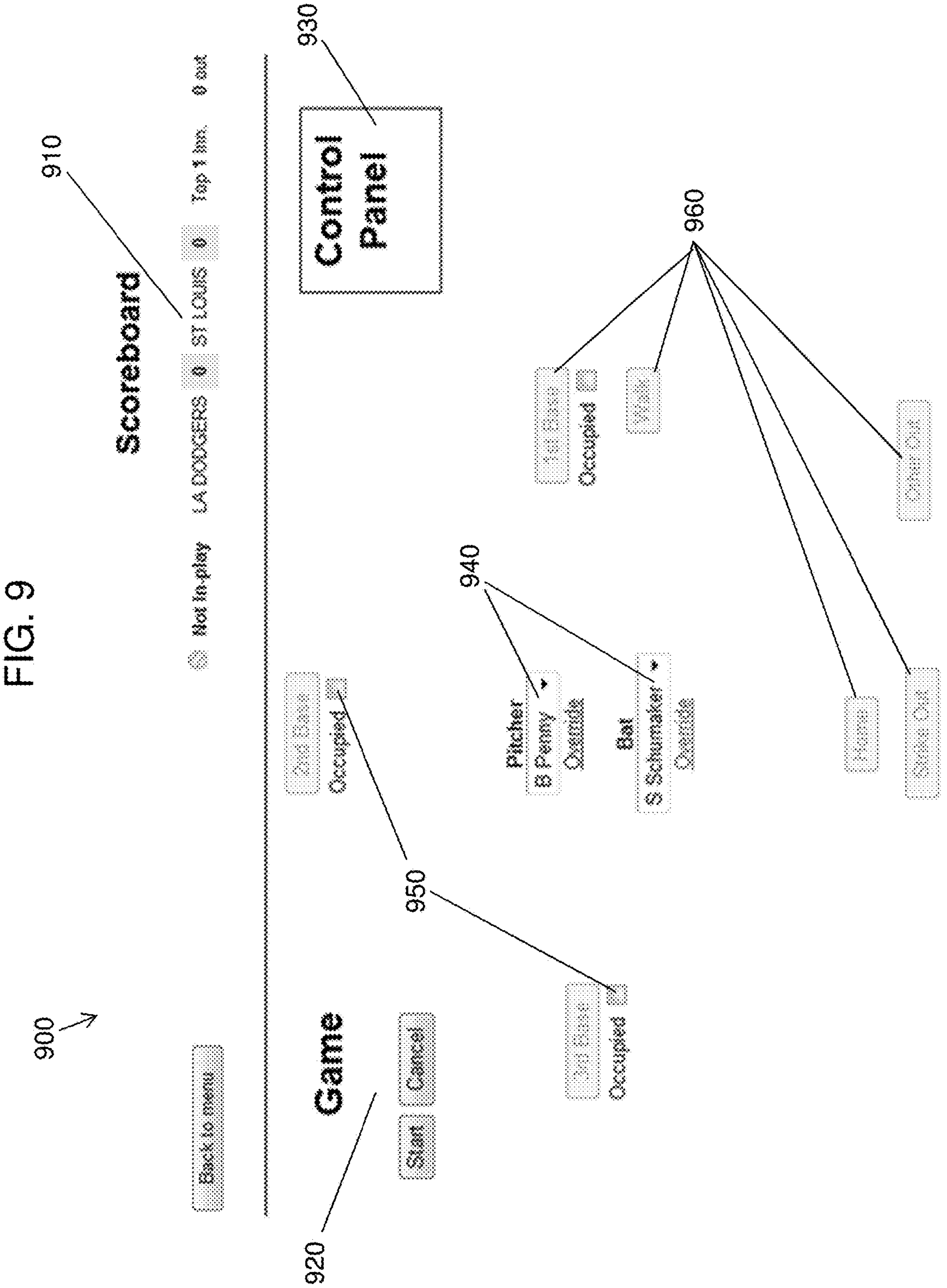
FIG. 9 depicts an exemplary interface screen for use in at least one embodiment of the methods and systems disclosed herein.

FIG. 9 depicts an exemplary interface screen 900 for use (e.g., by a user 10 and/or agent 12) in at least one embodiment of the methods and systems disclosed herein. Interface 900 comprises a scoreboard comprising status information about the game, such as the current score. Game options 920 enable users 10 and agents 12 to start a game management program that enables active betting markets associated with a particular game. When a user 10 or agent 12 selects control panel 930, the interface 900 may enable users 10 or agents 12 to change settings associated with the game. Player selector 940 enables a user 10 or agent 12 to change the identify of a particular player (e.g., the pitcher or batter). As this information changes for each at-bat, the system may rely on an agent 12 to update this information. Base Occupied option 950 enables users 10 and/or agents 12 to indicate whether a runner is on base, and at which base.

Figure 10:
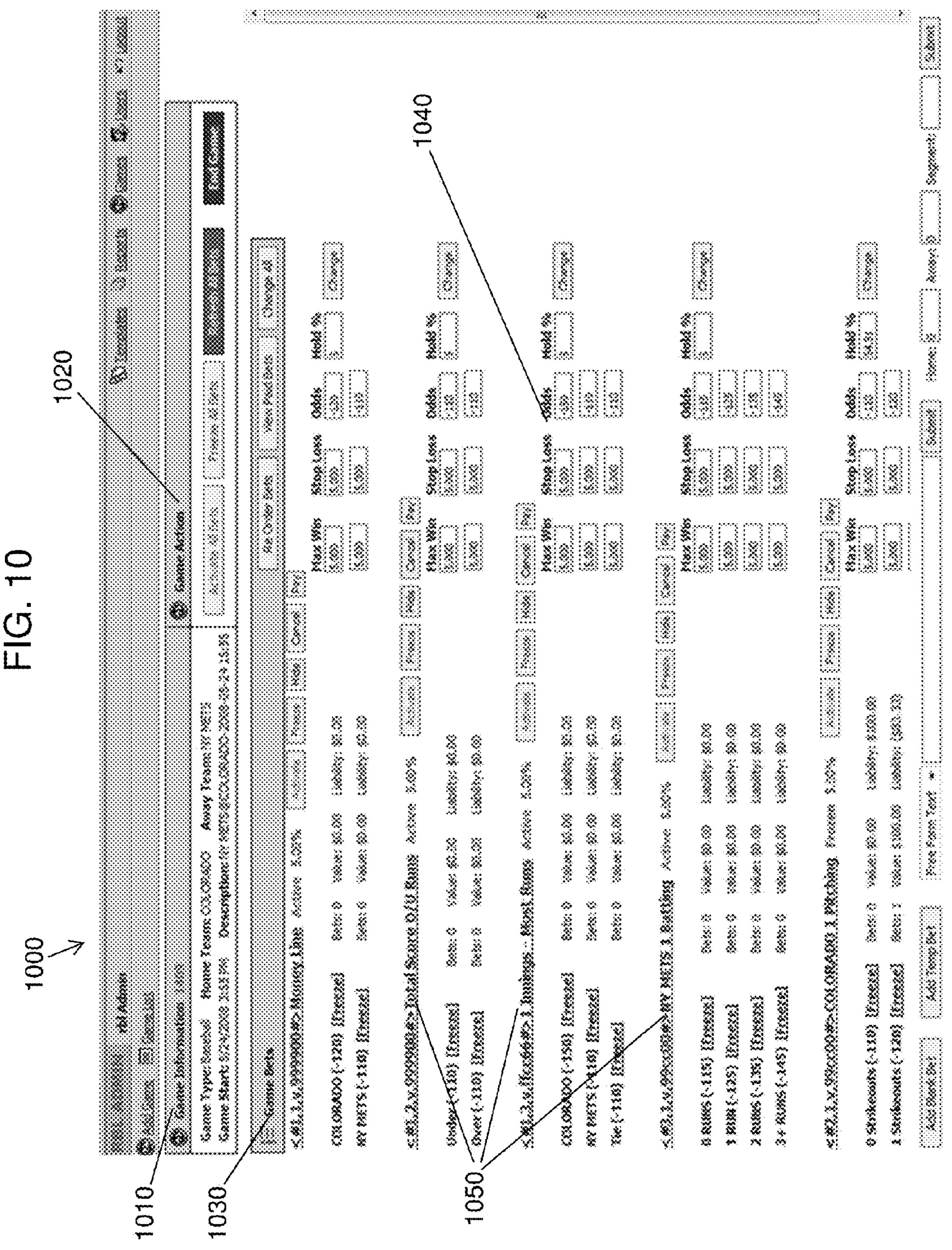
FIG. 10 depicts an exemplary interface screen for use in at least one embodiment of the methods and systems disclosed herein.

FIG. 10 depicts an exemplary interface screen 1000 for use in at least one embodiment of the methods and systems disclosed herein. In some embodiments, the interface 1000 may be operated by server 2 and used by agents 12 to manage one or more gaming markets associated with an event. The interface 1000 may be comprised in a front-end component of server 2*a* in FIG. 2, which operates in conjunction with a back-end server 2*b*. In some embodiments, interface 1000 may be used by users 10 to navigate gambling options and place bets for one or more performance parameters in one or more events.

Interface 1000 comprises game information area 1010. Game action 1020 buttons enable agents 12 and/or users 10 to activate all bets, freeze all bets, refresh all bets, or end the game. Other options may be considered. Game bets 1030 may identify all active or potential bets available (or that will be available) to users 10. Specific bets 1050 shows the current status of specific bets. Betting market information 1040 displays information about a specific betting market such as maximum win, stop loss amount, odds, and hold percentage.

FIGS. 11-19 depict exemplary user interface screens for use in at least one embodiment of the methods and systems disclosed herein. In some embodiments, the user interfaces may be displayed to users for viewing, configuring, and inputting betting information such as one or more bets. In some embodiments, the user interface of FIG. 11 may be displayed to a user, and the user may interact with the interface to specify bets relating to a particular event such as a sporting event. In some embodiments, the interfaces may be periodically updated with new game and betting information such as updated prices, odds, new bets, score, and other game and betting information discussed herein. The interfaces may be used in conjunction with the system described herein to enable users to view game and betting information and bet on in-game events. New betting markets may be created and generated on the user interface during the game.

For instance, a betting market for a sixth inning of a baseball game may be created and displayed on an interface at the end of the fifth inning, the beginning of the sixth inning, or another time.

Various items in FIGS. 11-19 may display betting information such as bet amounts, odds, price, information, or other information. For example, various items in FIGS. 11-19 show either a positive number or a negative number, e.g., associated with a user-selectable bet on a particular event outcome in a game, such as a bet that a run, goal, or other event will occur during a particular time period such as a particular inning or quarter (e.g., a current time period such as a current at-bat in baseball or quarter in basketball).

Figure 11:
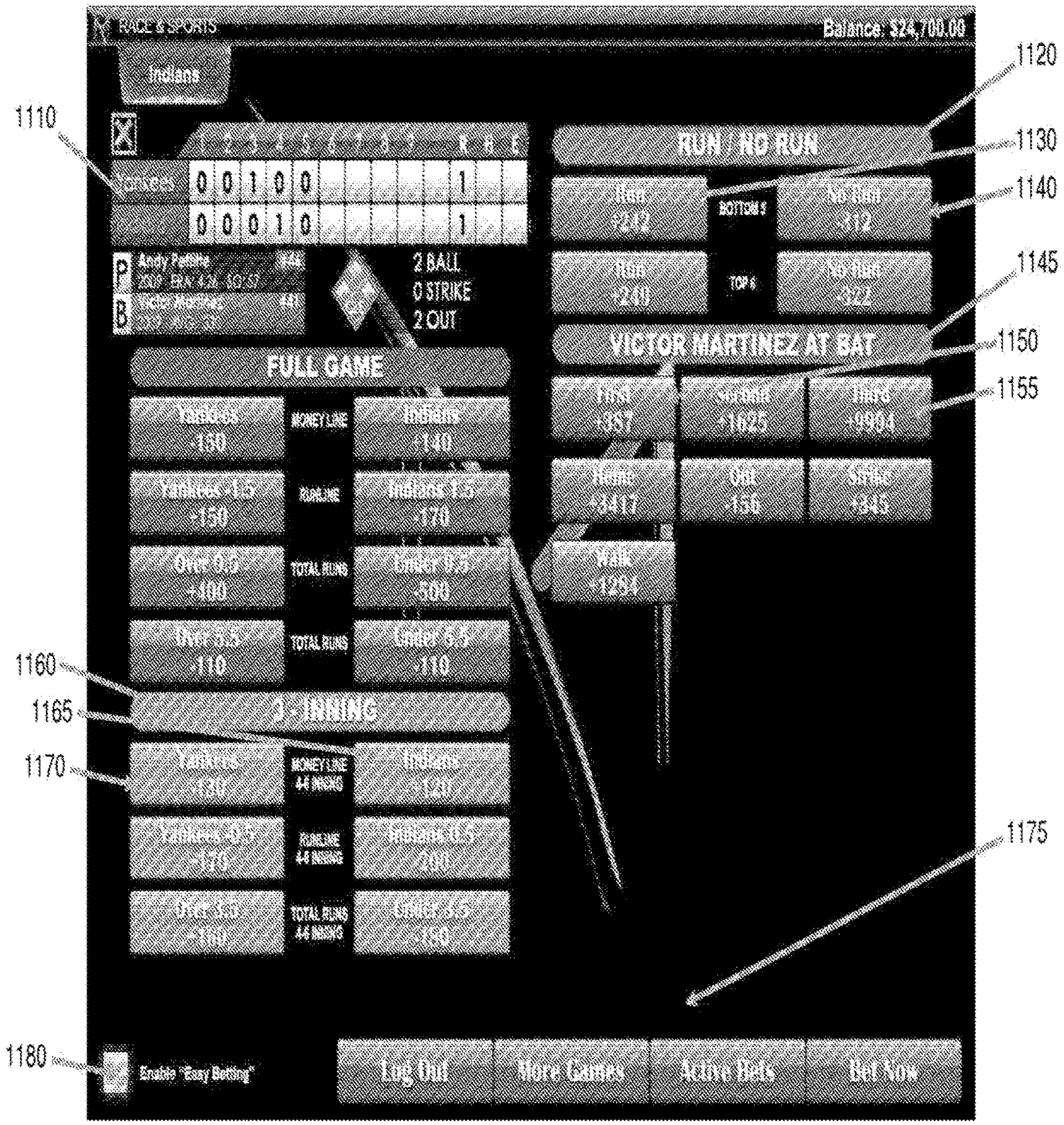
FIG. 11 depicts an exemplary interface screen for use in at least one embodiment of the methods and systems disclosed herein.

In some embodiments, a positive number in such a user-selectable bet area may indicate an amount (e.g., in a currency such as dollars) that a user may win if the user places a bet in a predetermined amount (e.g., $100) on a user-selectable bet associated with the area (e.g., a run occurring during a particular half of an inning) Accordingly, for example, the "+242" number in the upper left "Run" box in the "Run/No Run" area 1130 of FIG. 11 may indicate an offer to the user to bet $100 of the user's money (e.g., money accessible from or stored in an account of the user in system 100) for the possibility of winning $242, e.g., if the selected outcome occurs (e.g., a run takes place during the bottom of the fifth inning of a particular baseball game). To place the bet, the user may select the "$242 Run" box. If a run takes place during the bottom of the fifth inning, the user may win $242 (e.g., and the user may additionally receive a refund for or otherwise keep the $100 placed at risk in the bet). The user may also input other betting information, such as an amount of the user's bet.

In some embodiments, a negative number in a user-selectable bet area may indicate an amount (e.g., in a currency such as dollars) that must be put at risk by the user in a bet in order to win a predetermined amount (e.g., $100) on a user-selectable bet associated with the area (e.g., a run occurring during an at-bat). Accordingly, for example, the "−312" number in the upper right "No Run" box in the "Run/No Run" area 1140 of FIG. 11 may indicate an offer to the user to bet $312 of the user's funds (e.g., money accessible from or stored in an account of the user in system 100) for the possibility of winning $100, e.g., if the selected outcome occurs (e.g., no run takes place during the bottom of the fifth inning of the baseball game). For example, the user may select the "−312" Run box to place the bet. If a run takes place during the bottom of the fifth inning, the user may win $100 (e.g., and the user may additionally receive a refund for or otherwise keep the $312 placed at risk in the bet).

Those of skill in the art will appreciate that the dollar amounts listed in a particular bet selection area (e.g., after the + or − sign, e.g., in item in the diagrams) may indicate the price and/or odds of a particular bet. In some embodiments a user may place a bet according to the odds specified on the button in the user interface, but may place a bet in an amount that is different from the amount on the bet. For example, a user may select a button with the "−312" representing the price/odds of the bet, e.g., that the user must bet $312 for every $100 the user would like to win (i.e., a 3.12 to 1 wager amount to winnings ratio). The user interface may then display a betting screen that enables a user to select an amount to put at risk. If the user wins the bet, the system may transfer a winning amount to the user based on the price/odds. For example, if the user bet $3.12 and won, the system may transfer a payout to the user in the amount of $1. (If the user paid the system $3.12, the system may also transfer back to the user the $3.12 wagered amount.)

FIG. 11 depicts an exemplary interface screen for use in at least one embodiment of the methods and systems disclosed herein. In some embodiments, the user interface of FIG. 11 may be displayed to a user, and the user may interact with the interface to specify bets relating to a game of baseball.

A game information area 1110 may display information about a game, such as the teams or players playing the game, the current score (e.g., broken down by game period such as inning or half), the current team on offense (or at bat or the team in possession of a game ball), and other information.

A "Run/No Run" area 1120 shows betting information concerning a particular inning (or top or bottom of an inning) in a baseball game. For example, a user may select the icon in the upper left of the Run/No Run area. Selecting the icon may trigger a bet (or trigger the display of a betting interface that enables the user to configure parameters of a bet such as an amount). For example, "Run +242" may indicate a user-selectable bet that a run will take place during the bottom of the fifth inning, whereas "No Run −312" may indicate a user-selectable bet that a run will not take place during the bottom of the fifth inning. Below those user-selectable bets may comprise bets for the next half-inning, i.e., the top of the sixth inning Odds and prices (e.g., the positive and negative numbers indicated on each user-selectable bet) may be updated as the game goes on. Game information such as the events that take place in the game and betting information such as the changing liability of the system for a particular selectable bet may affect the odds and prices, e.g., using any method described herein.

At bat betting area 1145 may comprise an area listing possible bets 1150, 1155 concerning an outcome of a particular at-bat in the baseball game. For example, a user may select area 1150 to bet that Victor Martinez will get to first base. Users may alternatively or in addition select bet 1155 to bet that Victor will get to third base. Users may select other betting areas on the screen to make other bets, e.g., that Victor Martinez will get to second, home, or out. Users may also bet on a specific pitch, e.g., that the next pitch will be a strike or a ball.

Three-inning area 1160 may comprise an area where users may bet on a portion of the baseball game, such as three of the nine traditional innings of a baseball game. For example, the system may create a separate betting market for each 3-inning portion of the game, e.g., one market for innings 1-3, one for 4-6, and one for innings 6-9 (or 6 to the final inning if there is overtime innings; alternatively, overtime innings may have a separate betting market created for them). Each portion of the game (e.g., 3-inning portion) may comprise a separate mini-game for betting on various outcomes and/or parameters of the minigame, such as who will score the most runs (or most bases stolen, or least errors, or other parameter) during those innings. Accordingly, a team that wins the whole game may lose a minigame portion of the game (e.g., may lose innings 4-6 when those innings are considered separately).

Such "minigame" betting markets may be created at the end of a prior minigame (e.g., a market for innings 4-6 may be created after the conclusion of innings 1-3). In some embodiments, the market for a subsequent minigame may be created before the end. In some embodiments, the relevant bets and betting information may be displayed at the user interface before the conclusion of the prior minigame. The odds for bets may be updated as described herein.

Minigames may be determined for any sport. For example, a racing minigame may be a portion of laps of the race, a particular time period of the race, or other metric in the race. For example, a 500 lap race may have five 100-lap minigames, or 50 10-lap minigames. Minigame outcomes may be determine by a variety of methods, such as who is leading at the end of the minigame, or who had the fastest average time during the minigame.

As shown in various other drawings of FIGS. 11-19, the "minigame" concept may be applied to other sports. In other words, parameters that may be typically bet on during a whole game may be the subject of a bet for a portion of the game considered in isolation. For example, users may bet on one quarter or half of a basketball game, football game, soccer match, or round of golf, for example.

As shown in FIG. 11, users may make a money line bet on the Yankees (by selecting icon 1170) or the Indians (by selecting icon 1165) concerning the outcome of innings 4-6. Users may select option 1180 (e.g., by clicking in the area of 1180) to enable an "easy betting" feature. A user may first configure an "easy betting" feature by specifying various betting parameters, such as a betting amount. If the easy betting icon is checked, then the system may automatically determine information about the user's bet (such as the betting amount) without prompting the user for such information. For example, the "easy betting" feature may enable a user to configure default parameters for one or more of a user's bets. This may facilitate the user's placement of future bets, as the user may not need to specify such auto-populated information separately for each bet.

As shown in FIG. 11, users may make bets related to money line, runline, total runs, (e.g., during a full game or game portion).

Area 1175 may enable users to log out, select other games, view active bets, or view another interface for making current bets.

Figure 12:
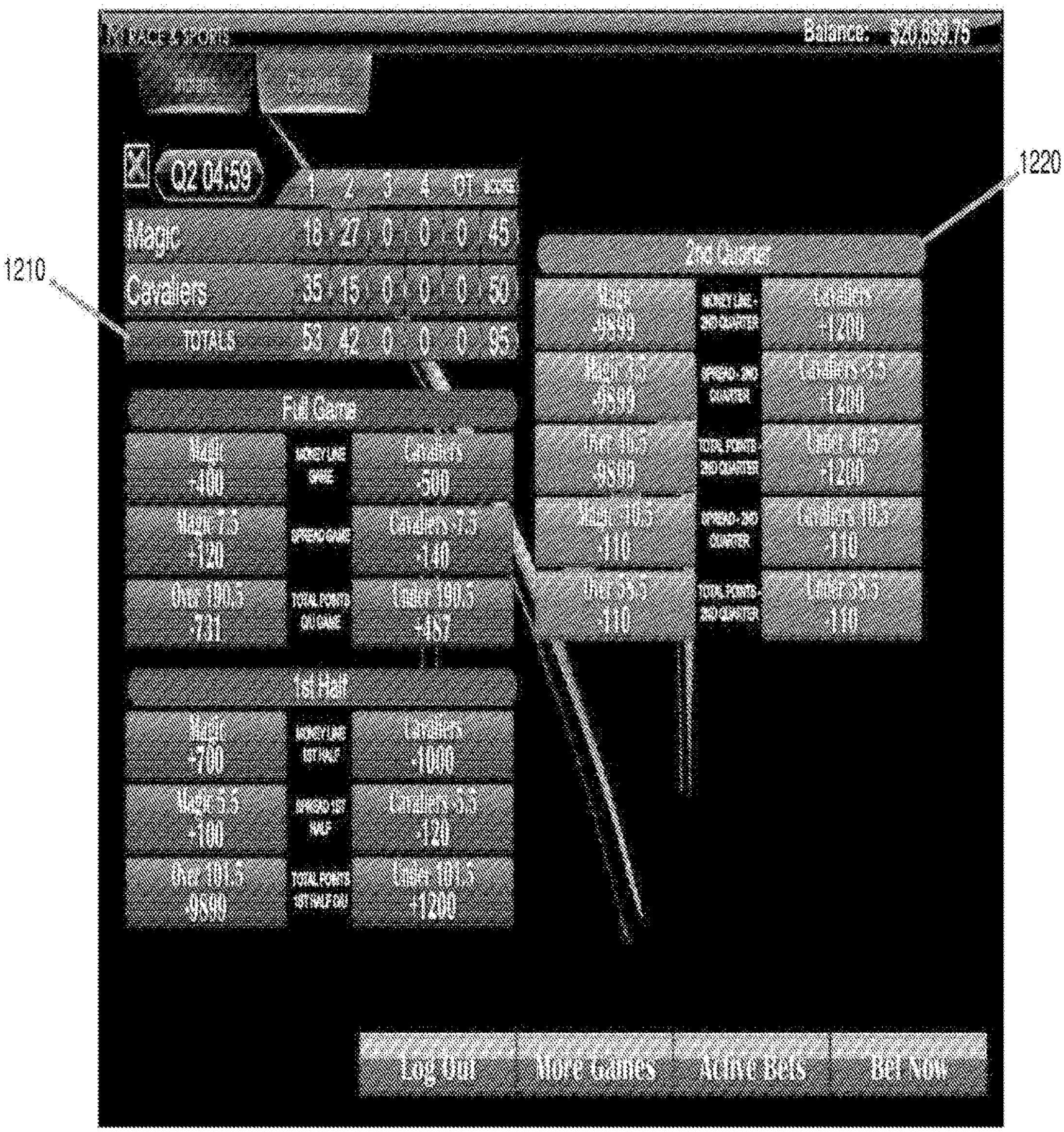
FIG. 12 depicts an exemplary interface screen for use in at least one embodiment of the methods and systems disclosed herein.

FIG. 12 shows betting information for a basketball game. As shown in area 1210, the interface may show total points scored during each period. Area 1220 shows bets that may be made for outcomes related to the second quarter. Such bets may include, but are not limited to, bets related to the following: money line, spread, and total points. Additional bets related to these outcomes may be generated during the second quarter. For example, bets may become “outdated” due to very poor odds (e.g., a bet that one team will win the quarter when they are down by 20 points in the quarter with thirty seconds to go). New bets may be created during the time period (e.g., basketball quarter) with more even odds (e.g., a bet that the first team will win the quarter by 22 or 24 points). Such bets may appear below the “outdated” bets. In some embodiments, the newer bets may replace the old bets.

Figure 13:
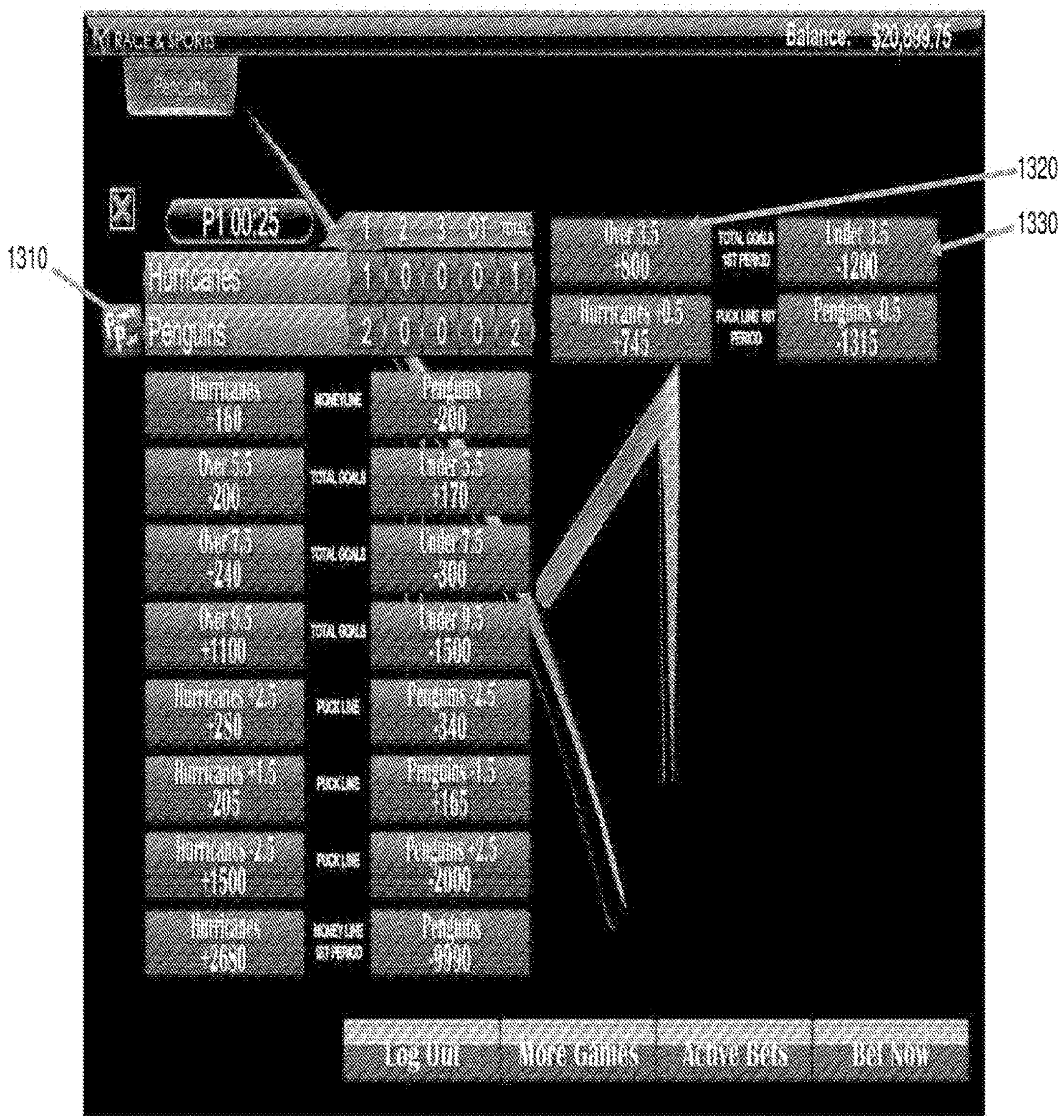
FIG. 13 depicts an exemplary interface screen for use in at least one embodiment of the methods and systems disclosed herein.

FIG. 13 shows bets related to a hockey game. Icon 1310 may indicate that one team (e.g., the Penguins) have a power play. Betting areas 1320 and 1330 may enable users to bet on outcomes for the first period, e.g., total goals during the first period. Other possible bets include, but are not limited to, puck line during the first quarter.

Figure 14:
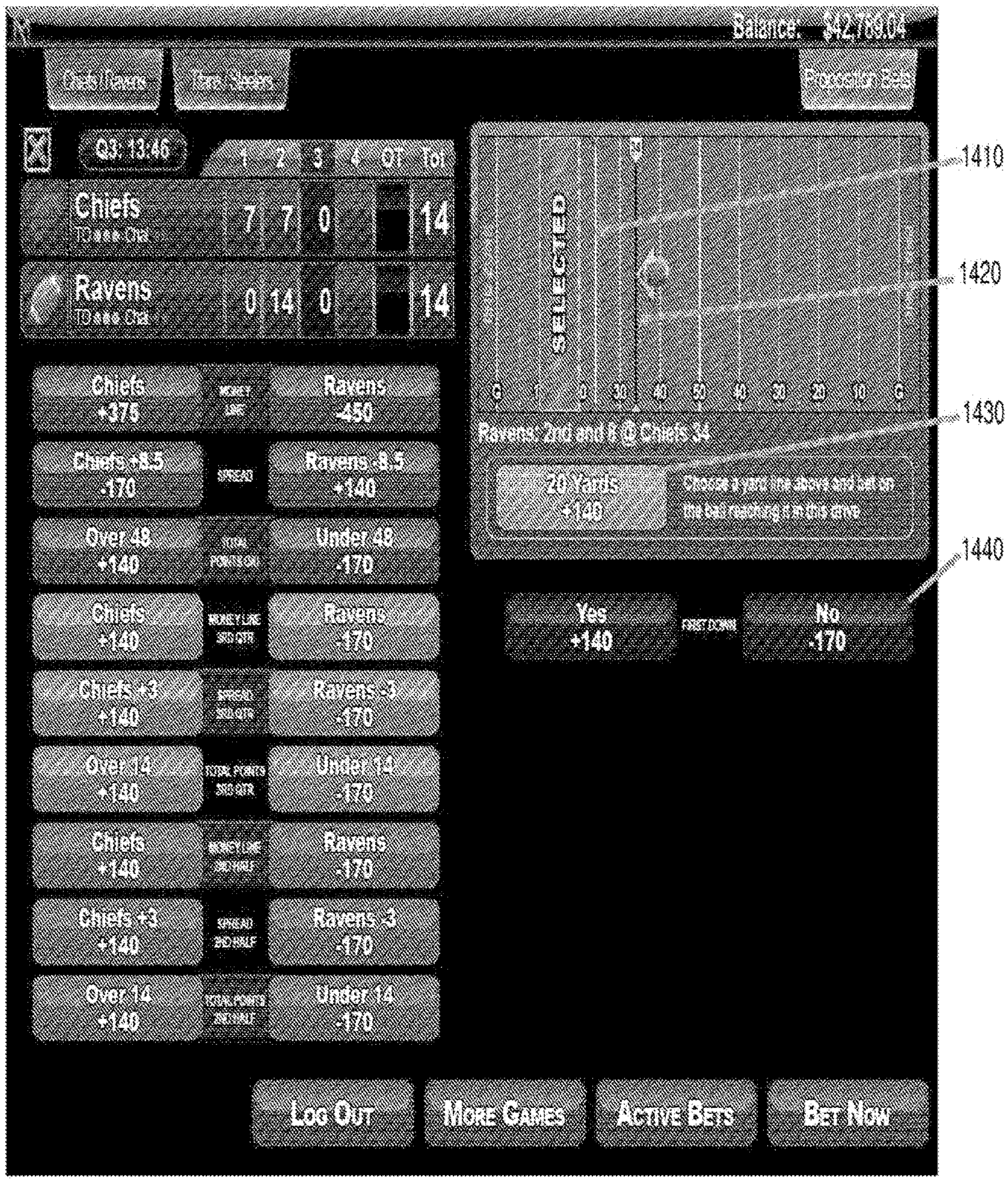
FIG. 14 depicts an exemplary interface screen for use in at least one embodiment of the methods and systems disclosed herein.

FIG. 14 shows bets related to a football game. Icon 1410 may show a first down marker. To the left of the first down marker may be a “selected” area. The user may drag the “selected” icon to a position on the field where the user wants to bet that the ball will travel to during a particular portion of the game, such as a current drive, a current down, a current series of down (e.g., before the next first down or next possession), or quarter. Icon 1430 may show the number of yards selected in accordance with the “selected” icon moved by the user. Icon 1430 may also show the odds/price for that number of yards for the period specified. In FIG. 14, such selected yards may be the number of yards selected for a particular drive.

Icon 1440 may be selected by a user to bet that the team in possession of the ball will “not” get a first down. Another bet to the left of this bet may enable users to bet that the team does get a first down (e.g., during the current possession or before the other team takes possession).

Figure 15:
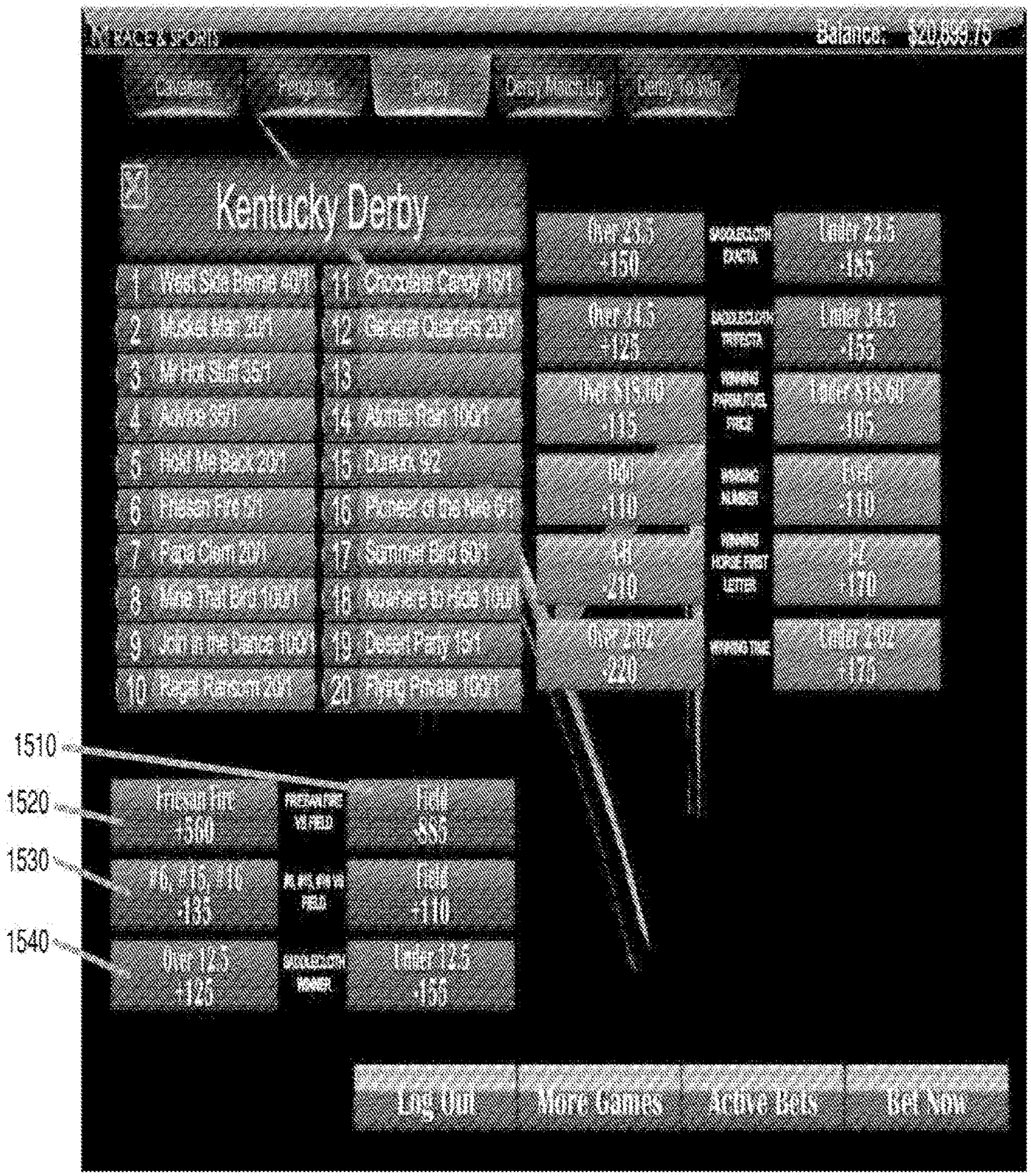
FIG. 15 depicts an exemplary interface screen for use in at least one embodiment of the methods and systems disclosed herein.

FIG. 15 shows bets related to a race, e.g., a horse race. As shown at icons 1510, 1520, 1530, and 1540, users may bet on a particular horse (e.g., versus the field), a particular number of horses (e.g., versus the field), the saddlecloth winner, or other outcomes.

Figure 16:
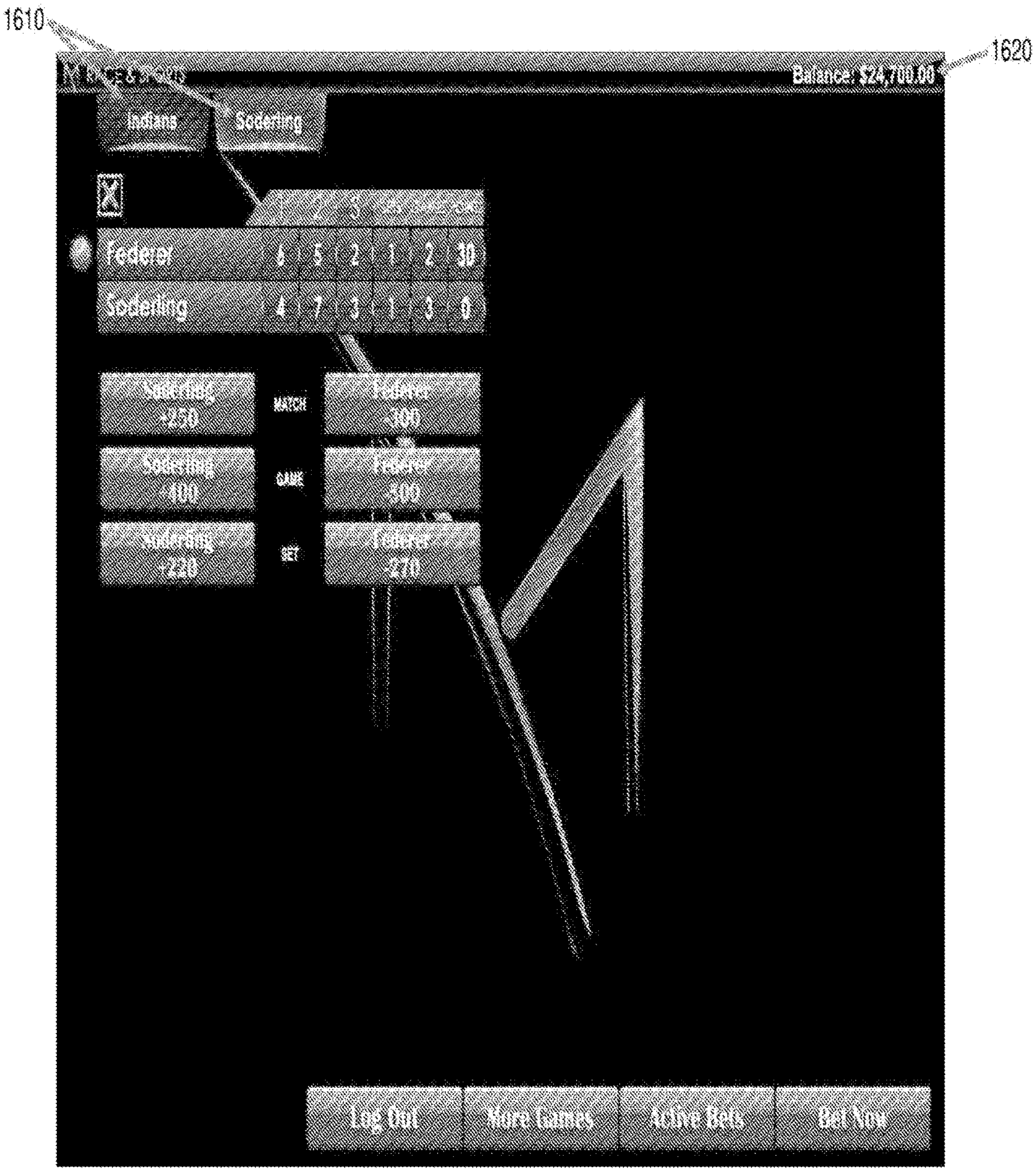
FIG. 16 depicts an exemplary interface screen for use in at least one embodiment of the methods and systems disclosed herein.

FIG. 16 shows bets related to a tennis match. As shown in icon 1610, a user may select tabs to switch between sports (e.g., tennis and baseball). Icon 1620 may show a user’s current balance in an account, e.g., with system.

Figure 17:
FIG. 17 depicts an exemplary interface screen for use in at least one embodiment of the methods and systems disclosed herein.

FIG. 17 shows bets related to a golf match. Bets may be per day of the match, or per round, or for a whole tournament. Other bets may be considered.

Figure 18:
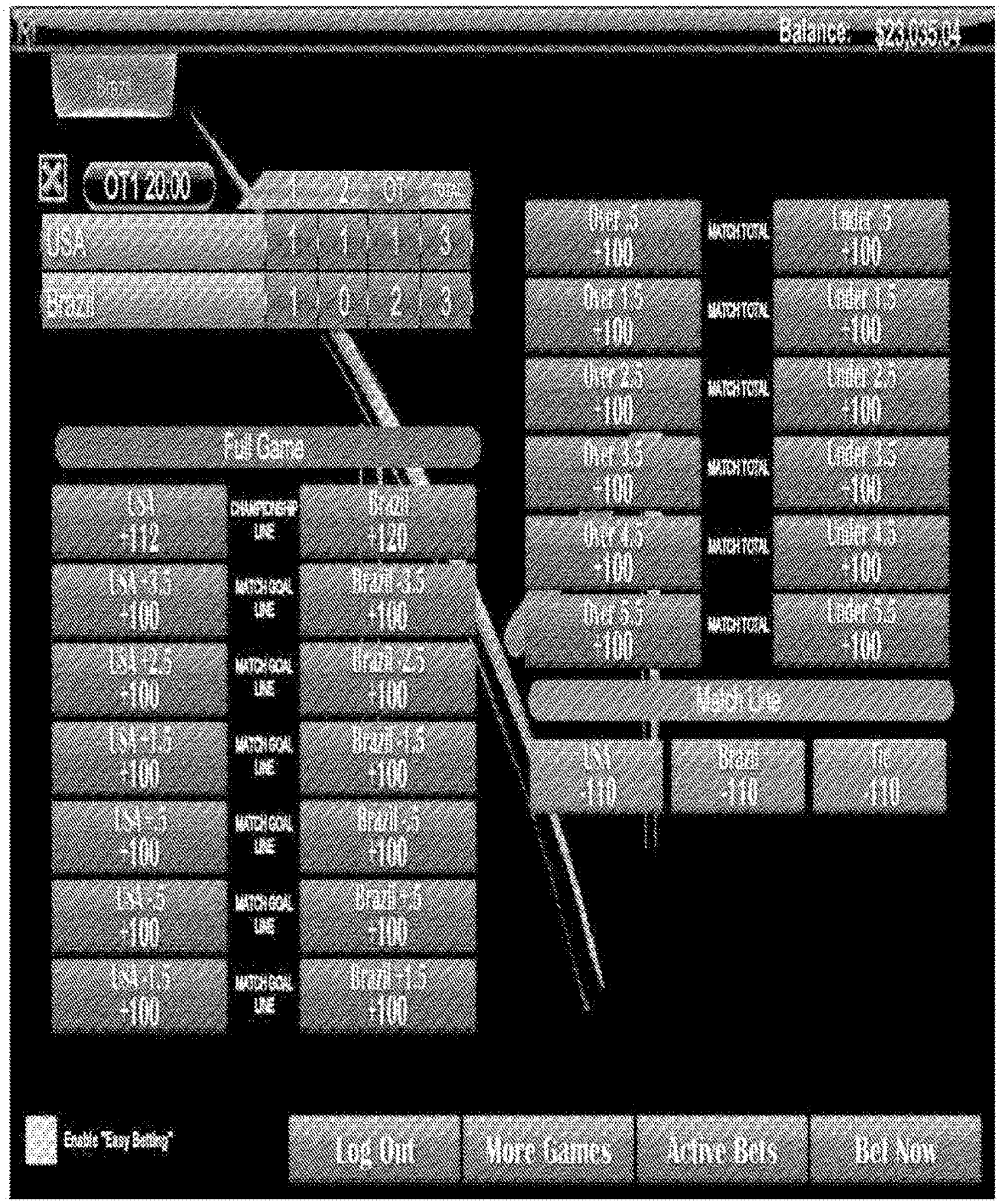

FIG. 18 shows bets related to a soccer match (e.g., the World Cup).

Figure 19:
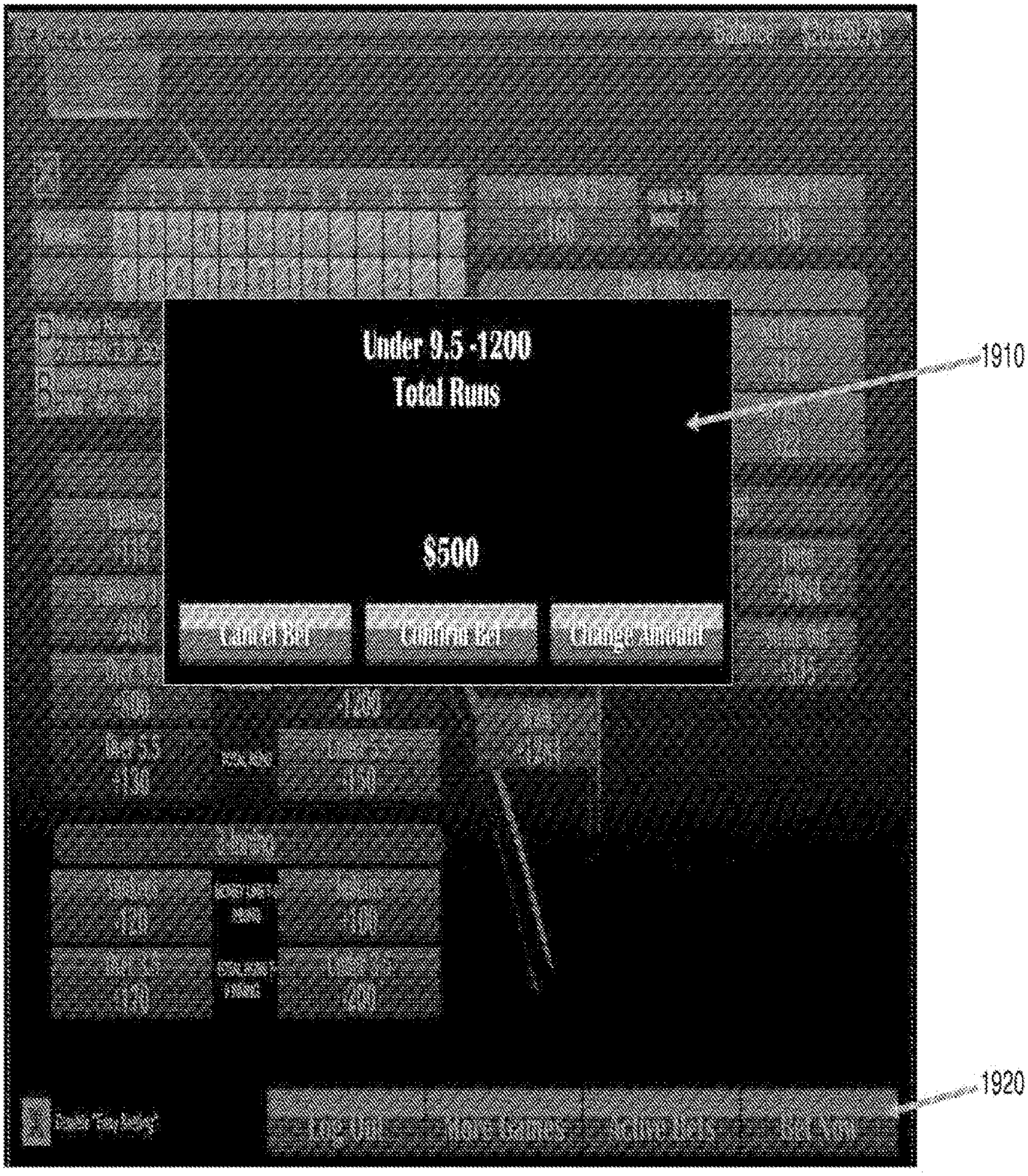

FIG. 19 shows a betting window 1910 that may be triggered when a user selects a specific bet icon, such as Bet Now 1920. By confirming the identified bet, the user may submit the bet into the system.

FIG. 12 depicts an exemplary interface screen for use in at least one embodiment of the methods and systems disclosed herein. In some embodiments, the user interface of FIG. 11 may be displayed to a user, and the user may interact with the interface to specify bets relating to a game of basketball.

FIG. 13 depicts an exemplary interface screen for use in at least one embodiment of the methods and systems disclosed herein.

FIG. 14 depicts an exemplary interface screen for use in at least one embodiment of the methods and systems disclosed herein.

FIG. 15 depicts an exemplary interface screen for use in at least one embodiment of the methods and systems disclosed herein.

FIG. 16 depicts an exemplary interface screen for use in at least one embodiment of the methods and systems disclosed herein.

FIG. 17 depicts an exemplary interface screen for use in at least one embodiment of the methods and systems disclosed herein.

In some embodiments, various devices and systems may be used to automatically identify and track in-game events, such as the relative positions of race participants at a specific time in (or throughout the duration of) a race. For example, the system described in U.S. application Ser. No. 10/604,451 by McCarthy et al. describes one exemplary system for identifying and tracking event information in real time or substantially real time, and for providing event information to users, e.g., via rendered animation. The disclosure of the Ser. No. 10/604,451 application is incorporated herein by reference in its entirety.

The disclosure of U.S. application Ser. No. 12/979,546 by Amaitis et al., filed Dec. 28, 2010, is also incorporated herein by reference in its entirety.

What is claimed is:

1. An apparatus, comprising:

at least one processor; and at least one memory having instructions stored thereon which, when executed by the at least one processor, direct the at least one processor to:

after a start of an event and before an end of the event, determine a plurality of possible future states of the event that may occur before an end of the event;

after a start of the event and before an end of the event, determine a probability of occurrence for each of the plurality of possible future states based on probability information and reliability information associated with the probability information;

based at least in part on the probabilities, determine odds for betting that a first one of the plurality of possible future states will occur;

before an end of the event, cause to be presented to a plurality of users at a plurality of corresponding computer interfaces information indicating an opportunity to place a bet at the determined odds that the first possible future state will occur, the plurality of computer interfaces being in networked communication with the at least one processor;

responsive to the act of causing to be presented the information, receive from a first of a plurality of users a first bet that the first possible future state will occur;

after receiving the first bet and before an end of the event, determine that the first possible future state has occurred; and cause a payout to be paid to the first user based on the first bet and the act of determining that first possible future state has occurred.

2. The apparatus of claim 1, in which the plurality of users comprises a second user and a third user, in which the instructions, when executed by the at least one processor, further direct the at least one processor to:

receive from the second user a request to make a bet mutually exclusive to a bet of a third user, in which the request comprises a request to bet against a bet of the third user;

based on the request to bet against the third user, transmit to the third user a request to make a bet mutually exclusive to a bet of the second user; and receive from the third user an acceptance of the request to make a bet mutually exclusive to a bet of the second user, in which the acceptance comprises a selection by the third user of a possible future state that is mutually exclusive to a possible future state selected by the second user.

3. The apparatus of claim 1, in which the event comprises a sporting event, and in which the instructions, when executed by the at least one processor, further direct the at least one processor to:

determine injury information relating to at least one injured player associated with the sporting event, in which the act of determining the probability of occurrence of each of the plurality of possible future states comprises determining the probability of each possible future state based at least in part on the injury information.

4. The apparatus of claim 1, in which the act of determining the probability of occurrence for each of the plurality of possible future states comprises determining the probability of occurrence of at least one possible future state based on a player's performance prior to the sporting event in at least one of the following performance categories: batting average, points scored, yards run, number of carries, runs batted in (RBIs), bases stolen, home runs, pass completion percentage, on base percentage, total bases per at bat, number of errors, number of aces, double fault percentage, free throw percentage, number of rebounds, handicap, number of golf strokes, and number of strike-outs.

5. The apparatus of claim 1, in which the probability information is determined based on a player's performance during the sporting event, in which the instructions, when executed by the at least one processor, further direct the at least one processor to:

determining updated odds for the first possible future state, in which the updated odds are determined according to pari mutuel betting rules, and in which the payout is paid in an amount determined based on the updated odds.

6. The apparatus of claim 1, in which the event is a sporting event that occurs during an event time duration such that the sporting event begins at the beginning of the event time duration and ends at the end of the event time duration, the sporting event comprising a plurality of portions of the event occurring during sequential portions of the event time duration, in which a plurality of possible future states comprises a possible future state occurring at the end of one of the sequential time periods, and in which at least one betting market is created for each of the sequential time periods.

7. The apparatus of claim 1, in which the event comprises a competition in at least one of tennis, squash, badminton, baseball, softball, cricket, surfing, football, soccer, basketball, hockey, gymnastics, skating, golf, running, swimming, skiing, biking, rugby, polo, water polo, bowling, dancing, billiards, shooting, a track and field competition, horse racing, dog racing, automobile racing, motorcycle racing, boat racing, fishing, boxing, a martial art competition, a mixed martial arts competition, a casino game, a card game, and chess.

8. The apparatus of claim 1, in which the event comprises a game of baseball, and in which the plurality of possible states comprise mutually exclusive outcomes of at least one of a specific player's at-bat, a top of an inning, a bottom of an inning, a whole inning, and multiple innings.

9. The apparatus of claim 1, in which the event comprises a game of football, and in which the plurality of possible states comprise mutually exclusive outcomes of at least one of a play, a set of plays before a first down, a quarter, a half, and a two minute drill.

10. The apparatus of claim 1, in which the first possible future state comprises at least one of: a score, a number of points, a number of yards, a type of play, a number of runs in an inning, a number of runs in a game, a number of home runs, a number of base hits, a number of doubles, a number of triples, a number of errors, a number of aces, a number of golf strokes by a player on a hole, a number of golf strokes by a player on a plurality of holes, a number of three-pointers, and a number of rebounds.

11. The apparatus of claim 1, in which the act of causing to be presented the information occurs at a beginning of a game time duration and the first possible future state occurs at an end of the game time duration, in which the game time duration comprises at least one of: an inning, a quarter, a half, a tennis set, a period, and a round.

12. The apparatus of claim 1, in which the instructions, when executed by the at least one processor, further direct the at least one processor to:

update odds for at least one of the plurality of possible future events based on at least one of the number and amount of bets for and counter to at least one of the plurality of possible future states, and in which an updated payout is determined based on at least one of the number and amount of bets that are for and counter to the first bet.

13. The apparatus of claim 1, in which the instructions, when executed by the at least one processor, further direct the at least one processor to:

determine aggregate information about a plurality of bets on one or more of the plurality of possible future states, in which the act of determining aggregate information about the plurality of bets comprises determining information about the percentage of users who bet on a specific possible future state; and display the information about the percentage of users who bet on a specific possible future state.

14. The apparatus of claim 1, in which the probabilities for the plurality of possible future states are determined based on (1) a plurality of sets of probability information and (2) reliability information associated with each set of probability information, the reliability information comprising a determination of accuracy of a source of probability information, in which the determination of accuracy for each source is determined based on one or more accuracies of prior prediction information provided by each source.

15. The apparatus of claim 14, in which at least one source comprises information available on a website.

16. The apparatus of claim 14, in which the prior prediction information comprises a betting line for a prior game.

17. The apparatus of claim 14, in which at least one source comprises a second one of the plurality of users, and in which the accuracy of the second one of the plurality of users is determined based on a success rate of prior bets made by the second user.

18. The apparatus of claim 1, in which the act of determining a probability for the first possible future state comprises determining a probability for at least one of the plurality of possible future states based on probability information and reliability information associated with a source of the probability information, and in which the plurality of corresponding computer interfaces display information about the sporting event in substantially real time.

19. A method comprising:

after a start of an event and before an end of the event, determining, by at least one processor of at least one computer in communication with a plurality of networked computers, a plurality of possible future states of the event that may occur before an end of the event;

after a start of the event and before an end of the event, determining, by the at least one processor, a probability of occurrence for each of the plurality of possible future states based on probability information and reliability information associated with the probability information;

based at least in part on the probabilities, determining, by the at least one processor, odds for betting that a first one of the plurality of possible future states will occur;

before an end of the event, causing to be presented to a plurality of users at a plurality of corresponding computer interfaces information indicating an opportunity to place a bet at the determined odds that the first possible future state will occur, the plurality of computer interfaces being in networked communication with the at least one processor;

responsive to the act of causing to be presented the information, receiving, by the at least one processor, from a first of a plurality of users a first bet that the first possible future state will occur;

after receiving the first bet and before an end of the event, determining, by the at least one processor, that the first possible future state has occurred; and causing, by the at least one processor, a payout to be paid to the first user based on the first bet and the act of determining that first possible future state has occurred.

20. A non-transitory machine-readable medium having instructions stored thereon that are configured to, when executed by at least one processor in networked communication with a computer system, direct the at least one processor to:

after a start of an event and before an end of the event, determine a plurality of possible future states of the event that may occur before an end of the event;

after a start of the event and before an end of the event, determine a probability of occurrence for each of the plurality of possible future states based on probability information and reliability information associated with the probability information;

based at least in part on the probabilities, determine odds for betting that a first one of the plurality of possible future states will occur;

before an end of the event, cause to be presented to a plurality of users at a plurality of corresponding computer interfaces information indicating an opportunity to place a bet at the determined odds that the first possible future state will occur, the plurality of computer interfaces being in networked communication with the at least one processor;

responsive to the act of causing to be presented the information, receive from a first of a plurality of users a first bet that the first possible future state will occur;

after receiving the first bet and before an end of the event, determine that the first possible future state has occurred; and cause a payout to be paid to the first user based on the first bet and the act of determining that first possible future state has occurred.

* * * * *